United States Patent [19]

Ito et al.

[11] Patent Number: 5,225,982
[45] Date of Patent: Jul. 6, 1993

[54] SYSTEM FOR CONTROLLING ENGINE OUTPUT BASED UPON SLIPPING CONDITION OF A DRIVING WHEEL OF A VEHICLE

[75] Inventors: Masayoshi Ito, Okazaki; Kiichi Yamada, Nagoya; Katsunori Ootake, Nagoya; Yasunobu Miyata, Komaki; Susumu Nishikawa, Okazaki, all of Japan

[73] Assignee: Mitsubishi Jidosha Kogyo Kabushiki Kaisha, Tokyo, Japan

[21] Appl. No.: 661,234

[22] Filed: Feb. 27, 1991

[30] Foreign Application Priority Data

Feb. 27, 1990 [JP] Japan ................................ 2-44470
May 18, 1990 [JP] Japan ............................... 2-127018

[51] Int. Cl.$^5$ ........................ B60K 31/02; F02D 43/00
[52] U.S. Cl. .......................... 364/426.03; 364/431.05; 180/197; 123/361
[58] Field of Search ................ 364/426.01, 426.02, 364/426.03, 431.04, 431.05, 431.01, 431.03; 180/197; 123/333, 361, 417, 422

[56] References Cited

U.S. PATENT DOCUMENTS

| | | | |
|---|---|---|---|
| 4,615,410 | 10/1986 | Hosana | 180/197 |
| 4,637,487 | 1/1987 | Nakamura | 180/197 |
| 4,721,176 | 1/1988 | Kabasin et al. | 180/197 |
| 4,722,411 | 2/1988 | Ohashi et al. | 180/197 |
| 4,811,808 | 3/1989 | Matsumoto | 364/426.01 X |
| 4,850,446 | 7/1989 | Leiber | 364/426.03 X |
| 4,856,610 | 8/1989 | Leiber | 364/426.03 X |
| 4,933,857 | 6/1990 | Hashiguchi et al. | 364/426.03 X |
| 5,025,882 | 6/1991 | Ghoneim et al. | 180/197 |
| 5,073,865 | 12/1991 | Togai et al. | 364/431.05 |

FOREIGN PATENT DOCUMENTS

| | | |
|---|---|---|
| 0334370 | 9/1989 | European Pat. Off. . |
| 3728573C1 | 11/1988 | Fed. Rep. of Germany . |
| 3728572AL | 3/1989 | Fed. Rep. of Germany . |
| 3825458A1 | 2/1990 | Fed. Rep. of Germany . |

*Primary Examiner*—Parshotham S. Lall
*Assistant Examiner*—Thomas S. Auchterlonie

[57] ABSTRACT

An engine output controlling system for a vehicle by which a driving torque produced by the engine is utilized effectively and such a possible slip of a driving wheel the vehicle that makes driving of the vehicle difficult. The system detects a slipping condition of the driving wheel, sets an aimed driving torque of the engine in accordance with the slipping condition thus detected, and controls the engine to generate the aimed driving torque thus set and controls the engine to retard the ignition timing thereof when the detected slipping condition is excessively great. The system obtains a slip changing rate of the driving wheel, and sets a retard amount, with which the ignition timing is to be retarded, in accordance with the slip changing rate detected.

3 Claims, 46 Drawing Sheets

FIG.15

| GEAR POSITION | $\rho_{KI}$ | $\rho_{KP}$ | $\rho_{KD}$ |
|---|---|---|---|
| FIRST | 1 | 1 | 1 |
| SECOND | 0.5 | 0.4 | 0.4 |
| THIRD | 0.5 | 0.2 | 0.2 |
| FOURTH | 0.5 | 0.2 | 0.2 |
| BACK | 1 | 0.8 | 0.8 |

FIG. 27(a)
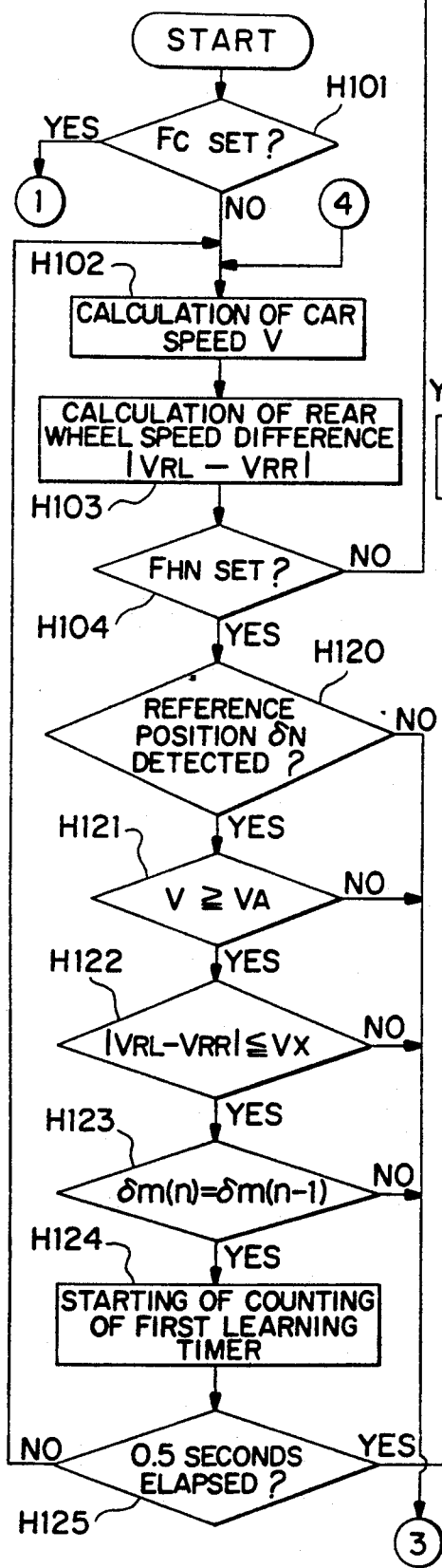
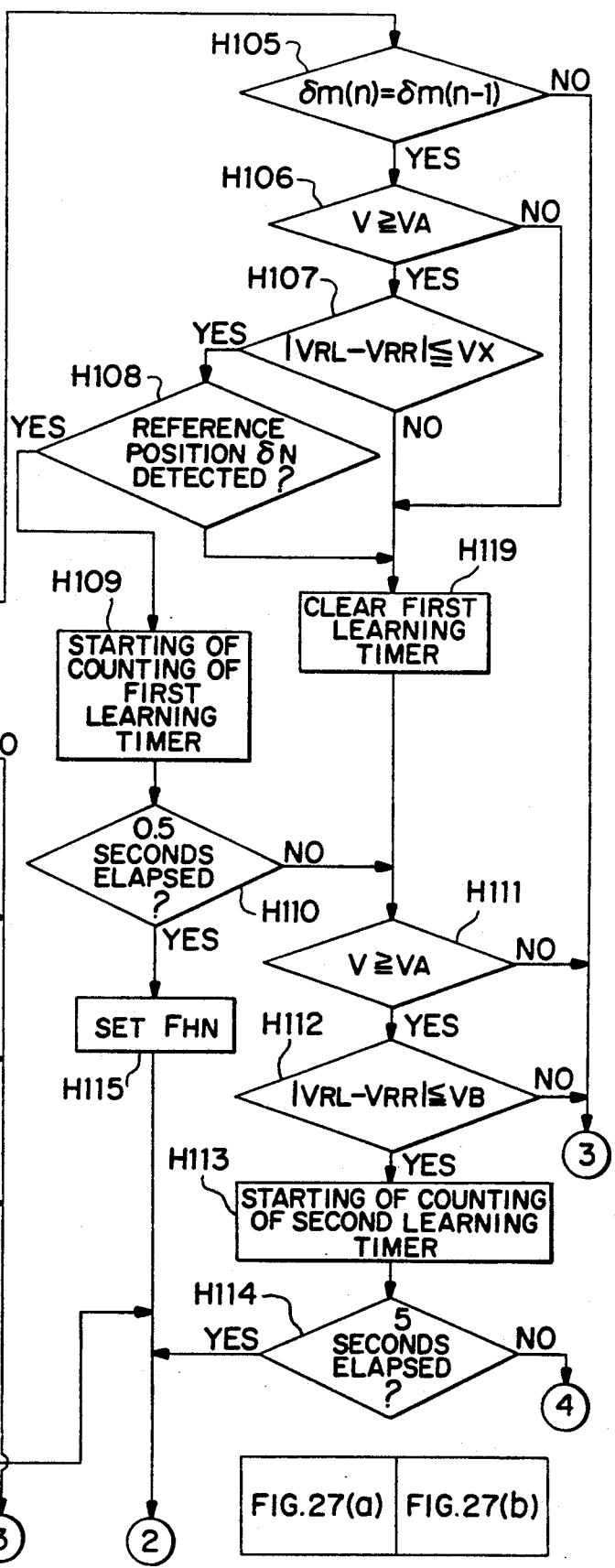

SLIP AMOUNT S (Km/h)

CAR SPEED V (Km/h)

| GEAR POSITION | $\rho_{KI}$ | $\rho_{KP}$ | $\rho_T$ |
|---|---|---|---|
| FIRST | 1.0 | 1.0 | 1.0 |
| SECOND | 0.7 | 0.7 | 1.5 |
| THIRD | 0.7 | 0.7 | 1.5 |
| FOURTH | 0.7 | 0.7 | 1.5 |
| BACK | 1.0 | 1.0 | 1.0 |

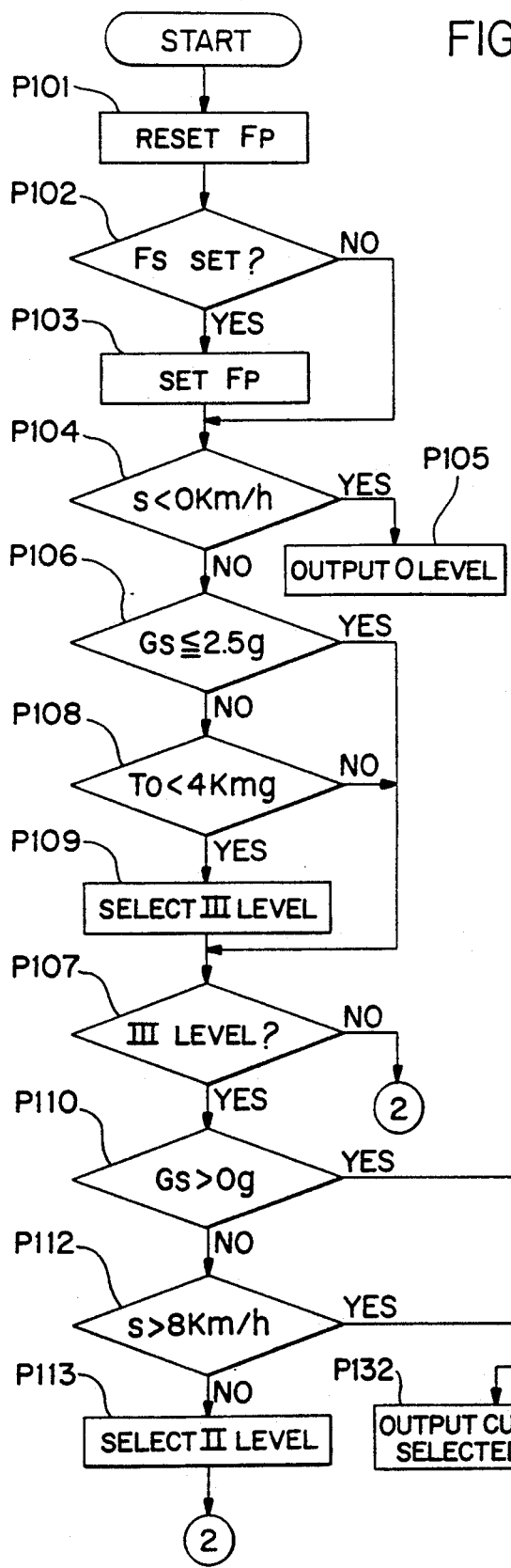
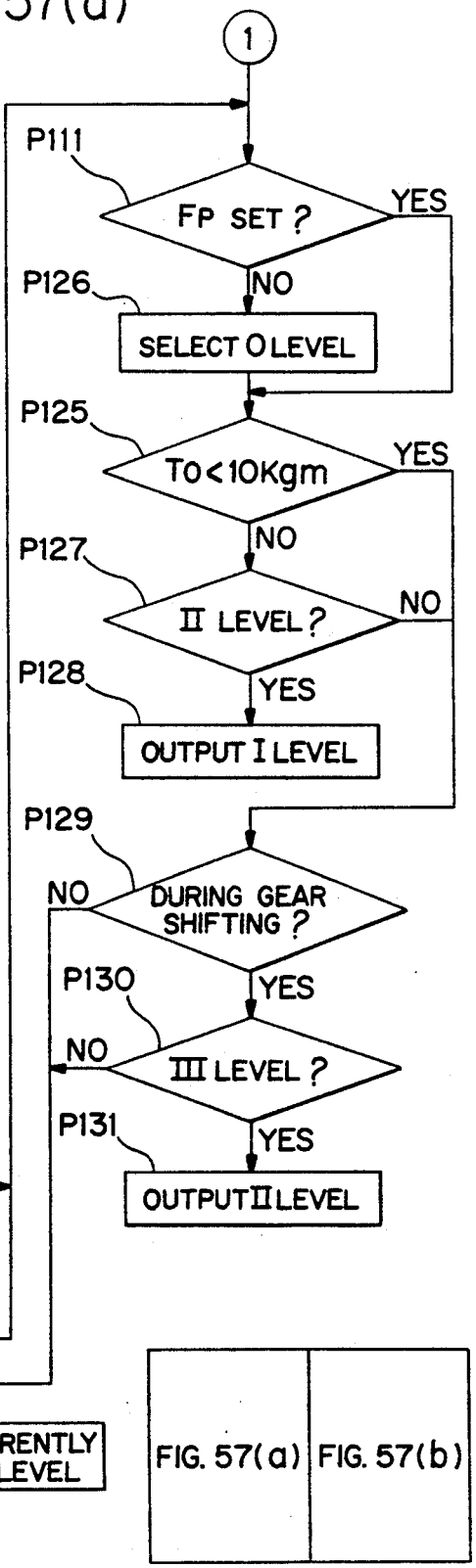
FIG. 57(a)

SYSTEM FOR CONTROLLING ENGINE OUTPUT BASED UPON SLIPPING CONDITION OF A DRIVING WHEEL OF A VEHICLE

BACKGROUND OF THE INVENTION

1. Field of the Invention

This invention relates to an engine output controlling system for a vehicle wherein driving torque of an engine is reduced rapidly in response to an amount of slip of a driving wheel upon acceleration or the like of the vehicle in order to assure safe running of the vehicle.

2. Description of the Prior Art

When the condition of a road on which a vehicle is driving varies suddenly or when a vehicle is driving on a slippery road having a low coefficient of friction such as, for example, a snowy road or a frozen road, it frequently occurs that a driving wheel of the vehicle rotates slipping or in vain.

In such an instance, it is very difficult even for a skilled driver to adjust the amount of operation of an accelerator pedal to control the output power of an engine skillfully so that the driving wheel may not rotate slipping or in vain.

From such circumstances, several improved engine output controlling systems have been proposed, and in an exemplary one of such systems, a slipping condition of a driving wheel is detected and, if the slip of the driving wheel exceeds a predetermined level, then the output power of the engine is reduced compulsorily independently of an amount of operation of the accelerator pedal by the driver. According to such engine output controlling systems, the driver can select, when it is considered necessary, one of driving of the vehicle in which the engine output controlling system is used and normal driving in which the output power of the engine is controlled in response to an amount of operation of the accelerator pedal.

In one of such vehicle engine output controlling systems, a rotational speed of a driving wheel and another rotational speed of a driven wheel are detected and, considering a difference between the rotational speeds as an amount of slip of the driving wheel, the driving torque of the engine is controlled in response to such slip amount. In short, the conventional engine output controlling system presumes a condition of the road in accordance with a variation of the rotating condition of the driven wheel, sets a driving torque which should serve as a reference of the engine corresponding to the condition of the road corrects the thus set driving torque serving as a reference torque in accordance with a difference between rotational speeds of the driving wheel and the driven wheel, and controls torque controlling means so that the driving torque of the engine may be equal to the thus corrected driving torque. The conventional engine output controlling system further sets an aimed driving torque of the engine in accordance with the slip amount detected as above and controls the opening of a throttle valve, the ignition timing and so forth so that the driving torque of the engine may be equal to the aimed driving torque.

With such conventional engine output controlling system for a vehicle as described above, when the increasing tendency of the slip amount of the driving wheel is very high, a retarding operation of an ignition timing which presents a smaller delay in control than opening control of a throttle valve or the like is performed so that the driving torque of the engine may quickly become equal to the aimed driving torque.

In such conventional engine output controlling system for a vehicle, a condition of a road is presumed in accordance with a variation of the rotating condition of the driven wheel as described above. However, the actual road may present any one of very different conditions, and accordingly, it is very difficult as a matter of fact to presume a coefficient of friction of a tire with respect to a road.

Therefore, actually a large number of correction factors must be adopted to specify control requirements, and accordingly, there is the possibility that such disadvantages may take place that the program for the control is complicated, which will cause some delay in control or the cost for a calculating unit is raised.

Meanwhile, in a conventional engine output controlling system wherein an aimed driving torque of an engine is set in accordance with an amount of slip of a driving wheel and a driving condition of the vehicle and then the opening of a throttle valve, the ignition timing or the like is controlled so that the driving torque of the engine may be equal to the aimed driving torque, even when the increasing tendency of the slip amount of the driving wheel is very high, such control as to lower the aimed driving torque to a level for idling or so is not performed fundamentally.

As a result, when a slip of the driving wheel takes place suddenly on ice or the like, it is difficult to suppress the slip rapidly by an ignition timing retarding operation or the like, and accordingly, a considerable delay cannot be avoided at any cost.

In case the driving condition of the vehicle when the increasing tendency of the slip amount of the driving wheel is very high, for example, on ice or the like, is taken into consideration, even if the driving torque of the engine is lowered to a level for idling or so, it is desirable at any rate to suppress the slip rapidly to assure the controllability of the vehicle.

By the way, when a vehicle is driving but not at a very low speed, the driving wheel slips more or less with respect to a road. However, it is well known also by experience that, if a driving torque higher than a frictional force between the road and the driving wheel, then the slip amount of the driving wheel is increased suddenly to make the driving of the vehicle difficult.

SUMMARY OF THE INVENTION

It is an object of the present invention to provide an engine output controlling system for a vehicle by which the driving torque of the engine is controlled so that it may not exceed a maximum value of the frictional force between a road and a driving wheel of the vehicle in order to prevent such a possible slip of the driving wheel that makes the driving of the vehicle difficult while effectively making use of the driving torque produced by the engine.

It is to be noted that, in order to allow the driving torque produced by an engine to operate effectively, it is desirable to adjust the slip amount of a driving wheel so that the slip ratio S of the tire of the driving wheel during driving may have, as shown in FIG. 7 which illustrates a relationship between such slip ratio S and a coefficient of friction between a tire and a road, a value equal to or in the proximity of and lower than an aimed slip ratio $S_O$ corresponding to a maximum value of the coefficient of friction between the tire and the road, so as to eliminate a possible loss of energy and also to prevent possible deterioration of the drivability or acceleration performance of the vehicle.

Here, such slip ratio S of a tire is given by $$S = \frac{V_D - V}{V}$$

where V is a speed of the vehicle (hereinafter referred to only as car speed), and $V_D$ is a circumferential speed of the driving wheel. Thus, the driving torque of the engine should be set such that the slip ratio S may have a value equal to or in the proximity of and lower than an aimed slip ratio $S_O$ corresponding to a maximum value of the coefficient of friction between the tire and the road.

The engine output controlling system for a vehicle according to the present invention has been completed with the foregoing findings in mind. In one aspect of this invention, there is thus provided an engine output controlling system for a vehicle. The system comprises:

slip detecting means for detecting slipping condition of a driving wheel of said vehicle and determining a slip changing rate of said driving wheel on the basis of the slipping condition;

aimed driving torque setting means for setting an aimed driving torque of an engine of said vehicle in accordance with the slipping condition detected by said slip detecting means;

controlling means for controlling said engine to generate the aimed driving torque set by said aimed driving torque setting means and for controlling said engine to retard the ignition timing thereof on the basis of the slip changing rate determined by said slip detecting means.

The aimed driving torque setting means comprises:

acceleration detecting means for detecting a vehicle body acceleration in the advancing direction of said vehicle;

reference driving torque setting means for setting, based on the vehicle body acceleration detected by said acceleration detecting means, a reference driving torque as a reference value for a driving torque to be applied to said driving wheel of said vehicle in order to obtain the vehicle body acceleration;

correction torque setting means for setting, based on the slipping condition detected by said slip detecting means, a correction torque for correcting the reference driving torque; and correction means for correcting the reference driving torque, set by said reference driving torque setting means, by the correction torque set by said correction torque setting means and setting the aimed driving torque of said engine based upon the corrected reference driving torque.

The controlling means controls a throttle valve of said engine in such a way that said throttle value is fully closed when the slip changing rate of said driving wheel determined by said slip detecting means is greater than a first predetermined value and the aimed driving torque set by said aimed driving torque setting means is lower than a second predetermined value.

The aimed driving torque setting means is constructed so as to correct a reference driving torque in accordance with slipping condition of the driving wheel to set an aimed driving torque. Thus, output control of the engine is further executed appropriately.

The controlling means is constructed so as to bring the throttle value to a fully closed position when the slip changing rate is greater than a first predetermined value and the aimed driving torque set by the aimed driving torque setting means is a lower than a second predetermined value. Thus, even if the driving wheel develops such a sudden slip that could dangerously affect the controllability of the vehicle, the slip can therefore be controlled very promptly compared with conventional engine output controlling systems, thereby making it possible to secure the controllability of the vehicle. As long as the aimed driving torque is greater than the second predetermined value, the throttle valve is not fully closed so that, even if the driving wheel undergoes a slip, a driving torque is applied to the driving wheel so as to enable to approach the required driving torque level.

The control means is preferably provided with a throttle valve opening adjusting means so that the engine can be controlled by adjusting the opening of the throttle valve.

Where the vehicle is equipped with an automatic transmission, the controlling means is preferably constructed so as to inhibit, where the automatic transmission is proceeding through a gear shifting operation, the control of bringing the throttle valve to the fully closed position. This can avoid the danger of an extreme reduction of the output power of the engine during the gear shifting operation, whereby a possible stall of the engine can be obviated.

The above and other objects, features and advantages of the present invention will become apparent from the following description and the appended claims, taken in conjunction with the accompanying drawings in which like parts are denoted by like reference characters all through the drawings.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIG. 15 is a map illustrating a relationship between various gear shift positions of the hydraulic automatic transmission and correction coefficients corresponding to different correction torques;

FIGS. 27(a) and 27(b) are a flow chart illustrating a flow of a neutral position learning and correcting operation of a steering shaft and showing a second preferred embodiment of the present invention;

FIG. 32 is a map illustrating a relationship between a car speed and a driving resistance;

FIG. 57(a) and 57(b) are a flow chart illustrating a flow of selecting operation of a retard rate.

DESCRIPTION OF THE PREFERRED EMBODIMENTS

Figure 1:
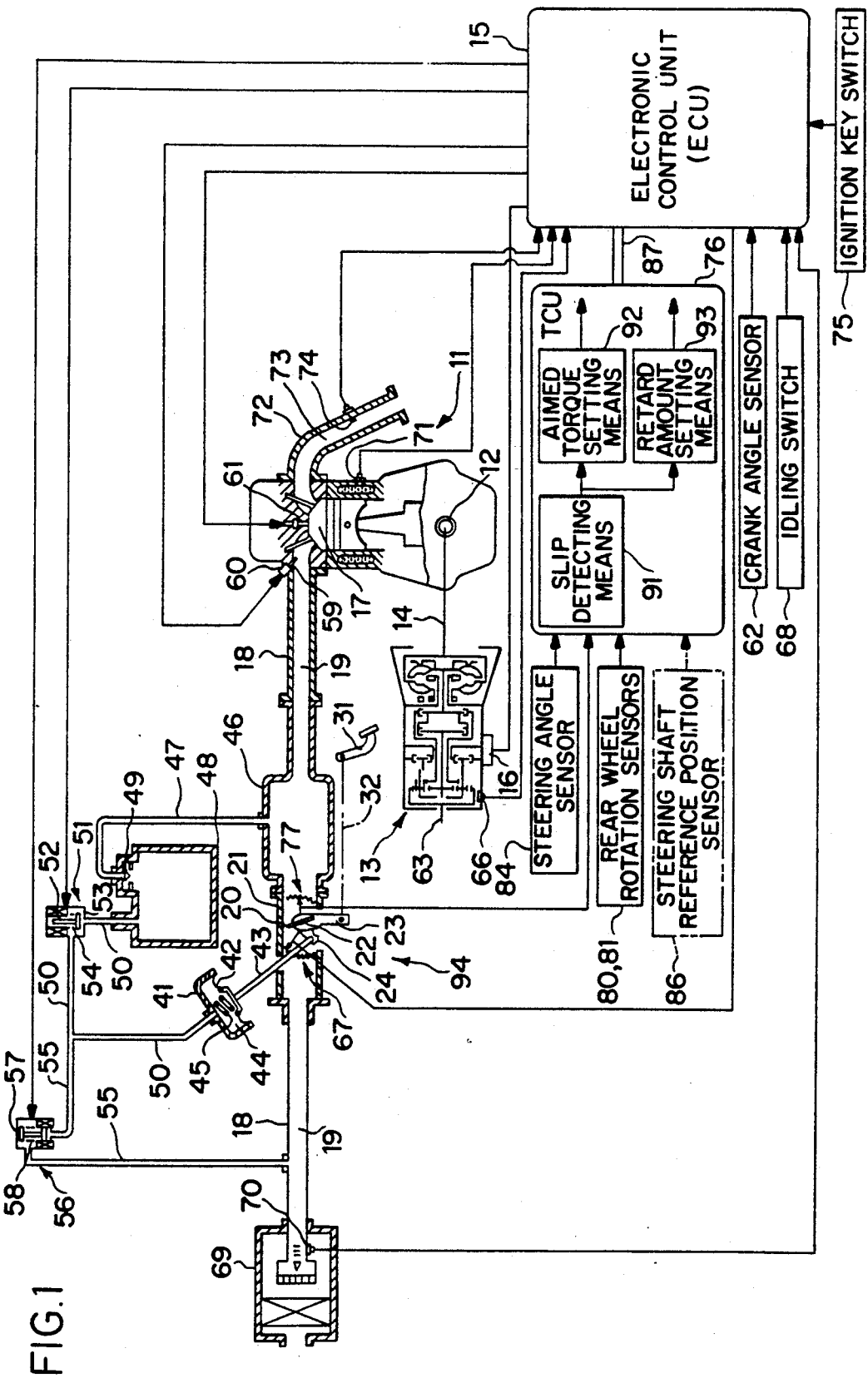
FIG. 1 is a diagrammatic representation of an engine output controlling system applied to a vehicle of the front wheel driving type in which a hydraulic automatic transmission having four gear shift positions for the forward driving and one gear shift position for the rearward driving is incorporated showing a preferred embodiment of the present invention.
Figure 2:
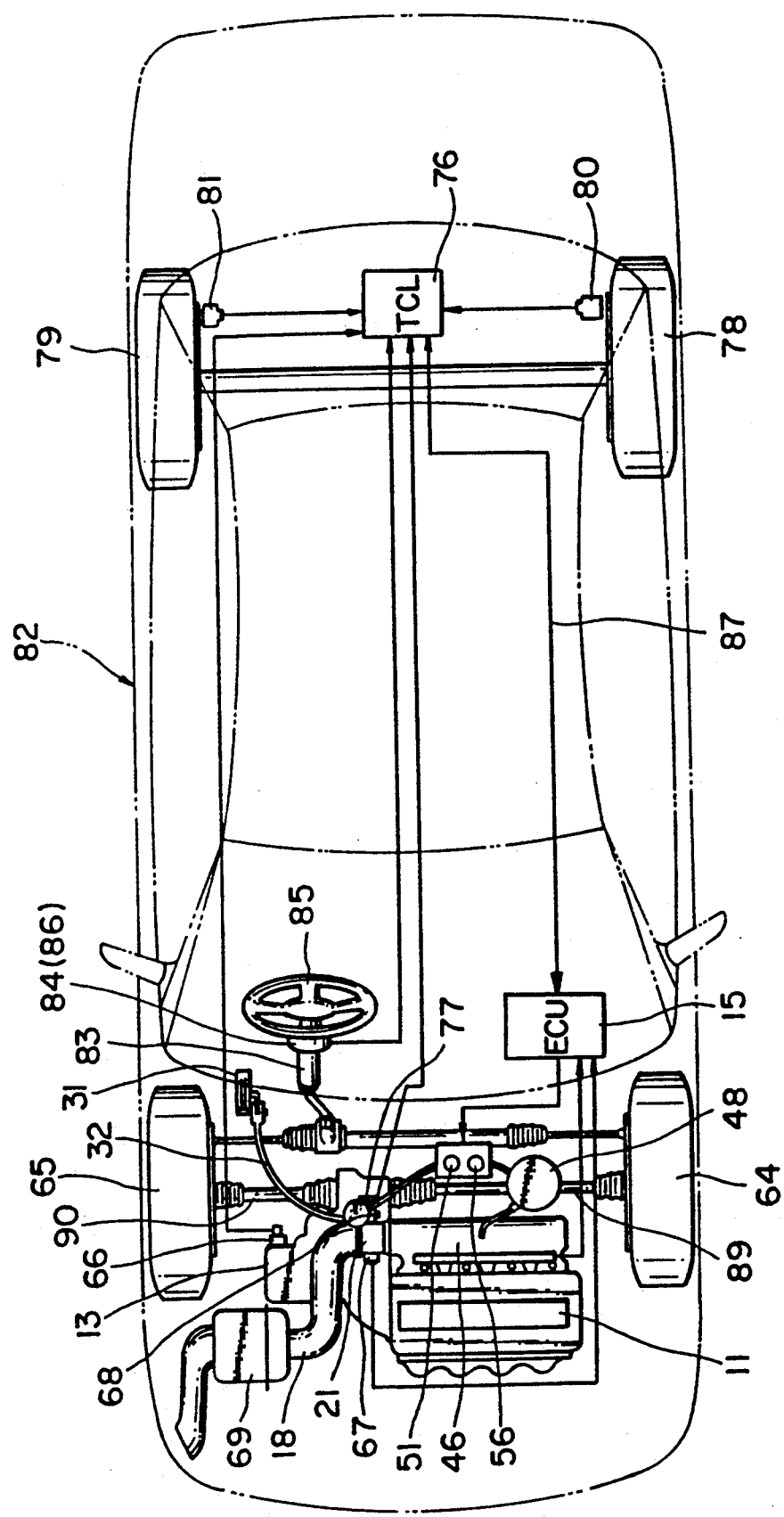
FIG. 2 is a diagrammatic view schematically showing the vehicle in which the driving torque controlling system of FIG. 1 is incorporated.

Referring first to FIGS. 1 and 2, there is shown an engine output controlling system applied to a vehicle of the front wheel driving type in which a hydraulic automatic transmission having four gear shift positions for the forward driving and one gear shift position for the rearward driving is incorporated according to a first preferred embodiment of the present invention.

The vehicle includes an engine 11 having an output shaft 12 to which an input shaft 14 of a hydraulic automatic transmission 13 is connected. The hydraulic automatic transmission 13 is constituted such that one of the available gear shift positions thereof is automatically selected by way of a hydraulic controlling apparatus 16 in response to a position of a select lever (not shown) selected by a driver and also to driving conditions of the vehicle in accordance with an instruction from an electronic control unit (hereinafter referred to briefly as ECU) 15 provided for controlling an operating condition of the engine 11. Detailed construction and operation of the hydraulic automatic transmission 13 are already known in the art and disclosed, for example, in Japanese Patent Laid-Open Application No. 54270/1983 or Japanese Patent Laid-Open Application No. 31749/1986. A pair of shift controlling solenoid valves for performing engaging and disengaging operations of a plurality of friction engaging elements which constitute part of the hydraulic automatic transmission 13 are incorporated in the hydraulic controlling apparatus 16. Then, energization and deenergization of the shift controlling solenoid valves are controlled by the ECU 15 to smoothly effect a gear shifting operation from one to another of the gear shift positions including the four gear shift positions for the forward driving and the one gear shift position for the backward driving.

Figure 3:
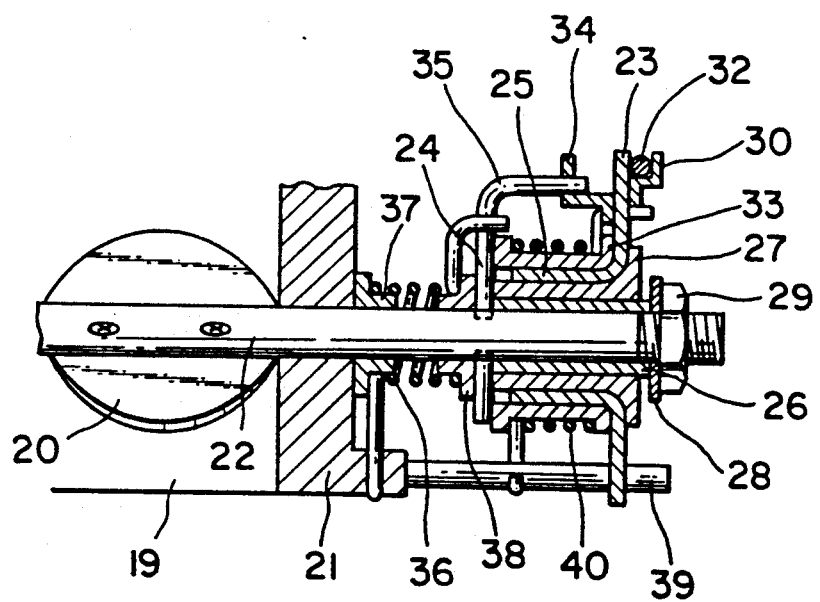
FIG. 3 is a sectional view showing an actuating mechanism for a throttle valve of the automobile shown in FIG. 2.

An intake pipe 18 is connected to a combustion chamber 17 of the engine 11, and a throttle body 21 is interposed intermediately in the intake pipe 18 and has a throttle valve 20 incorporated therein for varying the opening of an intake air passageway 19 formed by the intake pipe 18 to adjust the amount of intake air to be supplied into the combustion chamber 17. As seen in FIG. 1 and also in FIG. 3 which shows an enlarged section of a portion of the throttle body 21 having a tubular shape, a throttle shaft 22 to which the throttle valve 20 is secured integrally is supported at the opposite ends thereof for pivotal motion on the throttle body 21. An accelerator lever 23 and a throttle lever 24 are fitted coaxially at an end portion of the throttle shaft 22 which extends into the intake air passageway 19.

A bush 26 and a spacer 27 are interposed between the throttle shaft 22 and a tubular portion 25 of the accelerator lever 23 so that the accelerator lever 23 may be mounted for pivotal motion around the throttle shaft 22. A washer 28 and a nut 29 are mounted at an end portion of the throttle shaft 22 and prevent the accelerator lever 23 from coming off the throttle shaft 22. An accelerator pedal 31 to be operated by a driver is connected by way of a cable 32 to a cable receiver 30 integrated with the accelerator lever 23 so that the accelerator lever 23 may be pivoted around the throttle shaft 22 in response to an amount of operation of the accelerator pedal 31.

The throttle lever 24 is integrally secured to the throttle shaft 22 so that, when the throttle lever 24 is operated, the throttle valve 20 may be pivoted together with the throttle shaft 22. A collar 33 is fitted coaxially and integrally on the tubular portion 25 of the accelerator lever 23, and a stopper 35 is formed at an end portion of the throttle lever 24 for engaging with a pawl portion 34 formed on the collar 33. The pawl portion 34 and stopper 35 are set in such a positional relationship that they are engaged with each other when the throttle lever 24 is pivoted in a direction in which the throttle valve 20 is opened or when the accelerator lever 23 is pivoted in a direction in which the throttle valve 20 is closed.

A torsion coil spring 36 is mounted coaxially around the throttle shaft 22 between the throttle body 21 and throttle lever 24 and is fitted at the opposite end portions thereof around a pair of tubular spring receivers 37 and 38 fitted on the throttle shaft 22. The torsion coil spring 13 normally biases the throttle lever 24 in a direction in which the stopper 35 of the throttle lever 24 is resiliently pressed against the pawl portion 34 of the collar 33 integrated with the accelerator lever 23 to open the throttle valve 20. Another torsion coil spring 40 is mounted coaxially with the throttle shaft 22 around the tubular portion 25 of the accelerator lever 23 and has an end anchored at the accelerator lever 23 by way of the collar 33 and the other end anchored at a stopper pin 39 which extends from the throttle body 21. The torsion coil spring 40 normally biases the accelerator lever 23 in a direction in which the pawl portion 34 of the collar 33 is resiliently pressed against the stopper 35 of the throttle lever 24 to close the throttle valve 20 thereby to provide a detent feeling to the accelerator pedal 31.

A control bar 43 is secured at a base end thereof to a diaphragm 42 of an actuator 41 and connected at the other end thereof to an end of the throttle lever 24. A compression coil spring 45 is installed in a pressure chamber 44 formed in the actuator 41 and normally biases, together with the torsion coil spring 36, the throttle lever 24 in the direction in which the stopper 35 of the throttle lever 24 is resiliently pressed against the pawl portion 34 of the collar 33 to open the throttle valve 20. The biasing force of the torsion coil spring 40 is set greater than a sum of the biasing forces of the two springs 36 and 45. Consequently, the throttle valve 20 is not opened unless the accelerator pedal 31 is operated.

A surge tank 46 is connected to the downstream side of the throttle body 21 and forms part of the intake air passageway 19. A vacuum tank 48 is communicated with the surge tank 46 by way of a connecting pipe 47, and a check valve 49 is interposed between the vacuum tank 48 and connecting pipe 47 for permitting only movement of air from the vacuum tank 48 into the surge tank 46. Thus, the internal pressure of the vacuum tank 48 is set to a negative pressure substantially equal to a minimum internal pressure of the surge tank 46.

The vacuum tank 48 and the pressure chamber 44 of the actuator 41 are communicated with each other by way of a pipe 50, and a first torque controlling solenoid valve 51 of the type which presents a closing condition when it is not energized is interposed intermediately in the pipe 50. A spring 54 is incorporated in the torque controlling solenoid valve 51 and normally biases a plunger 52 to a valve seat 53 to close the pipe 50.

A pipe 55 is connected to the pipe 50 between the first torque controlling solenoid valve 51 and actuator 41 and communicates with a portion of the intake air passageway 19 on the upstream side of the throttle valve 20. A second torque controlling solenoid valve 56 of the type which presents an opening condition when it is not energized is interposed intermediately in the pipe 55. A spring 58 is installed in the torque controlling solenoid valve 51 and normally biases a plunger 57 to open the pipe 55.

The ECU 15 is connected to the two torque controlling solenoid valves 51 and 56 so that energization of the torque controlling solenoid valves 51 and 56 may be duty controlled in accordance with an instruction from the ECU 15. In the present embodiment, the two torque controlling solenoid valves 51 and 56 and ECU 15 generally constitute throttle valve opening adjusting means 94 for carrying out reduction of the torque.

When the duty ratio of the torque controlling solenoid valves 51 and 56 is, for example, zero percent, the pressure chamber 44 of the actuator 41 presents an atmospheric pressure substantially equal to the internal pressure of the intake air passageway 19 on the upstream side of the throttle valve 20, and consequently, the opening of the throttle valve 20 corresponds one by one to the amount of operation of the accelerator pedal 31. On the contrary, when the duty ratio of the torque controlling solenoid valves 51 and 56 is 100 percent, the pressure chamber 44 of the actuator 41 presents a negative pressure substantially equal to the internal pressure of the vacuum tank 48, and consequently, the control bar 43 is pulled up obliquely leftwardly in FIG. 1. As a result, the throttle valve 20 is closed independently of an amount of operation of the accelerator pedal 31, and the driving torque of the engine 11 presents a compulsorily reduced condition. By adjusting the duty ratio of the torque controlling solenoid valves 51 and 56 in this manner, the opening of the throttle valve 20 can be varied to arbitrarily adjust the driving torque of the engine 11 independently of an amount of operation of the accelerator pedal 31.

While the opening of the throttle valve 20 is controlled simultaneously in response to the accelerator pedal 31 and the actuator 41 in the present embodiment, it is also possible to dispose two throttle valves in series in the intake air passageway 19 and connect one of the two throttle valves only to the accelerator pedal 31 while the other throttle valve is connected only to the actuator 41 so that the two throttle valves may be controlled independently of each other.

In the meantime, fuel injection nozzles 59 of a fuel injection system not shown for injecting fuel into the combustion chambers 17 of the engine 11 are provided on the downstream end side of the intake pipe 18 corresponding to cylinders of the engine 11 (which is assumed to be, in the present embodiment, a four-cylinder internal combustion engine), and fuel is supplied into the fuel injection nozzles 59 by way of respective solenoid valves 60 which are duty controlled by the ECU 15. In short, by controlling the opening time of the solenoid valves 60, the amount of fuel to be supplied into each combustion chamber 17 is adjusted and the fuel thus supplied is ignited at a predetermined air fuel ratio in the combustion chamber 17 by an ignition plug 61.

Various sensors are connected to the ECU 15 including a crank angle sensor 62 attached to the engine 11 for detecting an engine rotational speed, a front wheel rotation sensor 66 for detecting a rotational speed of an output shaft 63 of the hydraulic automatic transmission 13 from which an average circumferential speed of a pair of left and right front wheels 64 and 65 of the vehicle which serve as driving wheels is to be calculated, a throttle opening sensor 67 attached to the throttle body 21 for detecting an opening of the throttle lever 24, an air flow sensor 70 such as a Karman's vortex street flow meter assembled in an air cleaner 69 at an end portion of the intake pipe 18 for detecting an amount of air flowing to the combustion chamber 17 of the engine 11, a water temperature sensor 71 assembled to the engine 11 for detecting a temperature of cooling water of the engine 11, and an exhaust air temperature sensor 74 assembled intermediately of an exhaust air pipe 72 for detecting a temperature of exhaust gas flowing in an exhaust air passageway 73. Also an idling switch 68 for detecting a fully closed condition of the throttle valve 20 and an ignition key switch 75 are connected to the ECU 15.

Output signals of the crank angle sensor 62, front wheel rotation sensor 66, throttle opening sensor 67, idling switch 68, air flow sensor 70, water temperature sensor 71, exhaust air temperature sensor 74 and ignition key switch 75 are thus sent to the ECU 15.

A torque calculating unit (hereinafter referred to as TCL) 76 is also provided for calculating an aimed driving torque of the engine 11. Several sensors are connected to the TCL 76 including an accelerator opening sensor 77 attached to the throttle body 21 together with the throttle opening sensor 67 and idling switch 68 for detecting an opening of the accelerator lever 23, a pair of rear wheel rotation sensors 80 and 81 for detecting rotational speeds of a pair of left and right rear wheels 78 and 79, respectively, of the vehicle which serve as driven wheels, and a steering angle sensor 84 for detecting a turning angle of a steering shaft 83 when the vehicle 82 turns with reference to a position of the steering shaft 83 when the vehicle 82 is advancing straightforwardly. Output signals from the sensors 77, 80, 81, 84 and 86 are thus sent to the TCL 76.

The ECU 15 and TCL 76 are interconnected by way of a communication cable 87, and information of an operating condition of the engine 11 including an engine rotational speed, a rotational speed of the output shaft 63 of the hydraulic automatic transmission 13 and a detection signal from the idling switch 68 is sent from the ECU 15 to the TCL 76. To the contrary, information regarding an aimed driving torque calculated by aimed driving torque setting means 92 of the TCL 76 and a retard ratio of an ignition timing calculated by retard amount setting means 93 of the TCL 76 is sent from the TCL 76 to the ECU 15.

In the present embodiment, an aimed driving torque of the engine 11 when, in case an amount of slip of the front wheels 64 and 65 serving as driving wheels in an advancing direction of the vehicle 82 as detected by slip detecting means 91 of the TCL 76 exceeds a preset amount, control for lowering the driving torque of the engine 11 to assure the drivability of the vehicle 82 and prevent a possible energy loss (such control will be hereinafter referred to as slip control) is effected and another aimed driving torque of the engine 11 when, in case an acceleration which is produced with the vehicle 82 during turning movement and acts in a lateral direction (such acceleration will be hereinafter referred to as lateral acceleration) exceeds a preset level, control for lowering the driving torque of the engine 11 to prevent the vehicle from deviating from the turning path (such control will be herein after referred to as turning control) is effected are calculated by the TCL 76, and one of the two aimed driving torques is selected as an optimum final aimed driving torque, and then the driving torque of the engine 11 is reduced in accordance with the final aimed driving torque when it is considered necessary. Further, an aimed retard amount of an ignition timing is set taking such case into consideration that reduction of the output of the engine 11 may not take place in time even by a fully closing operation of the throttle valve 20 by way of the actuator 41, so that the driving torque 11 can be reduced rapidly.

Figure 4:
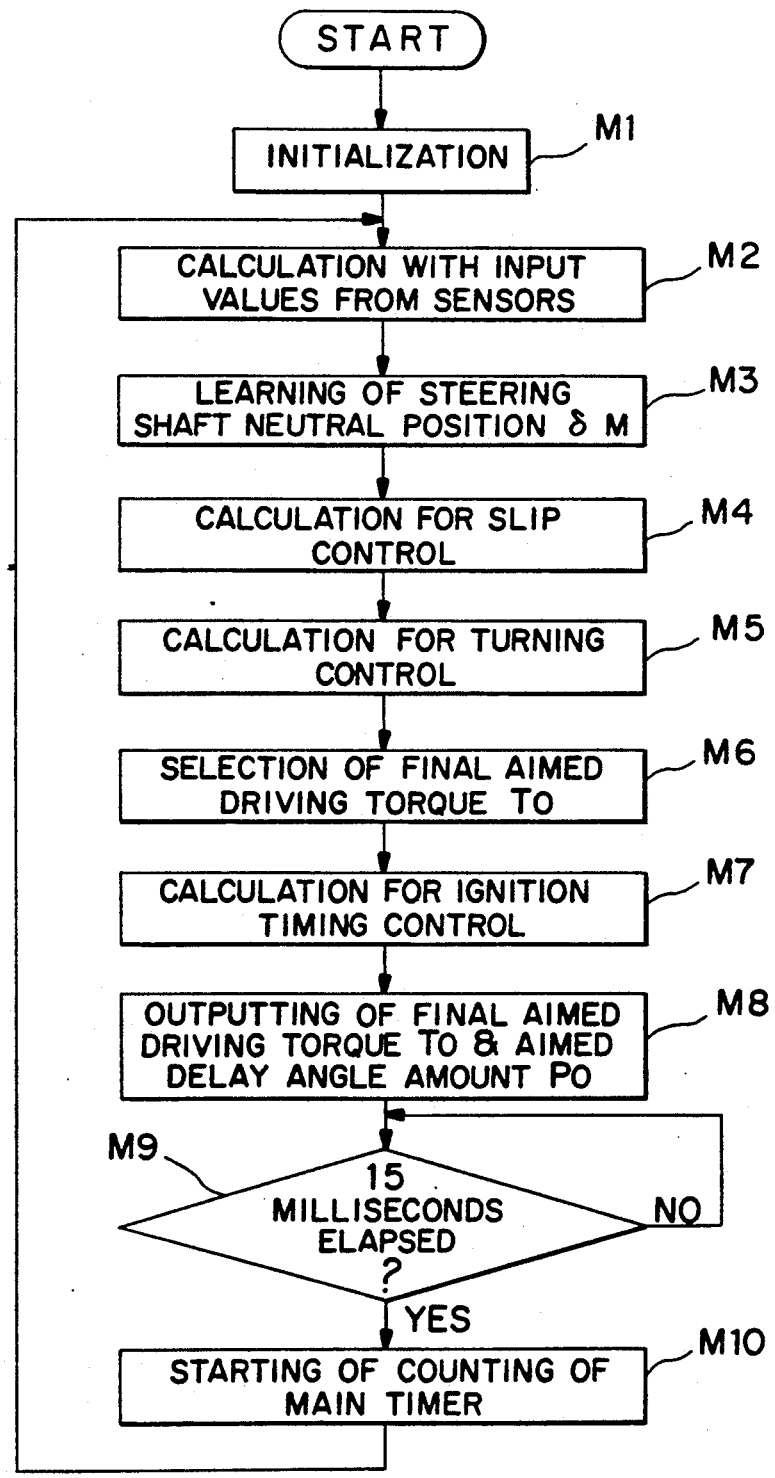
FIG. 4 is a flow chart illustrating a general flow of operations of the engine output controlling system of FIG. 1.

A general flow of operations of control with the engine output controlling system of the embodiment described above is illustrated in FIG. 4. Referring to FIG. 4, in the embodiment shown, an aimed driving torque $T_{OS}$ of the engine 11 with which slip control is to be executed and another aimed driving torque $T_{OC}$ with which turning control is to be executed are normally calculated in a parallel relationship by the TCL 76, and one of such two aimed driving torques $T_{OS}$ and $T_{OC}$ is selected as an optimum final aimed driving torque $T_O$ so that the driving torque 11 may be reduced in accordance with the necessity.

In particular, the control program of FIG. 4 is started in response to an operation of the ignition key switch 75 of the vehicle to switch on, and first at step M1 after the control is entered, initialization of the system is executed including reading in of an initial value $\delta_{m(0)}$ of the turning position of the steering shaft 83, resetting of various flags and starting of a counting operation of a main timer which counts for each 15 milliseconds which make a sampling period of the present control.

Then at step M2, the TCL 76 executes necessary calculations of a car speed V and so forth in accordance with detection signals received from the various sensors. Then at step M3, a neutral position $\delta_M$ of the steering shaft 83 is learned and corrected. Since such neutral position $\delta_M$ of the steering shaft 83 of the vehicle 82 is not stored in advance in a memory (not shown) in the ECU 15 nor in the TCL 76, an initial value $\delta_{m(0)}$ of the same is read in each time the ignition key switch 75 is operated to be switched on, and such neutral position $\delta_M$ is learned and corrected only when the vehicle 68 satisfies straightforward advancement conditions which will be hereinafter described until the ignition key switch 75 is operated to be switch off.

Subsequently at step M4, the TCL 76 calculates, in accordance with a detection signal from the front wheel sensor 66 and detection signals from the rear wheel rotation sensors 80 and 81, an aimed driving torque $T_{OS}$ for use when slip control is to be executed to control the driving torque of the engine 11. Then at step M5, another aimed torque $T_{OC}$ of the engine 11 for use when turning control is to be executed to control the driving torque of the engine 11 is calculated in accordance with detection signals from the rear wheel rotation sensors 80 and 81 and a detection signal from the steering angle sensor 84.

Then at step M6, the TCL 76 selects one of the aimed driving torques $T_{OS}$ and $T_{OC}$ as an optimum final aimed driving torque $T_O$ in accordance with a method which will be hereinafter described mainly taking the safety into consideration. Then, since there is the possibility that, when the vehicle 82 starts suddenly or in such a case that the road condition suddenly changes from a normal dry road to a frozen road, reduction of the output of the engine 11 may not take place in time even by a fully closing operation of the throttle valve 20 by way of the actuator 41, a retard rate with which a fundamental retard amount $P_B$ is to be corrected is selected at step M7 in accordance with a changing rate GS of the amount S of slip of the front wheels 64 and 65. Then at step M8, the TCL 76 outputs data regarding the final aimed driving torque $T_O$ and the retard rate of the fundamental retard amount $P_B$ to the ECU 15.

Then, when the driver operates a manually operable switch (not shown) intending to effect slip control or turning control, the ECU 15 controls the duty ratio of the pair of torque controlling solenoid valves 51 and 56 so that the driving torque of the engine 11 may be equal to the final aimed driving torque $T_O$, calculates an aimed retard amount $P_O$ in accordance with data regarding the retard rate of the fundamental retard amount $P_B$, and retards the ignition timing P by the aimed retard amount $P_O$ in accordance with the necessity, thereby allowing the vehicle 82 to drive reasonably with safety.

On the other hand, when the driver does not operate such manually operable switch (not shown) intending not to effect slip control nor turning control, the ECU 15 sets the duty ratio of the pair of torque controlling solenoid valves 51 and 56 to the 0% side, and consequently, the vehicle 82 remains in a normal driving condition wherein the output of the engine 11 corresponds to an amount of operation of the accelerator pedal 31 by the driver.

The driving torque of the engine 11 is controlled in this manner until counting down of the main timer for 15 milliseconds as the sampling period to zero is completed at step M9. After then, the operations at the steps from M2 to M10 are repeated until the ignition key switch 75 is operated to be switched off.

By the way, when turning control is executed to calculate an aimed driving torque $T_{OC}$ of the engine 11 at step M5, the TCL 76 calculates a car speed V in accordance with the following expression (1) from detection signals from the pair of rear wheel rotation sensors 80 and 81 and also calculates a steering angle $\delta$ of the front wheels 64 and 65 in accordance with the following expression (2) from a detection signal from the steering angle sensor 84, and then calculates an aimed lateral acceleration $G_{YO}$ of the vehicle 82 then in accordance with the following expression (3):

$$V = \frac{V_{RL} + V_{RR}}{2} \quad (1)$$

$$\delta = \frac{\delta_H}{\rho_H} \quad (2)$$

$$G_{YO} = \frac{\delta}{l \cdot \left(A + \frac{1}{V^2}\right)} \quad (3)$$

where $V_{RL}$ and $V_{RR}$ are circumferential speeds of the pair of left and right rear wheels 78 and 79, respectively (such speed will be hereinafter referred to as rear wheel speed), $\rho_H$ is a steering gear reduction ratio, $\delta_H$ is a turning angle of the steering shaft 83, l is a wheel base of the vehicle 82, and A is a stability factor of the vehicle 82 which will be hereinafter described.

As apparently seen from the expression (3) above, if the neutral position $\delta_M$ is varied when toe-in adjustment of the front wheels 64 and 65 is performed for the maintenance and repair of the vehicle 82 or due to aging such as abrasion of a steering gear wheel not shown, then a displacement takes place between a turning position $\delta_m$ of the steering shaft 83 and an actual steering angle $\delta$ of the front wheels 64 and 65 serving as steering wheels. As a result, there is the possibility that it becomes impossible to calculate an aimed lateral acceleration $G_{YO}$ of the vehicle 82 accurately, and also it becomes difficult to assure appropriate turning control. Besides, from such a reason that, in the engine output controlling system, the reference driving torque of the engine 11 is corrected, upon slip control at step M4, in accordance with a turning angle $\delta_H$ of the steering shaft 83 by cornering drag correcting means which will be hereinafter described, there is the possibility that such slip control may not be executed well. Therefore, the neutral position $\delta_M$ of the steering shaft 83 must necessarily be learned and corrected at step M3.

Figure 5:
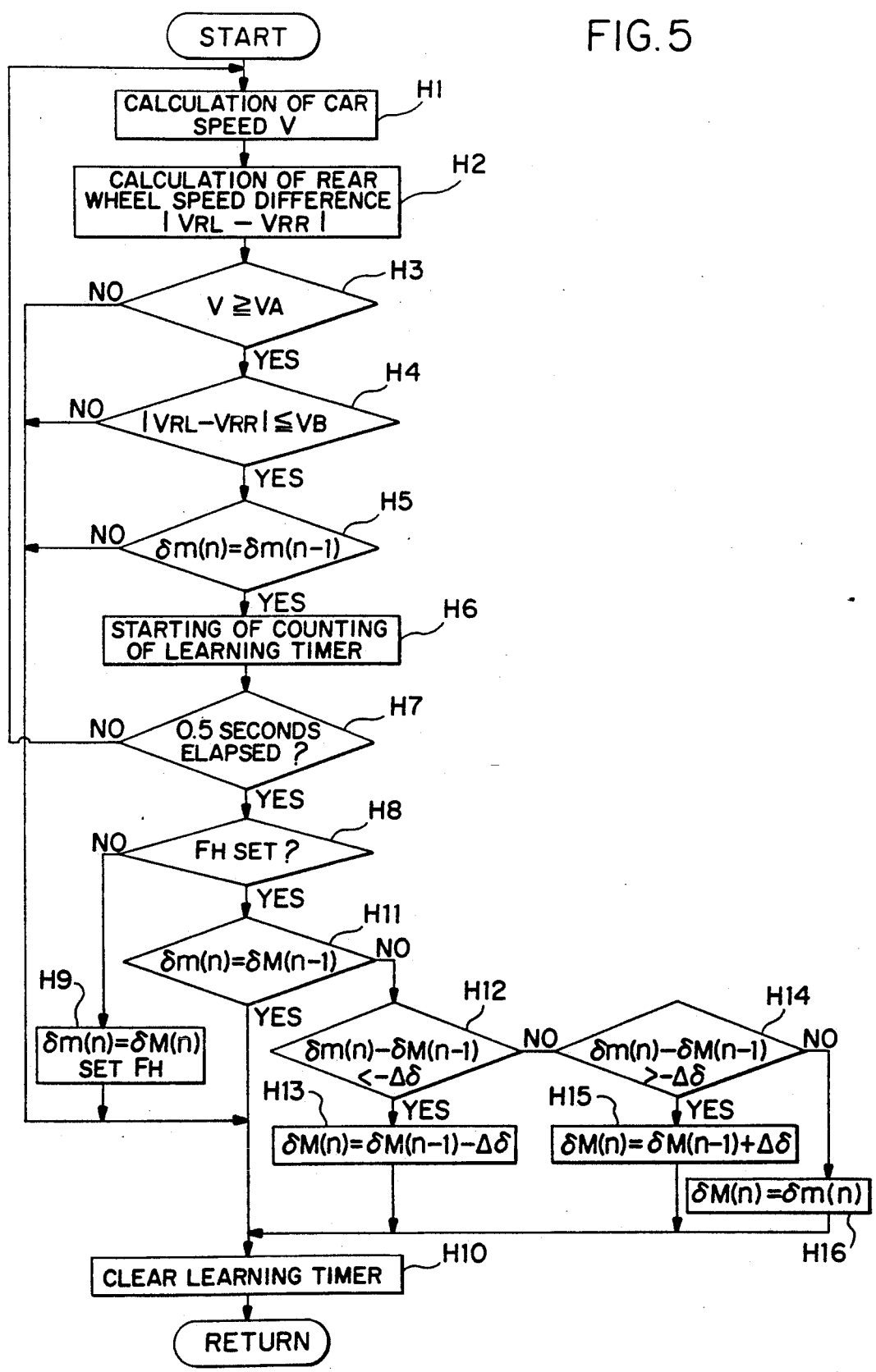
FIG. 5 is a flow chart illustrating a detailed flow of neutral position learning and correcting control for a steering shaft in the flow chart of FIG. 4.

A detailed procedure of learning and correcting the neutral position $\delta_M$ of the steering shaft 83 in the present embodiment is illustrated in FIG. 5. Referring to FIG. 5, the TCL 76 calculates, at step H1, a car speed V for learning of the steering shaft neutral position $\delta_M$ and also for turning control which will be hereinafter described from detection signals from the rear wheel rotation sensors 80 and 81 in accordance with the expression (1) given hereinabove.

Then at step H2, the TCL 76 calculates a difference between the rear wheel speeds $V_{RL}$ and $V_{RR}$, that is, $|V_{RL}-V_{RR}|$ (such difference will be hereinafter referred to as rear wheel speed difference).

After then, the TCL 76 judges at step H3 whether or not the car speed V is equal to or higher than a preset threshold value $V_A$. Such operation is required because a rear wheel speed difference $|V_{RL}-V_{RR}|$ or the like involved in steering cannot be detected unless the speed of the vehicle 82 rises to a certain degree, and the threshold value $V_A$ mentioned above is set suitably, for example, to 10 km per hour by experiments or the like in accordance with driving characteristics of the vehicle 82.

Then, in case it is judged at step H3 that the car speed V is equal to or higher than the threshold value $V_A$, the TCL 76 judges at step H4 whether or not the rear wheel speed difference $|V_{RL}-V_{RR}|$ is equal to or smaller than a preset threshold value $V_B$ such as, for example, 0.3 km per hour, that is, whether or not the vehicle 82 is in a straightforwardly advancing condition. Here, the reason why the threshold value $V_B$ is not set to 0 km per hour is that it is intended to prevent such a possible erroneous judgment when the pneumatic pressures of the tires of the left and right rear wheels 78 and 79 are not equal to each other that, although the vehicle 82 is in a straightforwardly advancing condition, the vehicle 82 is not in a straightforwardly advancing condition because the pair of left and right rear wheels 78 and 79 present different circumferential speeds $V_{RL}$ and $V_{RR}$.

If it is judged at step H4 that the rear wheel speed difference $|V_{RL}-V_{RR}|$ is equal to or smaller than the threshold value $V_B$, then the TCL 76 judges at subsequent step H5 whether or not a current steering shaft turning position $\delta_{m(n)}$ is equal to a preceding steering shaft turning position $\delta_{m(n-1)}$ detected by the steering angle sensor 84. In this instance, it is desirable that the resolution in detection of a turning angle of the steering shaft 83 by the steering angle sensor 84 is set, for example, to 5 degrees or so in order to eliminate or minimize a possible influence of inadvertent movement of a hand of the driver and so forth.

In case it is judged at step H5 that the current steering shaft turning position $\delta_{m(n)}$ is equal to the preceding steering shaft turning position $\delta_{m(n-1)}$, the TCL 76 determines that the vehicle 82 is currently in a straightforwardly advancing condition and counts up or increments, at step H6, the count value of a learning timer (not shown) built in the TCL 76. Such counting is continued, for example, for a period of 0.5 seconds.

To this end, the TCL 76 judges subsequently at step H7 whether or not the period of 0.5 seconds has elapsed after starting of the counting operation of the learning timer. In this instance, at an initial stage of driving of the vehicle 82, the period of 0.5 seconds has not yet elapsed after starting of counting of the learning timer, and accordingly, the control sequence returns to step H1 to repeat the operations at steps H1 to H7.

Then, if it is judged at step H7 that the period of 0.5 seconds has elapsed after starting of counting of the learning timer, the TCL 76 judges at subsequent step H8 whether or not a steering angle neutral position learning completion flag $F_H$ is in a set state, or in other words, whether or not the current learning control cycle is the first control cycle.

If it is judged at step H8 that the steering angle neutral position learning completion signal $F_H$ is not in a set state, the TCL 76 determines, at step H9, the current steering shaft turning position $\delta_{m(n)}$ as a new neutral position $\delta_{M(n)}$ of the steering shaft 83, reads the same into a memory thereof, and then sets the steering angle neutral position learning completion flag $F_H$.

After the new neutral position $\delta_{M(n)}$ of the steering shaft 83 is set in this manner, a turning angle $\delta_H$ of the steering shaft 83 is calculated with reference to the thus set neutral position $\delta_{M(n)}$ of the steering shaft 83 while a count value of the learning timer is cleared at step H10 so that learning of a steering angle neutral position may be executed again.

In case it is judged at step H8 that the steering angle neutral position learning completion flag $F_H$ is in a set state, that is, current learning of a steering angle neutral position is learning for the second or third time or so, the TCL 76 judges at step H11 whether or not the current steering shaft turning position $\delta_{m(n)}$ is equal to a preceding neutral position $\delta_{M(n-1)}$ of the steering shaft 83, that is, $$\delta_{m(n)}=\delta_{M(n-1)}.$$

Then, if it is judged that the current steering wheel turning position $\delta_{m(n)}$ is equal to the preceding neutral position $\delta_{M(n-1)}$ of the steering shaft 83, then the control sequence returns directly to step H10 to execute subsequent learning of a steering angle neutral position.

If it is judged at step H11 that the current steering shaft turning position $\delta_{m(n)}$ is not equal to the preceding neutral position $\delta_{M(n-1)}$ of the steering shaft 83 due to a play of a steering system or the like of the vehicle, then the current steering shaft turning position $\delta_{m(n)}$ is not yet determined as a new neutral position $\delta_{M(n)}$ of the steering shaft 83, but a preset correction limit amount $\Delta\delta$ of 5% or so which corresponds, for example, to a detecting resolution of the steering angle sensor 84 is subtracted from or added to the preceding neutral position $\delta_{m(n-1)}$ of the steering shaft 83 to determine a new neutral position $\delta_{M(n)}$ of the steering shaft 83. The new neutral position $\delta_{M(n)}$ of the steering shaft 83 thus obtained is read into the memory of the TCL 76.

In short, the TCL 76 judges at step H12 whether or not a value obtained by subtraction of the preceding neutral position $\delta_{M(n-1)}$ of the steering shaft 83 from the current steering shaft turning position $\delta_{m(n)}$ is smaller than a preset negative correction limit amount $-\Delta\delta$. Then, if it is judged at step H12 that the difference value calculated by such subtraction is smaller than the negative correction limit amount $-\Delta\delta$, then the new neutral position $\delta_{M(n)}$ of the steering shaft 83 is changed, at step H13, with the preceding neutral position $\delta_{M(n-1)}$ of the steering shaft 83 and the negative correction limit amount $-\Delta\delta$ to $$\delta_{M(n)}=\delta_{M(n-1)}-\Delta\delta$$

so that the learning correction amount for each control cycle may not unconditionally increase toward the negative side.

Consequently, even if an extraordinary detection signal is received from the steering angle sensor 84 by some causes, the neutral position $\delta_M$ of the steering shaft 83 does not vary suddenly, and accordingly, a countermeasure to such trouble can be taken rapidly.

On the other hand, in case it is judged at step H12 that the difference value is equal to or greater than the negative correction limit amount $-\Delta\delta$, it is judged subsequently at step H14 whether or not the difference value obtained by subtraction of the preceding neutral position $\delta_{M(n-1)}$ of the steering shaft 83 from the current steering shaft turning position $\delta_{M(n)}$ is greater than the positive correction limit amount $\Delta\delta$. Then, if it is judged at step H14 that the difference value is greater than the positive correction limit amount $\Delta\delta$, the new neutral position $\delta_{M(n)}$ of the steering shaft 83 is changed, at step H15, with the preceding neutral position $\delta_{M(n-1)}$ of the steering shaft 83 and the positive correction limit amount $\Delta\delta$ to $$\delta_{M(n)} = \delta_{M(n-1)} + \Delta\delta$$

so that the learning correction amount for each control cycle may not unconditionally increase toward the positive side.

Consequently, even if an extraordinary detection signal is developed from the steering angle sensor 84 by some causes, the neutral position $\delta_M$ of the steering shaft 83 will not change suddenly, and accordingly, a countermeasure to such trouble can be taken rapidly.

On the other hand, in case it is judged at step H14 that the difference value is equal to or smaller than the positive correction limit amount $\Delta\delta$, the current steering shaft turning position $\delta_{m(n)}$ is determined as a new neutral position $\delta_{M(n)}$ and is read out as it is at step H16.

After the neutral position $\delta_M$ of the steering shaft 83 is learned and corrected in this manner, an aimed driving torque $T_{OS}$ for use when slip control for restricting the driving torque of the engine 11 is to be executed is calculated in accordance with a detection signal from the front wheel rotation sensor 66 and detection signals from the rear wheel rotation sensors 80 and 81.

In the present embodiment, an aimed circumferential speed of the front wheels 64 and 65 (such speed will be hereinafter referred to as aimed front wheel speed for reference torque calculation) $V_{FO}$ is calculated from detection signals from the rear wheel rotation sensors 80 and 81, and then a changing rate $G_{FO}$ of the aimed front wheel speed $V_{FO}$ for reference torque calculation (such changing rate will be hereinafter referred to as aimed front wheel acceleration) is calculated, whereafter a reference driving torque $T_B$ of the engine 11 corresponding to a magnitude of the aimed front wheel acceleration $G_{FO}$ is corrected in accordance with a difference s between an actual front wheel speed $V_F$ detected from the front wheel rotation sensor 66 and the aimed front wheel speed $V_{FO}$ for reference torque calculation (such difference s will be hereinafter referred to as amount of slip or slip amount) to determine an aimed driving torque $T_{OS}$.

Figure 6:
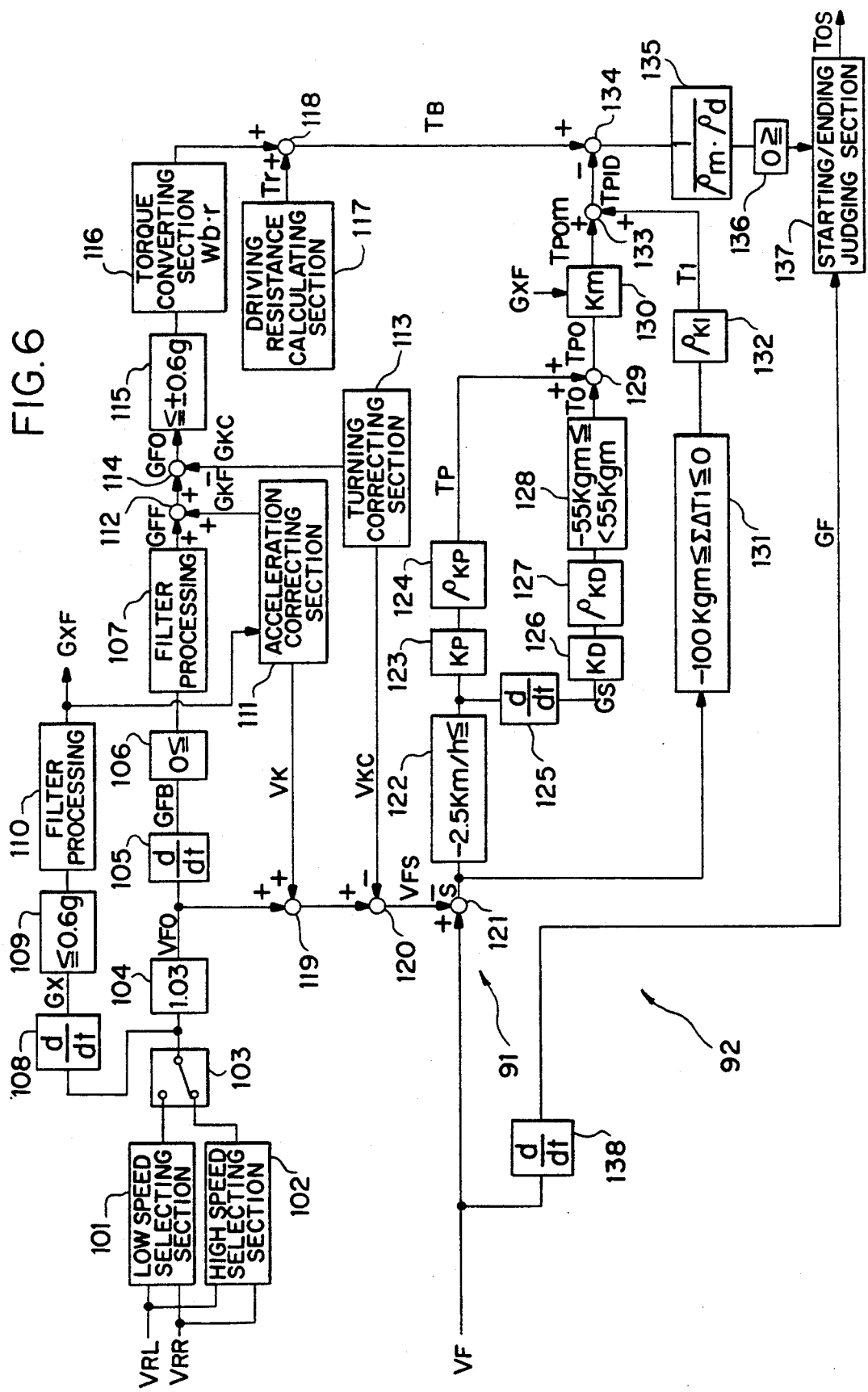
FIG. 6 is a block diagram illustrating a calculating procedure of an aimed driving torque for slip control.

Such calculation of an aimed driving torque $T_{OS}$ of the engine 11 is executed by such aimed driving torque setting means 92 provided in the TCL 76 as shown by a calculation block in FIG. 6. Referring to FIG. 6, the TCL 76 first calculates a car speed V from detection signals from the rear wheel rotation sensors 80 and 81.

In particular, in the present embodiment, a low speed selecting section 101 selects a lower one of the two rear wheel speeds $V_{RL}$ and $V_{RR}$ as a car speed V while a high speed selecting section 102 selects a higher one of the two rear wheel speeds $V_{RL}$ and $V_{RR}$ as a car speed V, and either one of outputs of the selecting sections 101 and 102 is selected by means of a change-over switch 103.

More particularly, in a condition wherein the driving torque of the engine 11 is actually being reduced by rear wheel speed slip control, that is, in a condition wherein a slip control flap $F_S$ is in a set state, a smaller one of the two rear wheel speeds $V_{RL}$ and $V_{RR}$ is selected as a car speed V by the change-over switch 103. To the contrary, in another condition wherein the driving torque of the engine 11 is not being reduced even if the driver desires slip control, that is, in a condition wherein the slip control flag $F_S$ is in a reset state, a higher one of the two rear wheel speed $V_{RL}$ and $V_{RR}$ is selected as a car speed V.

This is because it is intended to make it difficult to achieve a change from a condition wherein the driving torque of the engine is not being reduced to another condition wherein the driving torque of the engine 11 is being reduced and also to make it difficult to make a reverse change. For example, in case a smaller one of the two rear wheel speeds $V_{RL}$ and $V_{RR}$ is selected as a car speed V during turning of the vehicle 82, such a trouble is eliminated that it is judged erroneously that a slip takes place although no slip takes place with either one of the front wheels 64 and 65 and consequently the driving torque of the engine 11 is reduced relying upon such erroneous judgment. Further, taking the driving safety of the vehicle 82 into consideration, once the driving torque of the engine 11 is reduced, attention is paid so that such condition may be continued.

Subsequently, a reference front wheel acceleration $G_{FB}$ is calculated in accordance with the car speed V. In this instance, however, since it is a normal condition during driving of the vehicle 82 that a slip amount of 3% or so normally takes place with the front wheels 64 and 65 serving as driving wheels with respect to a road, an aimed front wheel speed $V_{FO}$ is set, taking such slip amount into consideration, in accordance with the following expression (4) at a multiplying section 104:

$$V_{FO} = 1.03 \cdot V \tag{4}$$

Then, a reference front wheel acceleration $G_{FB(n)}$ for the n-th sampling cycle is calculated at a differentiating section 105 in accordance with the following expression (5):

$$G_{FB(n)} = \frac{V_{FO(n)} - V_{FO(n-1)}}{3.6 \cdot \Delta t \cdot g} \tag{5}$$

where $\Delta t$ is a sampling period of the main timer and is equal to 15 milliseconds, and g is a gravitational acceleration.

Since it is a fundamental principle that slip control is executed during acceleration of the vehicle 82, the reference front wheel acceleration $G_{FB}$ calculated in accordance with the expression (5) above is cut away at a portion thereof smaller than 0 at a clipping section 106 and is then filter processed to remove noises therefrom at a filter section 107 to obtain a modified reference front wheel acceleration $G_{FF}$.

Figure 7:
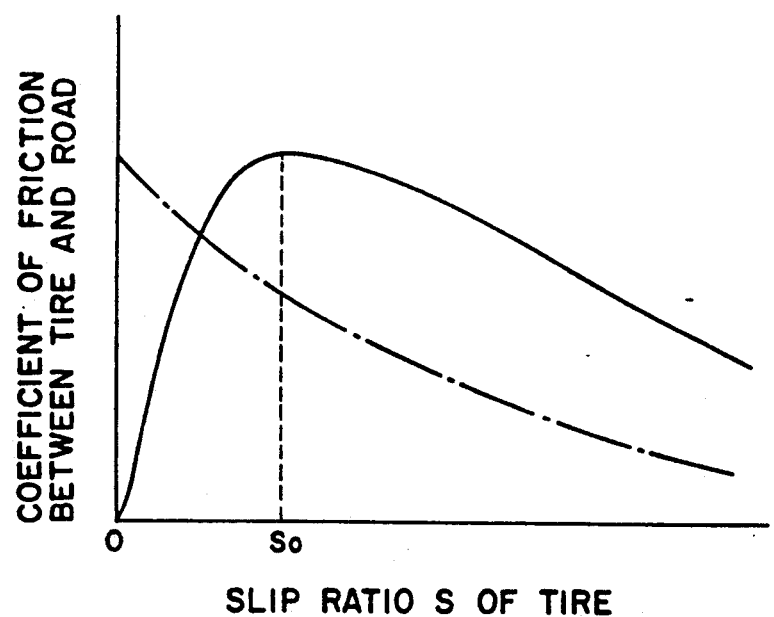
FIG. 7 is a graph illustrating a relationship between a coefficient of friction between a tire and a road and a slip ratio of the tire.

By the way, in order to cause a driving torque generated by the engine 11 to operate effectively upon acceleration of the vehicle 82, it is desirable to adjust the slip ratio S of the tires of the front wheels 64 and 65 during driving so that it may have a value, as indicated by a solid line in FIG. 7, equal to or in the proximity of and lower than an aimed slip ratio $S_O$ corresponding to a maximum value of a coefficient of friction between the tires and the road, thereby to prevent a possible loss of energy and further prevent possible deterioration of the driving performance and the acceleration performance of the vehicle 82.

Here, it is known that such aimed slip ratio $S_O$ varies within a range of 0.1 to 0.25 in accordance with a condition of a road, and it can be considered that the coefficient of friction between the tires and the road is equivalent to an advancing direction acceleration $G_X$ of the vehicle 82. Accordingly, an advancing direction acceleration $G_X$ applied to the vehicle 82 should be detected, and such modified reference front wheel acceleration $G_{FF}$ as described hereinabove should be corrected in accordance with the advance direction acceleration $G_X$.

Thus, a differentiating section 108 calculates, from a car speed $V_{(n)}$ calculated in the present control cycle and another car speed $V_{(n-1)}$ calculated in the preceding control cycle, a current advancing direction acceleration $G_{X(n)}$ of the vehicle 82 in accordance with the following expression (6):

$$G_{X(n)} = \frac{V_{(n)} - V_{(n-1)}}{3.6 \cdot \Delta t \cdot g} \quad (6)$$

Then, in case the advancing direction acceleration $G_{X(n)}$ calculated in this manner is higher than 0.6 g, the advancing direction acceleration $G_{X(n)}$ is clipped, taking the safety against a possible erroneous calculation or the like into consideration, to 0.6 g at a clipping section 109 so that the maximum value of the advancing direction acceleration $G_{X(n)}$ may not exceed 0.6 g. Further, filter processing which will be described in detail below is executed at a filter section 110 to calculate a modified advancing direction acceleration $G_{XF}$.

Such filter processing is executed in order to modify an advancing direction acceleration $G_{X(n)}$ so that, since such advancing direction acceleration of the vehicle 82 can be regarded as equivalent to a coefficient of friction between the tires and the road, even when the maximum value of the advancing direction acceleration of the vehicle 82 varies to such a degree that the slip ratio S of the tires tends to exceed an aimed slip ratio $S_O$ corresponding to a maximum value of the coefficient of friction between the tires and the road or a value around such aimed slip ratio $S_O$, the slip ratio S of the tires may maintain a value equal to or in the proximity of and lower than the aimed slip ratio $S_O$ corresponding to the maximum value of the coefficient of friction between the tires and the road. More particularly, the filter processing proceeds in the following manner.

In case the current advancing direction acceleration $G_{X(n)}$ is equal to or higher than the modified advancing direction acceleration $G_{XF}$ obtained by filter processing, that is, in case the vehicle 82 continues its acceleration, the modified advancing direction acceleration $G_{XF}$ is processed to be retarded as given by $$G_{XF} = \frac{28}{256} \cdot \Sigma(G_{X(n)} - G_{XF})$$

to remove noises therefrom, and consequently, the modified advancing direction acceleration $G_{XF}$ follows up the advancing direction acceleration $G_{X(n)}$ comparatively quickly.

On the other hand, in case the advancing direction acceleration $G_{X(n)}$ is lower then the modified advancing direction acceleration $G_{XF}$, that is, when the vehicle 82 is not being accelerated very much, the following processing is executed for each sampling period $\Delta t$ of the main timer.

In a condition wherein the slip control flag $F_S$ is not in a set state, that is, in a condition wherein the driving torque of the engine 11 is not being reduced by slip control, the vehicle 82 is in an accelerating condition, and accordingly, the modified advancing direction acceleration $G_{XF}$ is modified to $$G_{XF} = G_{XF} - 0.002$$

in order to restrict reduction of the modified advancing direction acceleration $G_{XF}$, thereby assuring responsibility of the vehicle 82 to a request for acceleration by the driver.

Also when the slip amount s presents a positive value, that is, some slip takes place with the front wheels 64 and 65 in a condition wherein the driving torque of the engine 11 is being reduced by slip control, since the degree of acceleration of the vehicle 82 is low and there is no problem with the safety, the modified advancing direction acceleration $G_{XF}$ is modified to $$G_{XF} = G_{XF} - 0.002$$

in order to restrict reduction of the modified advancing direction acceleration $G_{XF}$, thereby assuring responsibility of the vehicle 82 to a request for acceleration by the driver.

On the other hand, when the slip amount s presents a negative value in a condition wherein the driving torque of the engine 11 is being reduced by slip control, that is, when the vehicle 82 is in a decelerating condition, the maximum value of the modified advancing direction acceleration $G_{XF}$ is maintained in order to assure responsibility of the vehicle 82 to a request for acceleration by the driver.

Figure 8:
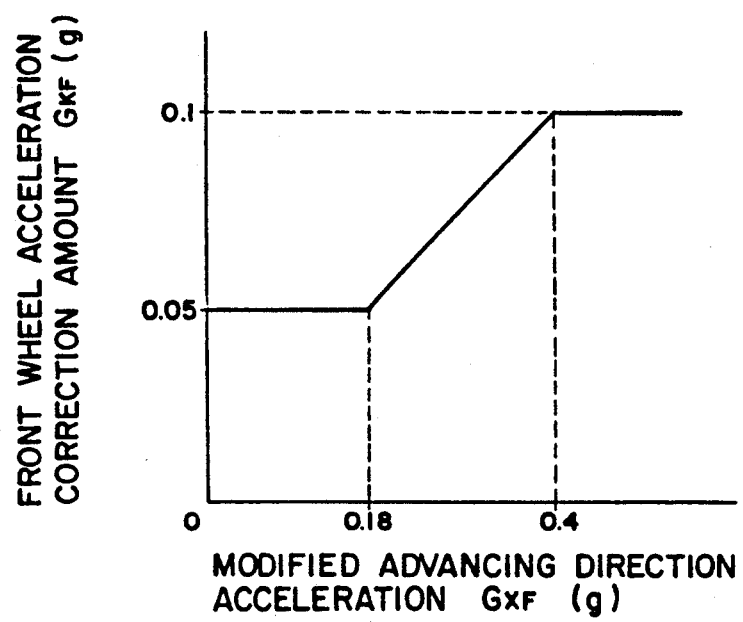
FIG. 8 is a map illustrating a relationship between a modified advancing direction acceleration and a front wheel acceleration correction amount.

Based on the modified advancing direction acceleration $G_{XF}$ obtained in this manner, a front wheel acceleration correction amount $G_{KF}$ set in advance for the modified advancing direction acceleration $G_{XF}$ is read out from such a map as shown in FIG. 8 at an acceleration correction section 111 and is added to the modified reference front wheel acceleration $G_{FF}$ at an adding section 112. The front wheel acceleration correction amount $G_{KF}$ has such a tendency that it increases in a stepwise manner as the value of the modified advancing direction acceleration $G_{XF}$ increases. In the present embodiment, such map is produced based on a driving test and so forth.

Meanwhile, as seen in FIG. 7 in which a relationship between a slip ratio S of a tire and a coefficient of friction between the tire and a road during turning is indicated by an alternate long and short dash line, an aimed slip ratio of a tire which is provided by a maximum value of the coefficient of friction between the tire and a road during turning of the vehicle 82 is considerably lower than an aimed slip ratio $S_O$ of the tire provided by a maximum value of the coefficient of friction between the tire and the road during straightforward driving movement of the vehicle 32. Accordingly, during turning of the vehicle 82, the modified reference front wheel acceleration $G_{FF}$ is preferably set to a value lower than that during straightforward driving movement so that the vehicle 82 may turn smoothly.

Figure 9:
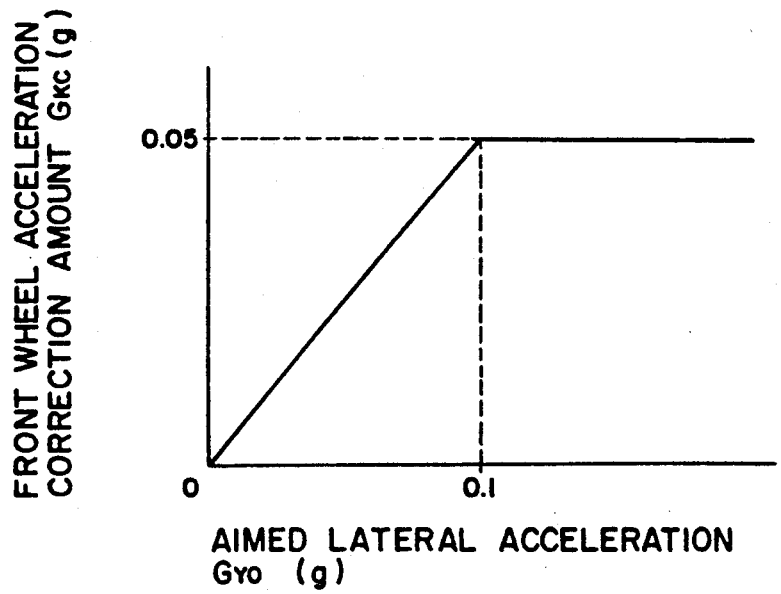
FIG. 9 is a map illustrating a relationship between an aimed lateral acceleration and a front wheel acceleration correction correction amount.

Thus, based on the aimed lateral acceleration $G_{YO}$ of the vehicle 82 calculated in accordance with the expression (3) given hereinabove, a front wheel acceleration correction amount $G_{KC}$ is read out from such a map as shown in FIG. 9 at a turning correcting section 113, and then the front wheel acceleration correction amount $G_{KC}$ is subtracted from the modified reference front wheel acceleration $G_{FF}$ at a subtracting section 114 to obtain an aimed front wheel acceleration $G_{FO}$ given below:

$$G_{FO} = G_{FF} + G_{KF} - G_{KC}.$$

Figure 10:
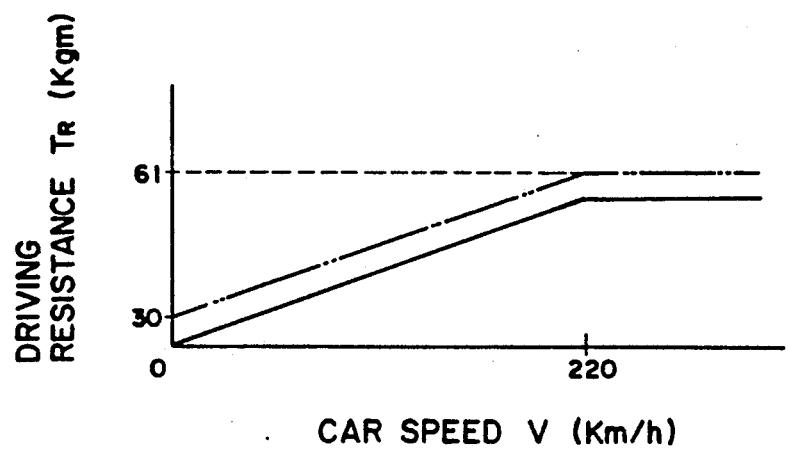
FIG. 10 is a map illustrating a relationship between a car speed and a driving resistance.

Then, in case the aimed front wheel acceleration $G_{FO}$ is lower than $-0.6$ g or higher than 0.6, it is clipped, taking the safety against an erroneous operation or the like into consideration, to the range from $-0.6$ g to 0.6 g at a clipping section 115. Then, the aimed front wheel acceleration $G_{FO}$ after such clipping is converted into a torque at a torque converting section 116, and then a driving resistance $T_R$ calculated at a driving resistance calculating section 117 is added to the aimed front wheel acceleration $G_{FO}$ at an adding section 118 to calculate a reference driving torque $T_B$ given below:

$$T_B = G_{FO} \cdot W_b \cdot r + T_R$$

where $W_b$ is a weight of the vehicle 82, and r is an effective radius of the front wheels 64 and 65. Here, while the driving resistance $T_R$ can be calculated as a function of the car speed V, it is otherwise determined, in the present embodiment, from such a map as shown in FIG. 10. In this instance, since the driving resistance $T_R$ is different between a flat road and an uphill road, a curve for a flat road indicated by a solid line and another curve for an uphill road indicated by an alternate long and two short dashes line in FIG. 10 are written in the map, and either one of the curves is selected in response to a detection signal from an inclination sensor (not shown) incorporated in the vehicle 82. However, it is otherwise possible to set such driving resistance further finely including a downhill road.

Meanwhile, the TCL 76 calculates an actual front wheel speed $V_F$ from a detection signal from the front wheel rotation sensor 66 and executes, using a slip amount s which is a deviation between the actual front wheel speed $V_F$ and an aimed front wheel speed $V_{FS}$ for correction torque calculation which is set in accordance with an aimed front wheel speed $V_{FO}$ for reference torque calculation as described hereinabove, feedback control of the reference driving torque $T_B$ to calculate an aimed driving torque $T_{OS}$ of the engine 11. More particularly, such operation proceeds as follows.

In the present embodiment, since the modified reference front wheel acceleration $G_{FF}$ is corrected at the acceleration correcting section 111 and the turning correcting section 113 when an aimed front wheel acceleration $G_{FO}$ is calculated, similar correction is performed for the aimed front wheel speed $V_{FO}$ for reference torque calculation to calculate an aimed front wheel speed $V_{FS}$ for correction torque calculation.

Figure 11:
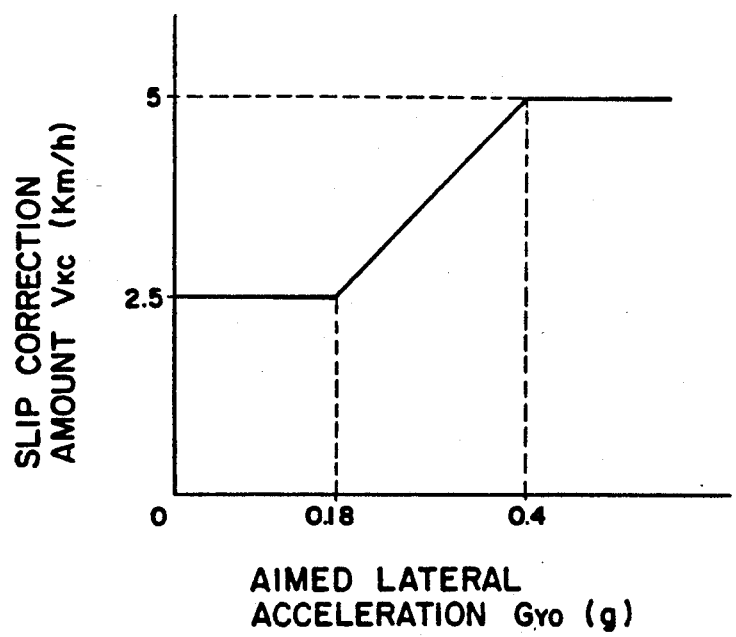
FIG. 11 is a map illustrating a relationship between an aimed lateral acceleration and a slip correction amount during acceleration.

In particular, the TCL 76 reads out a slip correction amount $V_K$ corresponding to the modified advancing direction acceleration $G_{XF}$ from such a map as shown in FIG. 11 at the acceleration correcting section 111 and adds the slip correction amount $V_K$ to the aimed front wheel speed $V_{FO}$ for reference torque calculation at the adding section 119. Consequently, the aimed front wheel speed $V_{FS}$ for correction torque calculation is increased and a slip ratio S upon acceleration is set such that it may have a value equal to or in the proximity of and lower than an aimed slip ratio $S_O$ indicated by a solid line in FIG. 7.

Figure 12:
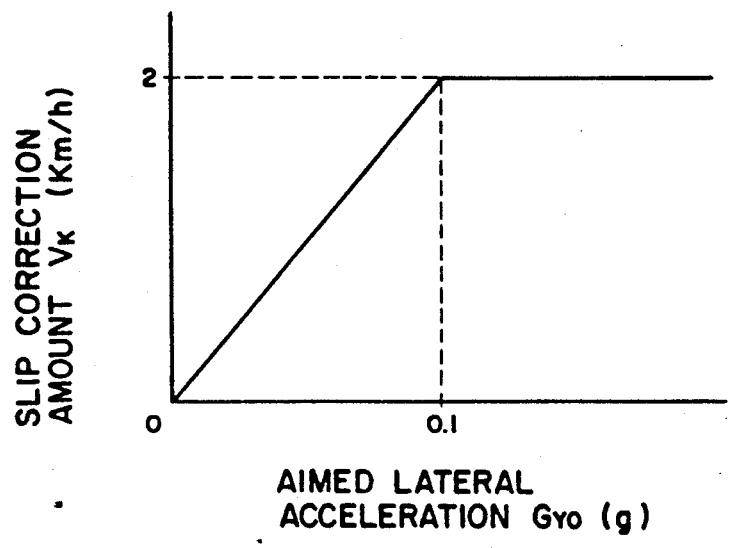
FIG. 12 is a map illustrating a relationship between an aimed lateral acceleration and a slip correction amount during turning.

Similarly, the TCL 76 reads out a slip correction amount $V_{KC}$ corresponding to the aimed lateral acceleration $G_{YO}$ from such a map as shown in FIG. 12 at the turning correcting section 113 and subtracts the slip correction amount $V_{KC}$ from the aimed front wheel speed $V_{FO}$ for reference torque calculation at the subtracting section 120. Consequently, the aimed front wheel speed $V_{FO}$ for correction torque calculation is decreased and the slip ratio S upon turning of the vehicle 82 becomes lower than an aimed slip ratio $S_O$ upon straightforward driving movement of the vehicle 82. Thus, while the acceleration performance of the vehicle 82 is deteriorated a little, a good turning performance of the vehicle 82 is assured.

It is to be noted that, since a turning angle $\delta_H$ of the steering shaft 83 is not reliable at all until after first learning of the neutral position $\delta_M$ of the steering shaft 83 is performed after the ignition key switch 75 is operated to be switched on, the preceding front wheel acceleration correction value $G_{KC}$ and slip correction amount $V_{KC}$ are multiplied by 0, and after the steering angle neutral position learning flag $F_H$ is set, the front wheel acceleration correction amount $G_{KC}$ and slip correction amount $V_{KC}$ are multiplied by 1.

As a result of such operation as described above, an aimed front wheel speed $V_{FS}$ for correction torque calculation is calculated in accordance with the following expression:

$$V_{FS} = V_{FO} + V_K - V_{KC}.$$

Subsequently, a slip amount s which is a deviation $V_F - V_{FS}$ between the actual front wheel speed $V_F$ obtained from a detection signal from the front wheel rotation sensor 66 by filter processing executed for the object of removal of noises and so forth and the aimed front wheel speed $V_{FS}$ for correction torque calculation obtained by such operation as described just above is calculated at a subtracting section 121. A slip amount detecting section of the slip detecting means 91 is thus constituted from various elements from the sensors for detecting the wheel speeds $V_{RL}$, $V_{RR}$ and $V_F$ to the subtracting section 121. Then, in case the slip amount s is smaller than a negative preset value, for example, $-2.5$ km per hour, the slip amount s is clipped to $-2.5$ km per hour at a clipping section 122, thereby preventing possible erroneous operation of the engine 11 arising from an erroneous calculation.

Further, proportional correction and differential correction which will be hereinafter described are performed for the slip amount s after such clipping processing, and then integral correction with an integration constant $\Delta T_I$ is performed for the slip amount s to calculate a final correction torque $T_{PID}$.

The proportional correction mentioned above proceeds in the following manner. In particular, the slip amount s is multiplied by a proportional coefficient $K_P$ at a multiplying section 123 to obtain a fundamental correction amount and is further multiplied, at a multiplying section 124, by a correction coefficient $\rho_{KP}$ set in advance in accordance with a gear ratio $\rho_m$ of the hydraulic automatic transmission 13 to obtain a proportional correction torque $T_P$.

Meanwhile, the differential correction proceeds in the following manner. In particular, a changing rate (slip changing amount) $G_s$ of the slip amount s is calculated at a differentiating section 125 and is then multiplied by a differential coefficient $K_D$ at a multiplying section 126 to calculate a fundamental correction amount with respect to a sudden change of the slip amount s. It is to be noted that the slip detecting means 91 is constituted from the differentiating section 125 and the slip amount detecting section described hereinabove. Then, the fundamental correction amount obtained in this manner is multiplied at a multiplying section 127 by a correction coefficient $\rho_{KD}$ set in advance in accordance with the gear ratio $\rho_m$ of the hydraulic automatic transmission 13, and an upper limit value and a lower limit value are provided for a value obtained by such multiplication to effect clipping processing at a clipping section 128 so that a differential correction torque $T_D$ may not have an extremely great value, thereby to obtain a differential correction torque $T_D$. During driving of the vehicle 82, the wheel speeds $V_F$, $V_{RL}$ and $V_{RR}$ sometimes present a spontaneously idling or locked condition depending upon a condition of a road or a driving condition of the vehicle 82 or the like, and in such an instance, there is the possibility that the changing rate $G_s$ of the slip amount s may be increased to an extremely great positive or negative value until the control diverges and the responsibility is deteriorated. Thus, the clipping section 128 is provided to clip, for example, the lower limit value of the slip amount s to $-55$ kgm and the upper limit value to 55 kgm to prevent the differential correction torque $T_D$ from having an extremely high value.

Figure 13:
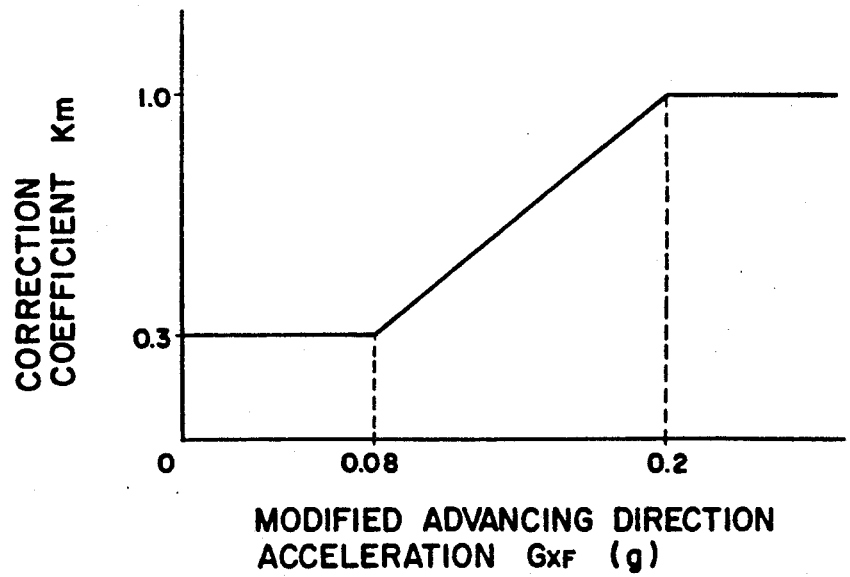
FIG. 13 is a map illustrating a relationship between a modified advancing direction acceleration and a road condition correction coefficient.

The proportional correction torque $T_P$ and the differential correction torque $T_D$ calculated in this manner are added to each other at an adding section 129 to calculate a reference proportional differential correction torque $T_{PD}$. Then, in order to change the width in correction of the reference proportional differential correction torque $T_{PD}$ in accordance with a coefficient of friction between a tire and a road, a slip correction coefficient $K_m$ corresponding to the modified advancing direction acceleration $G_{XF}$ is read out from such a map as shown in FIG. 13 at a multiplying section 130, and the reference proportional differential correction torque $T_{PD}$ is multiplied by the slip correction coefficient $K_m$ to calculate a final proportional differential correction torque $T_{PDm}$. The slip correction coefficient $K_m$ has such a tendency that it may present a small value when the modified advancing direction acceleration $G_{XF}$ is so low that, when the vehicle 82 drives on a slippery road such as a frozen road, the correction width of the final proportional differential correction torque $T_{PDm}$ is reduced to prevent possible over control.

Figure 14:
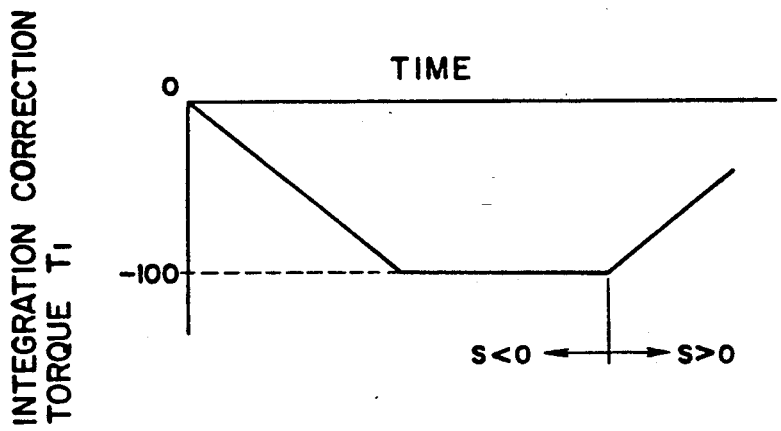
FIG. 14 is a graph illustrating an increasing/decreasing area of an integration correction torque.

Further, in the present embodiment, in order to realize correction coping with a moderate variation of the slip amount s, a fundamental correction amount is calculated at an integrating section 131 and is then multiplied at a multiplying section 132 by a correction coefficient $\rho_{KI}$ set in advance in accordance with the gear ratio $\rho_m$ of the hydraulic automatic transmission 13 to obtain an integration correction torque $T_I$. In this instance, a fixed small correction torque $\Delta T_I$ is integrated, in the present embodiment, to raise the convergency of control, and in case the slip amount s is in the positive for each sampling period of 15 milliseconds, the small correction torque $\Delta T_I$ is added, but on the contrary in case the slip amount s is in the negative, the small correction torque $\Delta T_I$ is subtracted. However, since the acceleration performance of the vehicle 82 is higher when the time within which the actual front wheel speed $V_F$ is higher than the aimed front wheel speed $V_{FS}$ is longer than the other time, an upper limit value, for example, 0 kgm, is set for the integral correction torque $T_I$ to effect clipping processing. Further, in order to prevent a possible error in calculation, a lower limit value, for example, $-100$ kgm, is set for the integral correction torque $T_I$ to effect clipping processing. As a result of such clipping processings, the integral correction torque $T_I$ presents such a variation as seen in FIG. 14.

It is to be noted that the correction coefficients $\rho_{KP}$, $\rho_{KD}$ and $\rho_{KI}$ are read out from such a map as shown in FIG. 15 which is set in advance in connection with the gear ratio $\rho_m$ of the hydraulic automatic transmission 13.

After then, the final proportional differential correction torque $T_{PDm}$ and the integral correction torque $T_I$ are added to each other at an adding section 133, and a final correction torque $T_{PID}$ obtained by such addition is subtracted at a subtracting section 134 from the aforementioned reference driving torque $T_B$. Then, a value obtained by such subtraction is multiplied at a multiplying section 135 by an inverse number to a total reduction gear ratio between the engine 11 and axles 89 and 90 of the front wheels 64 and 65 to calculate an aimed driving torque $T_{OS}$ for slip control as given by the expression (7) below:

$$T_{OS} = \frac{T_B - T_{PID}}{\rho_m \cdot \rho_d} \quad (7)$$

where $\rho_d$ is a differential gear reduction ratio, and in case the hydraulic automatic transmission 13 performs an up shifting operation, a gear ratio $\rho_m$ on the higher gear position side is outputted after completion of such gear shifting operation. In short, in the case of an up shifting operation of the hydraulic automatic transmission 13, if a gear ratio $\rho_m$ on the higher gear position side is employed at a point of time when a gear shifting signal is outputted, then the aimed driving torque $T_{OS}$ is increased during the gear shifting operation, and consequently, an upwash of the engine 11 may be caused as apparent also from the expression (7) given above. Therefore, for example, for 1.5 seconds until a gear shifting operation is completed after a signal of starting of a gear shifting operation has been outputted, the gear ratio $\rho_m$ on the lower gear position side at which the aimed driving torque $T_{OS}$ can be decreased is maintained, and then the gear ratio $\rho_m$ on the higher gear position side is adopted after 1.5 seconds after outputting of the signal of starting of a gear shifting operation. From a similar reason, in the case of a down shifting operation of the hydraulic automatic transmission 13, the gear ratio $p_m$ on the lower gear position side is adopted immediately at a point of time when a gear shifting signal is outputted.

Since the aimed driving torque $T_{OS}$ calculated in accordance with the expression (7) given hereinabove naturally has a positive value, the aimed driving torque $T_{OS}$ is clipped to a value equal to or greater than 0 at a clipping section 136 in order to prevent a possible error in calculation. Then, information regarding the aimed driving torque $T_{OS}$ is outputted to the ECU 15 in accordance with judging processing at a starting/ending judging section 137 for judging starting or ending of slip control.

The starting/ending judging section 137 judges starting of slip control when all of requirements (a) to (e) given hereinbelow are satisfied. Then, the starting/ending judging section 137 first sets the slip control flag $F_S$ and then renders the change-over switch 103 operative so as to select a lower one of the two rear wheel speeds $V_{RL}$ and $V_{RR}$ as a car speed V and then outputs information regarding the aimed driving torque $T_{OS}$ to the ECU 15. Then, such processing is repeated until ending of slip control is judged and the slip control flag $F_S$ is put into a reset state.

(a) The driver operates the manual switch not shown intending slip control.

(b) A driving torque $T_d$ requested by the driver is higher than a minimum driving torque, for example, 4 kgm, which is necessary to cause the vehicle to drive.

Figure 16:
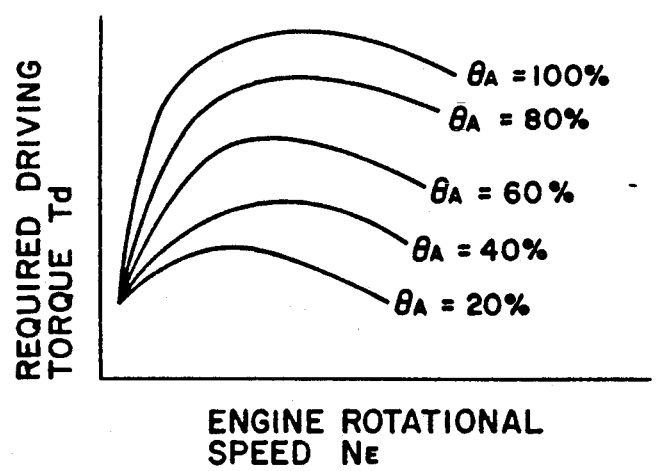
FIG. 16 is a map illustrating a relationship between an engine rotational speed and a requested driving torque with respect to different accelerator valve openings.

It is to be noted that, in the present embodiment, such requested driving torque $T_d$ is read out from such a map as shown in FIG. 16 which is set in advance in accordance with an engine rotational speed $N_E$ calculated from a detection signal from the crank angle sensor 62 and an accelerator opening $\theta_A$ calculated from a detection signal from the accelerator opening sensor 77.

(c) The slip amount s is greater than 2 km per hour.

(d) The changing rate $G_s$ of the slip amount s is higher than 0.2 g.

(e) The actual front wheel acceleration $G_F$ obtained by time differentiation of an actual front wheel speed $V_F$ at the differentiating section 138 is higher than 0.2 g.

In case either one of requirements (f) and (g) given below is satisfied after the starting/ending judging section 137 judges starting of slip control, ending of the slip control is judged and the slip control flag $F_S$ is reset. Further, the starting/ending judging section 137 stops transmission of the aimed driving torque $T_{OS}$ to the ECU 15 and causes the change-over switch 103 to operate so as to select a higher one of the two rear wheel speeds $V_{RL}$ and $V_{RR}$ as a car speed V.

(f) The aimed driving torque $T_{OS}$ is higher than the requested driving torque $T_d$ and the condition wherein the slip amount s is lower than a fixed value, for example, −2 km per hour, continues for a period of time longer than a fixed period of time, for example, 0.5 seconds.

(g) The condition wherein the idling switch 68 is in an on-state after it has been changed from an off-state, that is, the condition wherein the accelerator pedal 31 is released from the driver, continues for a period of time longer than a fixed period of time, for example, 0.5 seconds.

The vehicle 82 includes such manually operable switch not shown for permitting a driver to select slip control as described hereinabove, and when a driver operates the manually operable switch to select slip control, operation of slip control described below will be executed.

Figure 17:
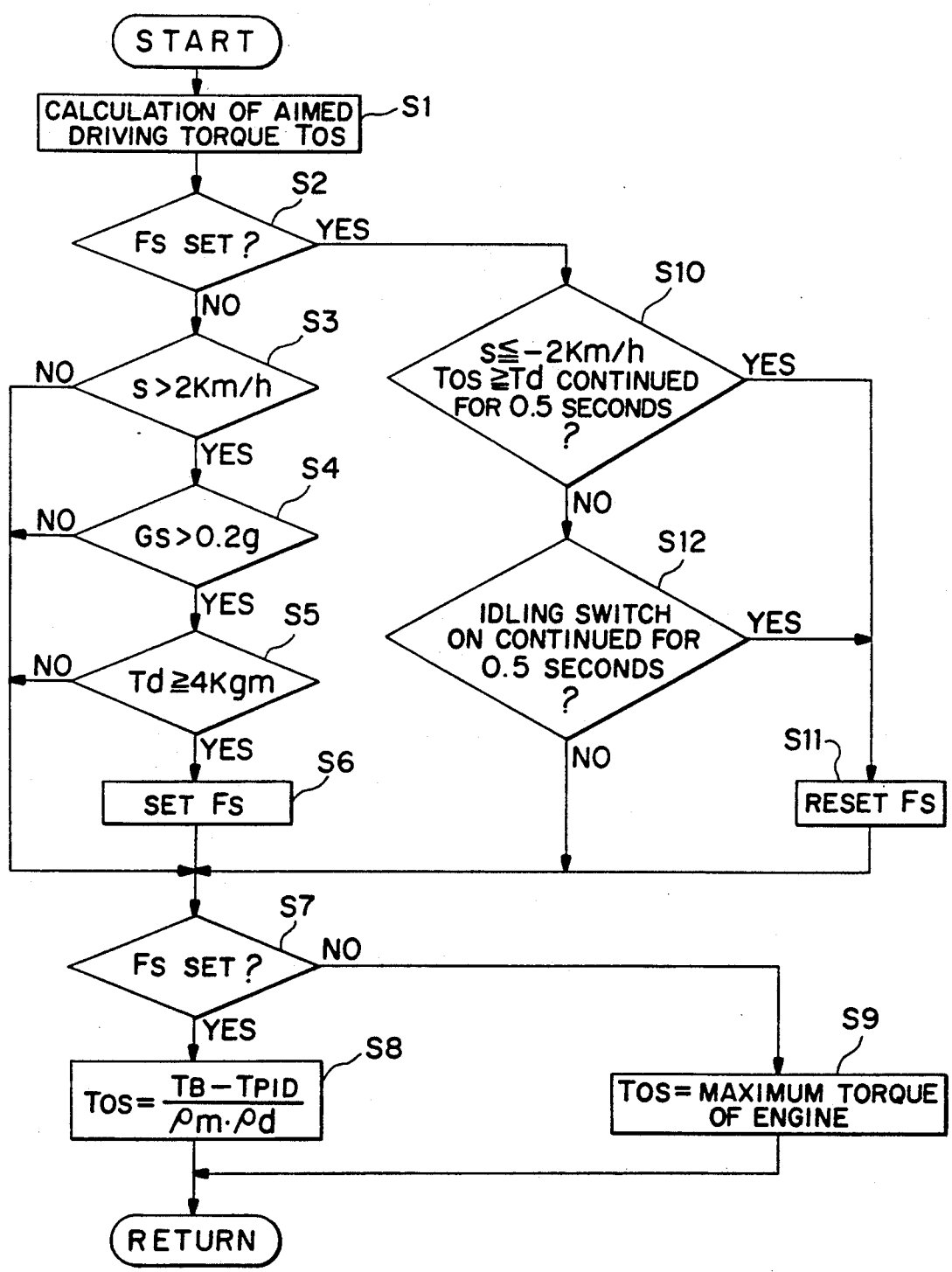
FIG. 17 is a flow chart illustrating a flow of operations of slip control.

Referring to FIG. 17 which shows a flow of processing of such slip control, the TCL 76 calculates, at step S1, an aimed driving torque $T_{OS}$ by such detection of various data and calculating processing as described hereinabove. Such calculating processing, however, is executed independently of operation of the manually operable switch.

Subsequently at step S2, it is judged whether or not the slip control flag $F_S$ is in a set state. Since the slip control flag $F_S$ is not in a set state at the first stage, the TCL 76 judges subsequently at step S3 whether or not the slip amount s of the front wheels 64 and 65 is greater than a preset threshold value, for example, 2 km per hour.

If it is judged at step S3 that the slip amount s is greater than 2 km per hour, then the TCL 76 judges at step S4 whether or not the changing rate $G_s$ of the slip amount s is higher than 0.2 g.

If it is judged at step S4 that the slip amount changing rate $G_s$ is higher than 0.2 g, then the TCL 76 judges at step S5 whether or not a requested driving torque $T_d$ by the driver is equal to or higher than a minimum driving torque necessary to cause the vehicle 82 to drive, for example, 4 kgm, that is, whether or not the driver wishes to drive the vehicle 82.

If it is judged at step S5 that the required driving torque $T_d$ is equal to or higher than 4 kgm, that is, the driver wishes to drive the vehicle 82, the slip control flag $F_S$ is set at step S6, and then at step S7, it is judged again whether or not the slip control flag $F_S$ is in a set state.

In case it is judged at step S7 that the slip control flag $F_S$ is in a set state, the aimed driving torque $T_{OS}$ for slip control calculated in advance in accordance with the expression (7) given hereinabove is adopted as an aimed driving torque $T_{OS}$ of the engine 11 at step S8.

On the contrary, in case it is judged at step S7 that the slip control flag $F_S$ is in a reset state, the TCL 76 outputs, at step S9, the maximum torque of the engine 11 as an aimed driving torque $T_{OS}$. Consequently, the ECU 15 causes the duty ratio of the torque controlling solenoid valves 51 and 56 to drop to the 0% side, and as a result, the engine 11 generates a driving torque corresponding to an amount of operation of the accelerator pedal 31 by the driver.

It is to be noted that, in case it is judged at step S3 that the slip amount s of the front wheels 64 and 65 is smaller than 2 km per hour, or in case it is judged at step S4 that the slip amount changing rate GS is equal to or lower than 0.2 g, or else in case it is judged at step S5 that the requested driving torque $T_d$ is lower than 4 kgm, the control sequence advances directly to step S7. Consequently, the TCL 76 outputs, at step S9, the maximum torque of the engine 11 as an aimed driving torque $T_{OS}$, and as a result, the ECU 15 causes the duty ratio of the torque controlling solenoid valves 51 and 56 to drop to the 0% side. Consequently, the engine 11 generates a driving torque corresponding to an amount of operation of the accelerator pedal 31 by the driver.

On the other hand, in case it is judged at step S2 that the slip control flag $F_S$ is in a set state, it is subsequently judged at step S10 whether or not the condition wherein the slip amount s of the front wheels 64 and 65 is equal to or lower than −2 km per hour as a threshold value described hereinabove and the required driving torque $T_d$ is equal to or lower than the aimed driving torque $T_{OS}$ calculated at step S1 has continued for a period of time longer than 0.5 seconds.

If it is judged at step S10 that the condition wherein the slip amount s is equal to or lower than −2 km per hour and the requested driving torque $T_d$ is equal to or lower than the aimed driving torque $T_{OS}$ has continued for a period of time longer than 0.5 seconds, that is, the driver does not wish acceleration of the vehicle 82 any more, then the slip control flag $F_S$ is reset at step S11, whereafter the control sequence advances to step S7.

In case it is judged at step S10 that the slip amount s is higher than −2 km per hour or the condition wherein the required driving torque $T_d$ is equal to or lower than the aimed driving torque $T_{OS}$ has not continued for a period of time longer than 0.5 seconds, that is, the driver still wishes acceleration of the vehicle 82, the TCL 76 judges at step S12 whether or not the condition wherein the idling switch 68 is in an on state, that is, the throttle valve 20 is in a fully closed condition, has continued for a period of time longer than 0.5 seconds.

In case it is judged at step S12 that the idling switch 68 is still on, since this means that the driver leaves the accelerator pedal 31 in a non-operated condition, the control sequence advances to step S11 at which the slip control flag $F_S$ is reset. On the contrary, in case it is judged at step S12 that the idling switch 68 is off, since this means that the accelerator pedal 31 is in an operated condition by the driver, the control sequence advances directly to step S7.

Upon turning control of the vehicle 82, the TCL 76 calculates an aimed lateral acceleration $G_{YO}$ of the vehicle 82 from the steering shaft turning angle $\delta_H$ and car speed V and then sets, in accordance with the thus calculated aimed lateral acceleration $G_{YO}$, an acceleration in the advancing direction of the vehicle 82 at which the vehicle 82 may not be put into an extreme under-steering condition, that is, an aimed advancing direction acceleration $G_{XO}$. Then, an aimed driving torque $T_{OC}$ of the engine 11 corresponding to the aimed advancing direction acceleration $G_{XO}$ is calculated.

By the way, while a lateral acceleration $G_Y$ of the vehicle 82 can be calculated actually making use of a rear wheel speed difference $|V_{RL} - V_{RR}|$, since it is possible to forecast the value of the lateral acceleration $G_Y$ acting on the vehicle 82 making use of the steering shaft turning angle $\delta_H$, there is an advantage that rapid control can be executed.

It is to be noted that, where the tread of the rear wheels 78 and 79 is represented by b, an actual lateral acceleration produced with the vehicle 82 is calculated from a rear wheel speed difference $|V_{RL} - V_{RR}|$ and a car speed V in accordance with the following expression:

$$G_Y = \frac{|V_{RL} - V_{RR}| \cdot V}{3.6^2 \cdot b \cdot g}$$

Here, in case the amount of increase or decrease of an aimed driving torque $T_{OC}$ of the engine which is set for each 15 milliseconds is very great, a shock is caused by acceleration or deceleration of the vehicle 82 then, which deteriorates the driving feeling of the vehicle 82. Accordingly, also in case the amount of increase or decrease of an aimed driving torque $T_{OC}$ of the engine 11 increases to such a degree that it brings up deterioration of the driving feeling of the vehicle 82, there is the necessity of restricting the amount of increase or decrease of such aimed driving torque $T_{OC}$.

Figure 18:
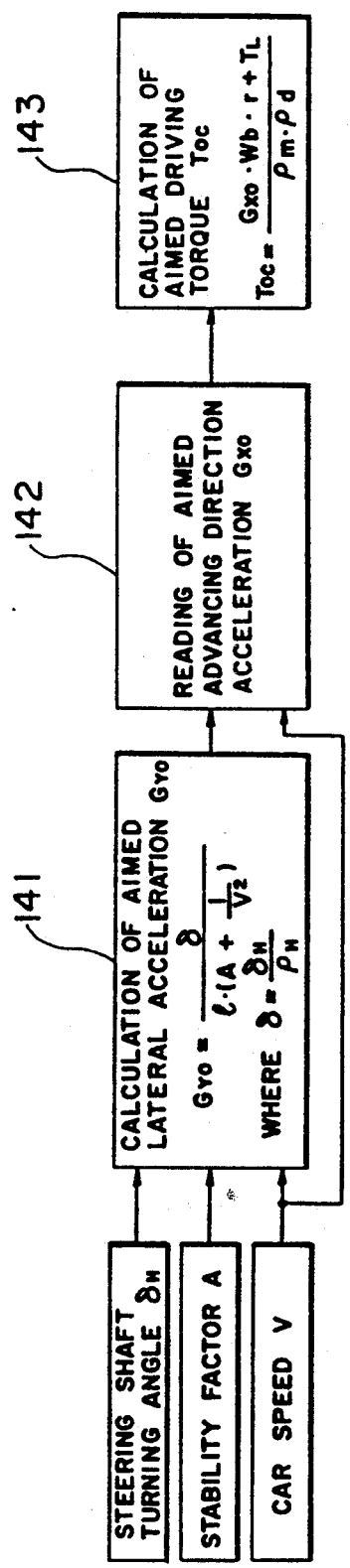
FIG. 18 is a block diagram illustrating a procedure of calculating an aimed driving torque for turning control.

Turning control in which such perception as described above is taken into consideration is illustrated in a calculation block diagram shown in FIG. 18. Referring to FIG. 18, the TCL 76 first calculates a car speed V in accordance with the expression (1) given hereinabove from outputs of the pair of rear wheel rotation sensors 80 and 81 and also calculates a steering angle $\delta$ of the front wheels 64 and 65 in accordance with the expression (2) given hereinabove from a detection signal from the steering angle sensor 84. Then, from the car speed V, steering angle $\delta$ and stability factor A, an aimed lateral acceleration $G_{YO}$ of the vehicle 82 is calculated in accordance with the expression (3) given hereinabove at an aimed lateral acceleration calculating section 141.

By the way, the stability factor A mentioned hereinabove is a value which depends upon construction of a suspension system, characteristics of the tires, a condition of a road and so forth as well known in the art. More particularly, the stability factor A is represented as an inclination of a tangential line to such a curve as shown, for example, in FIG. 19 which indicates a relationship between an actual lateral acceleration $G_Y$ which is produced with the vehicle 82 upon normal turning on a circular road and a steering angle ratio $\delta_H/\delta_{HO}$ of the steering shaft 83 then which is a ratio of a steering angle $\delta_H$ of the steering shaft 83 upon acceleration to a turning angle $\delta_{HO}$ of the steering shaft 83 in a very low speed driving condition in which the lateral acceleration $G_Y$ presents a value around zero with reference to the neutral position $\delta_M$ of the steering shaft 83. In short, in a region wherein the lateral acceleration $G_Y$ is low and the car speed V is not very high, the stability factor A presents a substantially constant value (A=0.002), but where the lateral acceleration $G_Y$ exceeds 0.6 g, the stability factor A increases suddenly, and consequently, the vehicle 82 exhibits a very strong under-steering tendency.

Figure 19:
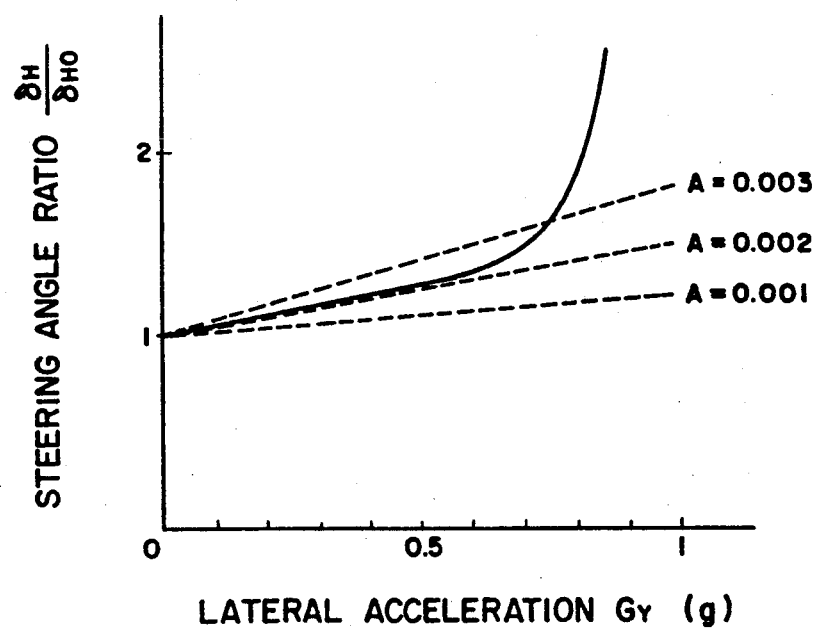
FIG. 19 is a graph showing a relationship between a lateral acceleration and a steering angle ratio and illustrating a stability factor.

From those facts, where the graph of FIG. 19 is involved, the stability factor A should be set to 0.002 and the driving torque of the engine 11 should be controlled so that the aimed lateral acceleration $G_{YO}$ of the vehicle 82 to be calculated in accordance with the expression (3) given hereinabove may be lower than 0.6 g.

It is to be noted that, for such a slippery road as a frozen road, the stability factor A should be set, for example, to 0.005 or so.

Figure 20:
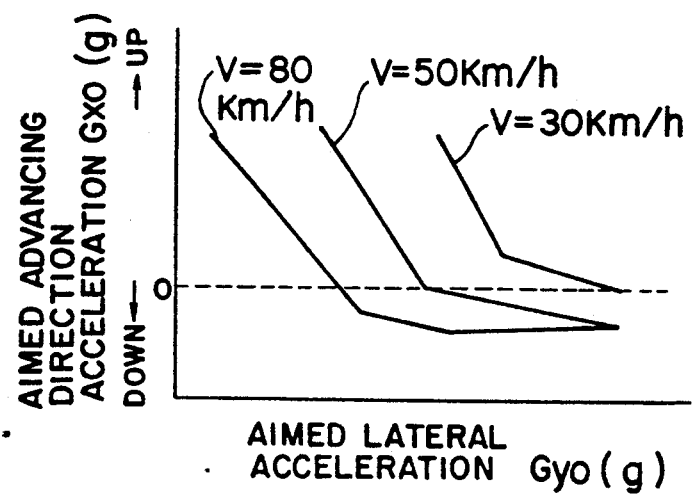
FIG. 20 is a map illustrating a relationship between an aimed lateral acceleration and an aimed advancing direction acceleration with respect to different car speeds.
Figure 21:
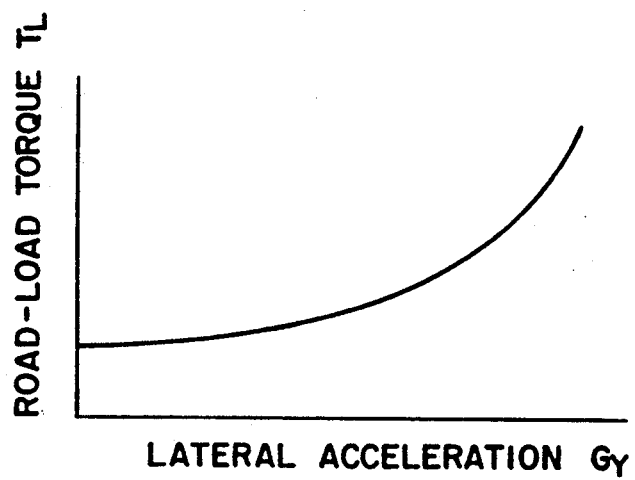
FIG. 21 is a map illustrating a relationship between a lateral acceleration and a road-load torque.

Referring back to FIG. 18, after an aimed lateral acceleration $G_{YO}$ is calculated in this manner, an aimed advancing direction acceleration $G_{XO}$ which is set in advance in accordance with the magnitude of the aimed lateral acceleration $G_{YO}$ and the car speed V is determined, at an aimed advancing direction acceleration calculating section 142, from such a map as shown in FIG. 20 which is stored in advance in the TCL 76. Then, an aimed driving torque $T_{OC}$ of the engine 11 is calculated, at an aimed driving torque calculating section 143, from the thus determined aimed advancing direction acceleration $G_{XO}$ in accordance with the following expression (8):

$$T_{OC} = \frac{G_{XO} \cdot W_b \cdot r + T_L}{\rho_m \cdot \rho_d} \qquad (8)$$

where TL is a road-load torque which is a resistance to a road which is obtained as a function of the lateral acceleration $G_Y$ of the vehicle 82. In the present embodiment, such road-load torque TL is determined from such a map as shown in FIG. 21.

The vehicle 82 includes such manually operable switch not shown for permitting a driver to select turning control as described hereinabove, and when a driver operates the manually operable switch to select turning control, operation of slip control described below will be executed.

Figure 22:
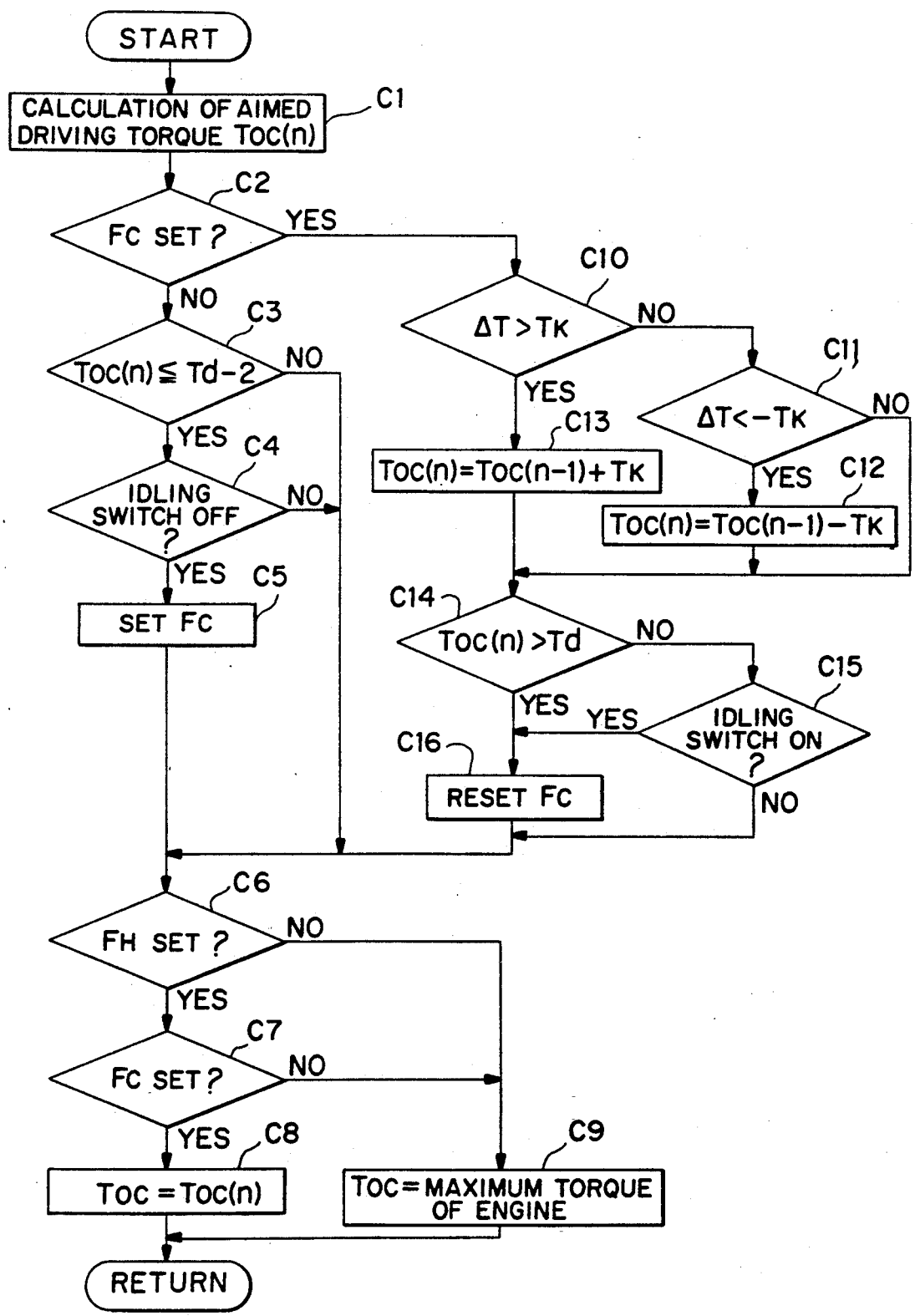
FIG. 22 is a flow chart illustrating a flow of operations of turning control.

A flow of control for determining an aimed driving torque $T_{OC}$ for turning control is shown in FIG. 22. Referring to FIG. 22, first at step C1, an aimed driving torque $T_{OC(n)}$ is calculated by such detection of various data and calculating processing as described hereinabove. Such calculating processing at step C1 is executed independently of operation of the manually operable switch.

Then at step C2, it is judged whether or not the vehicle 82 is in turning control, that is, whether or not a turning control flag $F_C$ is in a set state. Since the vehicle 82 is not in turning control first, it is determined that the turning control flag $F_C$ is in a reset state, and it is subsequently judged at step C3 whether or not the aimed driving torque $T_{OC(n)}$ is equal to or smaller than a preset threshold value, for example, $T_d-2$. Although the aimed driving torque $T_{OC(n)}$ can be calculated even when the vehicle 82 is in a straightforwardly driving condition, normally the value then is much higher than a requested driving torque $T_d$ requested by a driver. However, since such requested driving torque $T_d$ generally presents a low value upon turning of the vehicle 82, a time when the aimed driving torque $T_{OC(n)}$ becomes equal to or lower than the threshold value $T_d-2$ is determined as a starting requirement for turning control.

It is to be noted that the reason why the threshold value is set to $T_d-2$ here is that it is intended to provide the same as a hysteresis for preventing hunting in control.

In case it is judged at step C3 that the aimed driving torque $T_{OC(n)}$ is equal to or smaller than the threshold value $T_d-2$, the TCL 76 then judges at step C4 whether of not the idling switch 68 is in an off state.

In case it is judged at step C4 that the idling switch 68 is in an off state, that is, the accelerator pedal 31 is in an operated condition by the driver, the turning control flag $F_C$ is set at step C5. Then at step C6, it is judged whether or not the steering angle neutral position learning completion flag $F_H$ is in a set state, that is, the reliability of the steering angle $\delta$ detected by the steering angle sensor 84 is judged.

In case it is judged at step C6 that the steering angle neutral position learning completion flag $F_H$ is in a set state, it is judged again at step C7 whether or not the turning control flag $F_C$ is in a set state.

Since the turning control flag $F_C$ has been set at step C5 in the procedure described so far, it is judged at step C7 that the turning control flag $F_C$ is in a set state, and then at step C8, the aimed driving torque $T_{OC(n)}$ calculated precedently in accordance with the expression (8) given hereinabove is adopted as an aimed driving torque $T_{OC}$ for turning control.

On the contrary, in case it is judged at step C6 that the steering angle neutral position learning completion flag $F_H$ is not in a set state, since this means that the reliability of the steering angle $\delta$ calculated in accordance with the expression (2) is low, the TCL 76 does not adopt the aimed driving torque $T_{OC(n)}$ calculated in accordance with the expression (8) but outputs, as an aimed driving torque $T_{OC}$, the maximum driving torque of the engine 11. Consequently, the ECU 15 lowers the duty ratio of the torque controlling solenoid valves 51 and 56 to the zero percent side, and as a result, the engine 11 generates a driving torque corresponding to an amount of operation of the accelerator pedal 31 by the driver.

On the other hand, in case it is judged at step C3 that the aimed driving torque $T_{OC(n)}$ is not equal to or lower than the threshold value $T_d-2$, the control sequence does not advance to the turning control but advances to step C9 by way of step C6 or H7. At step C9, the TCL 76 outputs the maximum torque of the engine 11 as an aimed driving torque $T_{OC}$. Consequently, the ECU 15 lowers the duty ratio of the torque controlling solenoid valves 51 and 56 to the zero percent side, and as a result, the engine 11 generates a driving torque corresponding to an amount of operation of the accelerator pedal 31 by the driver.

Similarly, also in case it is judged at step C4 that the idling switch 68 is in an on state, that is, the accelerator pedal 31 is not in an operated condition by the driver, the TCL 76 outputs, at step C9, the maximum torque of the engine 11 as an aimed driving torque $T_{OC}$, and consequently, the ECU 15 lowers the duty ratio of the torque controlling solenoid valves 51 and 56 to the zero percent side. As a result, the engine 11 generates a driving torque corresponding to an amount of operation of the accelerator pedal 31 by the driver, and the control sequence does not advance to the turning control.

In case it is judged at step C2 that the turning control flag $F_C$ is in a set state, it is subsequently judged at step C10 whether or not the difference $\Delta T$ between the aimed driving torque $T_{OC(n)}$ calculated in the present control cycle and the aimed driving torque $T_{OC(n-1)}$ calculated in a preceding control cycle is greater than a preset allowable variation amount $T_K$. The allowable variation amount $T_K$ is a torque variation to such a degree at which a passenger of the vehicle 82 may not feel an acceleration or deceleration shock. When it is intended to restrict the aimed advancing direction acceleration $G_{XO}$ of the vehicle 82 to, for example, 0.1 g per second, the allowable variation amount $T_K$ is determined using the expression (8) given hereinabove as $$T_K = 0.1 \cdot \frac{W_b \cdot r}{\rho_m \cdot \rho_d} \cdot \Delta t$$

If it is judged at step C10 that the difference $\Delta T$ between the aimed driving torque $T_{OC(n)}$ calculated in the present control cycle and the aimed driving torque $T_{OC(n-1)}$ calculated in the preceding control cycle is not greater than the preset allowable variation amount $T_K$, it is subsequently judged at step C11 whether or not the difference $\Delta T$ between the aimed driving torque $T_{OC(n)}$ of the resent control cycle and the aimed driving torque $T_{OC(n-1)}$ calculated in the preceding control cycle is smaller than the negative allowable variation amount $T_K$.

If it is judged at step C11 that the difference $\Delta T$ between the aimed driving torque $T_{OC(n)}$ of the present control cycle and the aimed driving torque $T_{OC(n-1)}$ of the preceding control cycle is not smaller than the negative allowable variation amount $T_K$, since this means that the absolute value $|\Delta T|$ of the difference between the aimed driving torque $T_{OC(n)}$ of the present control cycle and the aimed driving torque $T_{OC(n-1)}$ of the preceding control cycle is smaller than the allowable variation amount $T_K$, the aimed driving torque $T_{OC(n)}$ calculated in the present control cycle is adopted as it is as an aimed driving torque $T_{OC(n)}$.

On the contrary, in case it is judged at step C11 that the difference $\Delta T$ between the aimed driving torque $T_{OC(n)}$ calculated in the present control cycle and the aimed driving torque $T_{OC(n-1)}$ calculated in the preceding control cycle is smaller than the negative allowable variation amount $T_K$, the aimed driving torque $T_{OC(n)}$ for the present control cycle is set, at step C12, in accordance with the following expression:

$$T_{OC(n)} = T_{OC(n-1)} - T_K$$

and the aimed driving torque $T_{OC(n)}$ is adopted as an aimed driving torque $T_{OC(n)}$.

In short, the amount of decrease from the aimed driving torque $T_{OC(n-1)}$ calculated in the preceding control cycle is restricted by the allowable variation amount $T_K$ to reduce a speed reduction shock involved in reduction in driving torque of the engine 11.

On the other hand, in case it is judge at step C10 that the difference $\Delta T$ between the aimed driving torque $T_{OC(n)}$ calculated in the present control cycle and the aimed driving torque $T_{OC(n-1)}$ calculated in the preceding control cycle is greater than the allowable variation amount $T_K$, the aimed driving torque $T_{OC(n)}$ for the present control cycle is set, at step C13, in accordance with the following expression:

$$T_{OC(n)} = T_{OC(n-1)} + T_K$$

and the aimed driving torque $T_{OC(n)}$ is adopted as an aimed driving torque $T_{OC(n)}$.

In short, in case the difference $\Delta T$ between the aimed driving torque $T_{OC(n)}$ calculated in the present control cycle and the aimed driving torque $T_{OC(n-1)}$ calculated in the preceding control cycle exceeds the allowable variation amount $T_K$, the amount of increase from the aimed driving torque $T_{OC(n-1)}$ calculated in the preceding control cycle is restricted with the allowable variation amount $T_K$ to reduce an acceleration shock involved in increase in driving torque of the engine 11.

After an aimed driving torque $T_{OC(n)}$ is set in this manner, the TCL 76 judges at step C14 whether or not the aimed driving torque $T_{OC(n)}$ is higher than the requested driving torque $T_d$ requested by the driver.

Here, in case the turning control flag $F_C$ is in a set state, the aimed driving torque $T_{OC(n)}$ is not higher than the requested driving torque $T_d$ by the driver, and accordingly, it is subsequently judged at step C15 whether or not the idling switch 68 is in an on state.

If it is judged at step C15 that the idling switch 68 is not in an on state, since this means that turning control is required, the control sequence advances to step C6 described hereinabove.

On the contrary, in case it is judged at step C14 that the aimed driving torque $T_{OC(n)}$ is higher than the requested driving torque $T_d$ by the driver, since this means that turning control of the vehicle 82 has completed, the TCL 76 subsequently resets the turning control flag $F_C$ at step C16. Similarly, in case it is judged at step C15 that the idling switch 68 is in an on state, since this means that the accelerator pedal 31 is not in an operated condition, the control sequence advances to step C16 at which the turning control flag $F_C$ is reset.

After the turning control flag $F_C$ is reset at step C16, the TCL 76 outputs the maximum torque of the engine 11 as an aimed driving torque $T_{OC}$ at step C9. Consequently, the ECU 15 lowers the duty ratio of the torque controlling solenoid valves 51 and 56 to the zero percent side, and as a result, the engine 11 generates a driving torque corresponding to an amount of operation of the accelerator pedal 31 by the driver.

After an aimed driving torque $T_{OC}$ for turning control is calculated, the TCL 76 selects one of the two aimed driving torques $T_{OS}$ and $T_{OC}$ as an optimum final aimed driving torque $T_O$ and outputs it to the ECU 15. In this instance, taking the driving safety of the vehicle 82 into consideration, a smaller one of the two aimed driving driving torques is outputted in priority. However, since normally the aimed driving torque $T_{OS}$ for slip control is always lower than the aimed driving torque $T_{OC}$, the final aimed driving torque $T_O$ should be selected in the order of the aimed driving torque for slip control and for turning control.

Figure 23:
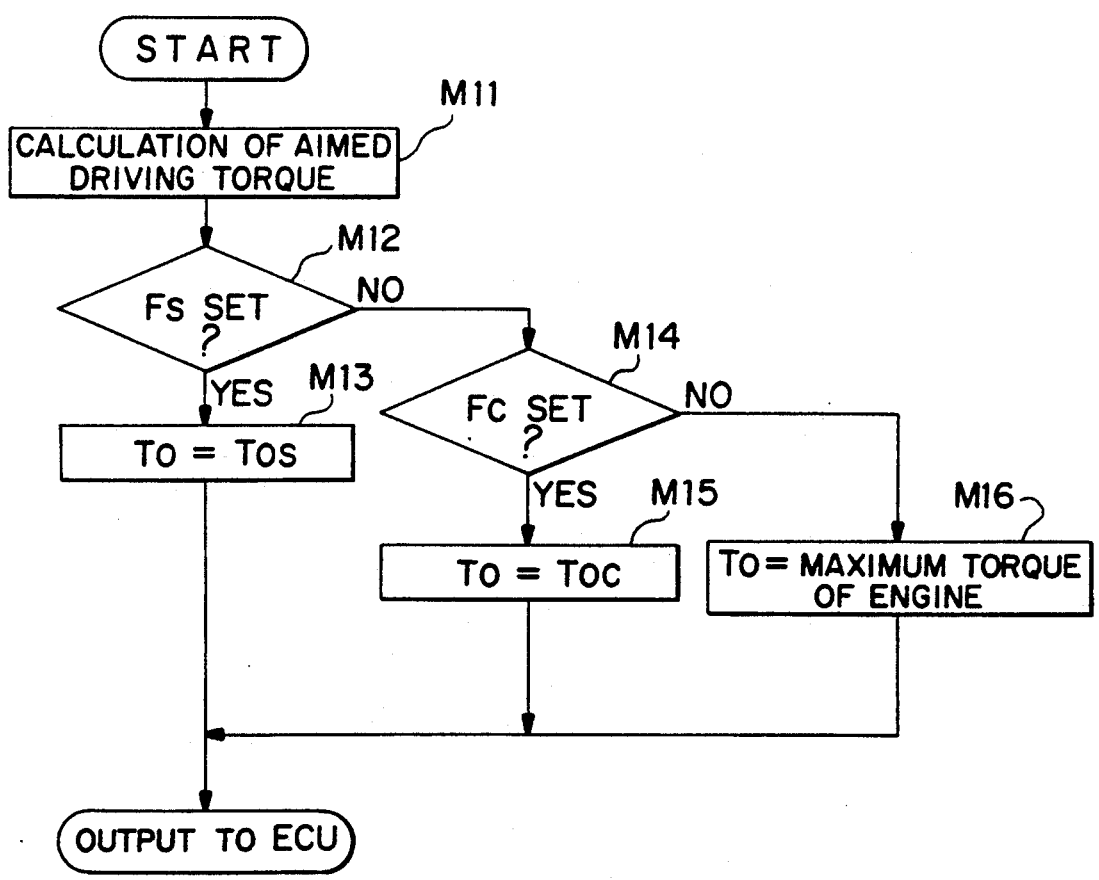
FIG. 23 is a flow chart illustrating a flow of selecting operation of a final aimed driving torque.

A flow of such processing is illustrated in FIG. 23. Referring to FIG. 23, an aimed driving torque $T_{OS}$ for slip control and another aimed driving torque $T_{OC}$ for turning control are first calculated at step M11, and then at step M12, it is judged whether or not a slip control flag $F_S$ is in a set state. If it is judged at step M12 that the slip control flag $F_S$ is in a set state, then the TCL 76 selects the aimed driving torque $T_{OS}$ for slip control as a final aimed driving torque $T_O$ and outputs it to the ECU 15 at step M13.

In case it is judged at step M12 that the slip control flag $F_S$ is not in a set state, it is judged subsequently at step M14 whether or not the turning control flag $F_C$ is in a set state. In case it is-judged at step M14 that the turning control flag $F_C$ is in a set state, the aimed driving torque $T_{OC}$ is selected as a final aimed driving torque $T_O$ and outputted to the ECU 15 at step M15.

On the contrary, if it is judged at step M14 that the turning control flag $F_C$ is not in a set state, then the TCL 76 outputs the maximum torque of the engine 11 as a final aimed driving torque $T_O$ to the ECU 15.

While a final aimed driving torque $T_O$ is selected in such a manner as described above, in such a case wherein reduction of the output of the engine 11 does not take place in time even by a fully closing operation of the throttle valve 20 by way of the actuator 41 as when the vehicle 82 starts suddenly or when the road condition changes suddenly from a normal dry road to a frozen road, the TCL 76 sets a retard rate to the fundamental retard amount $P_B$ of the ignition timing P set by the ECU 15 and outputs the thus set retard rate to the ECU 15. In short, means for setting a retard rate of an ignition timing P to a fundamental retard amount $P_B$ constitutes second torque reducing means.

Such fundamental retard amount $P_B$ is a maximum value of the retard with which driving of the engine 11 does not suffer from any trouble, and is set in accordance with an intake air amount of the engine 11 and an engine rotational speed $N_E$. Further, the retard rate includes up to three levels, in the present embodiment, including a 0 level for reducing the fundamental retard amount $P_B$ to zero, a II level for compressing the fundamental retard amount $P_B$ to two thirds, and a III level for causing the fundamental retard amount $P_B$ to be outputted as it is. Basically, the retard rate is selected such that, as the changing rate $G_s$ of the slip amount s increases, the retard amount increases.

Accordingly, the second torque reducing means is controlled in operation in accordance with a changing rate $G_s$ of the slip amount s (a changing amount of slip), and output reducing operation can be performed in a high responsibility.

Figure 24:
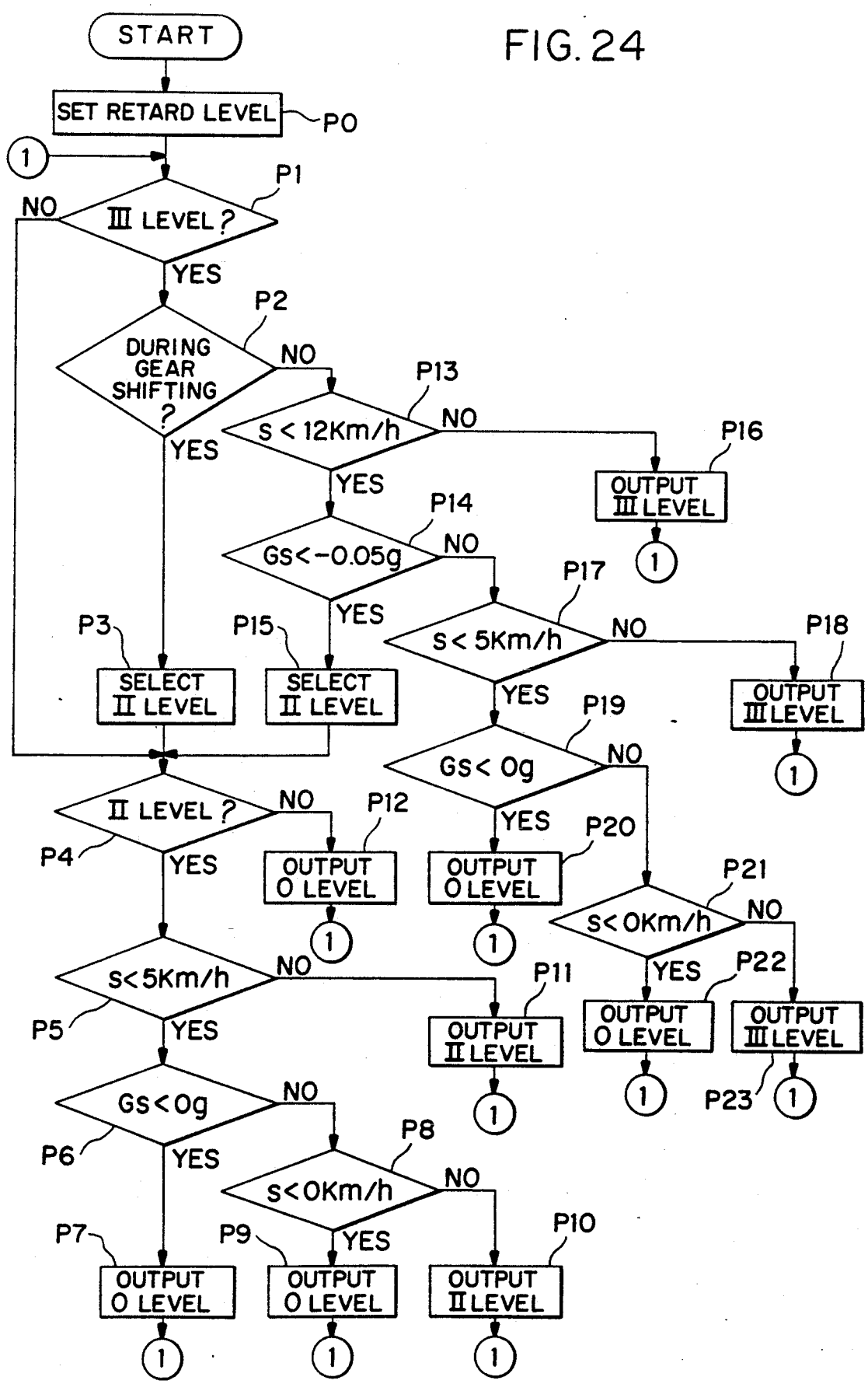
FIG. 24 is a flow chart illustrating a flow of selecting operation of a retard rate.
Figure 25:
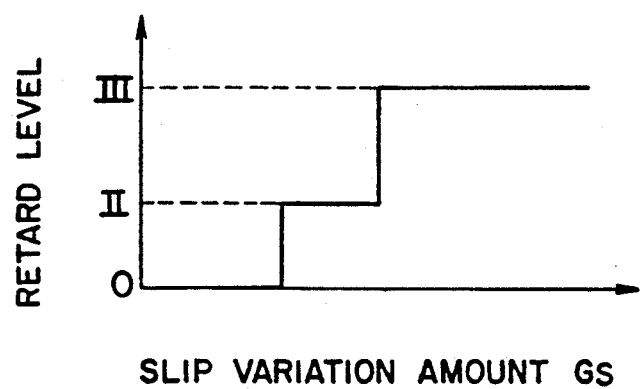
FIG. 25 is a map illustrating a relationship between a slip variation amount and a retard level.

A procedure of reading out such retard rate is illustrated in FIG. 24. Referring to FIG. 24, the TCL 76 first sets, at step P0, the retard level to one of the 0 level, II level and III level in accordance with a slip changing amount $G_s$ from such a map as shown in FIG. 25, and then judges, at step P1, whether or not the retard rate is the III level. In case it is judged that the retard rate is the III level, then it is judged at step P2 whether or not the hydraulic automatic transmission 13 is proceeding its gear shifting operation by way of the hydraulic controlling apparatus 16.

In case it is judged at step P2 that the hydraulic automatic transmission 13 is proceeding its gear shifting operation, the retard rate is re-set, at step P3, to the II level in order to prevent a possible stall of the engine 11 which may be caused by extreme reduction of its output, and then it is judged at step P4 whether or not the retard rate is the II level. In this instance, since the retard rate is the II level, the control sequence advances to step P5 at which it is judged whether or not the slip amount s of the front wheels 64 and 65 is smaller than 5 km per hour. Then, in case it is judged at step P5 that the slip amount s is smaller than 5 km per hour, that is, the front wheels 64 and 65 do not slip very much, it is judged at subsequent step P6 whether or not the changing rate $G_s$ of the slip amount s is lower than 0 g.

If it is judged at step P6 that the changing rate $G_s$ of the slip amount s is lower than 0 g, then the retard rate is set to the 0 level and the 0 level is outputted to the ECU 15 at step P7. On the contrary, if it is judged at step P6 that the changing rate $G_s$ of the slip amount s is equal to or higher than 0 g, then it is judged at step P8 whether or not the slip amount s of the front wheels 64 and 65 is smaller than 0 km.

In case it is judged at step P8 that the slim amount s is smaller than 0 km, the retard rate is re-set to the 0 level and the 0 level thus set is outputted to the ECU 15 at step P9. On the contrary, in case it is judged at step P8 that the slip amount s is equal to or higher than 0 km, that is, some slip takes place with the front wheels 64 and 65, the retard rate is retained at the II level and the II level is outputted to the ECU 15 at step P10.

In case it is judged at step P5 that the slip amount s is equal to or greater than 5 km, that is, some slip takes place with the front wheels 64 and 65, the retard rate of the II level is maintained and outputted to the ECU 15 at step P11. Meanwhile, in case it is judged at step P1 that the retard rate is not the III level, the control sequence advances directly to step P4, and then if it is judged at step P4 that the retard rate is not the II level, then the retard rate of the 0 level is outputted to the ECU 15 at step P12.

On the other hand, in case it is judged at step P2 that the hydraulic automatic transmission 13 is not proceeding its gear shifting operation, it is judged subsequently at step P13 whether the slip amount s of the front wheels 64 and 65 is smaller than 12 km per hour. Then, if it is judged that the slip amount s is smaller than 12 km per hour, then it is judged at step P14 whether the changing rate $G_s$ of the slip amount s is lower than −0.5 g. Then, if it is judged at step P14 that the changing rate $G_s$ of the slip amount s is lower than −0.5 g, then the retard rate is re-set to the II level at step P15, whereafter the control sequence advances to step P4.

If it is judged at step P13 that the slip amount s of the front wheels 64 and 65 is equal to or higher than 12 km per hour, that is, a considerable amount of slip takes place with the front wheels 64 and 65, then the retard rate of the III level is maintained and the III level is outputted to the ECU 15 at step P16. Meanwhile, if it is judged at step P14 that the changing rate $G_s$ of the slip amount s is equal to or higher than −0.05 g, that is, there is the tendency that the slip is increasing, then it is judged at step 17 whether the slip amount s is lower than 5 km per hour.

In case it is judged at step P17 that the slip amount s is equal to or higher than 5 km per hour, that is, the slip amount s is equal to or higher than 5 km per hour but is equal to or lower than 12 km per hour, the retard rate of the III level is maintained and outputted to the ECU 15 also at step P18. However, if it is judged that the slip s is lower than 5 km per hour, then it is judged at step P19 whether or not the changing rate $G_s$ of the slip amount s is lower than 0 g, that is, the vehicle 82 is in a decelerating condition.

If it is judged at step P19 that the changing rate $G_s$ of the slip amount s is lower than 0 g, then the retard rate is re-set to the 0 level and the thus set 0 level is outputted to the ECU 15 at step P20. On the contrary, if it is judged at step P19 that the changing rate $G_s$ of the slip amount is equal to or higher than 0 g, that is, the vehicle 82 is in an accelerating condition, then it is judged at step P21 whether or not the slip amount s is lower than 0 km per hour.

Then, if it is judged at step P21 that the slip amount s is lower than 0 km per hour, then the retard rate is re-set to the 0 level and the 0 level thus set is outputted to the ECU 15 at step P22. On the contrary, in case it is judged at step P21 that the slip amount s is equal to or higher than 0 km per hour, since this means that there is the possibility that the slip may increase, the retard rate of the III level is maintained and outputted to the ECU 15 at step P23.

The ECU 15 reads out, from a map (not shown) regarding a fundamental retard amount $P_B$ and an ignition timing P set in advance in accordance with an engine rotational speed $N_E$ and an intake air amount of the engine 11, an ignition timing P and a fundamental retard amount $P_B$ in response to a detection signal from the crank angle sensor 62 and another detection signal from the air flow sensor, and corrects the thus read ignition timing P and fundamental retard amount $P_B$ in accordance with a retard rate received from the TCL 76 to calculate an aimed retard amount $P_O$. In this instance, an upper limit value of the aimed retard amount $P_O$ is set corresponding to an upper limit temperature of exhaust gas at which an exhaust gas purifying catalyzer not shown is not damaged, and a temperature of exhaust gas is detected from a detection signal from the exhaust air temperature sensor 74.

It is to be noted that, in case the temperature of cooling water of the engine 11 detected by the water temperature sensor 71 is lower than a preset value. there is the possibility that, if the ignition timing P is retarded, then this may cause knocking or a stall of the engine 11, and accordingly, such retarding operation of the ignition timing P described below is suspended.

A procedure of calculation of an aimed retard amount $P_O$ in such retard control is illustrated in FIG.

Figure 26:
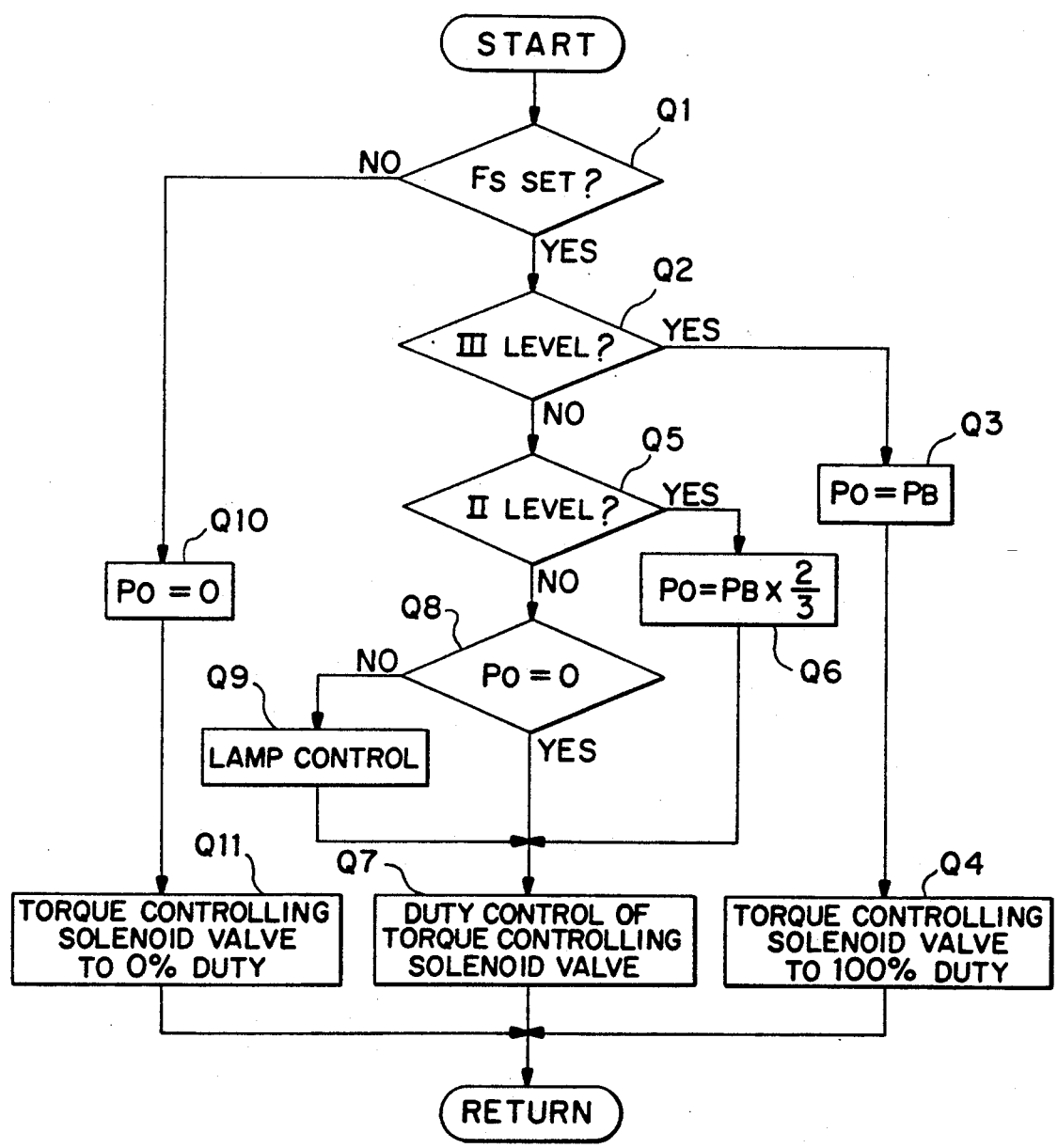
FIG. 26 is flow chart illustrating a procedure of output control of the engine.

26. Referring to FIG. 26, the ECU 15 first judges at step Q1 whether or not the slip control flag $F_S$ is in a set state. If it is judged that the slip control flag $F_S$ is in a set state, then it is judged at step Q2 whether or not the retard rate is set at the III level.

Then, in case it is judged at step Q2 that the retard rate is the III level, then the fundamental retard amount $P_B$ read out from the map as described hereinabove is utilized as it is, at step Q3, to retard the ignition timing P by the aimed retard amount $P_O$. Further, in order to put the throttle valve 20 into its fully closed condition irrespective of a value of the aimed driving torque $T_{OS}$, the duty ratio of the torque controlling solenoid valves 51 and 56 is set to 100% to compulsorily realize an idling condition of the engine 11.

On the other hand, in case it is judged at step Q2 that the retard rate is not the III level, it is judged subsequently at step Q5 whether or not the retard rate is set at the II level.

Then, if it is judged at step Q5 that the retard rate is the II level, then an aimed retard amount $P_O$ is set in accordance with the following expression and the ignition timing P is retarded by such aimed retard amount $P_O$ at step Q6.

$$P_O = P_B \cdot \frac{2}{3}$$

Further, the ECU 15 sets, at step Q7, a duty ratio of the torque controlling solenoid valves 51 and 56 in accordance with a value of the aimed driving torque $T_{OS}$ and reduces the driving torque of the engine 11 irrespective of an amount of operation of the accelerator pedal 31 by the driver.

Here, the ECU 15 has a map stored therein for determining a throttle opening $\theta_T$ using an engine rotational speed $N_E$ and a driving torque of the engine 11 as parameters, and thus, the ECU 15 reads out, using the map, an aimed throttle opening $\theta_{TO}$ corresponding to the current engine rotational speed $N_E$ and the aimed driving torque $T_{OS}$.

Subsequently, the ECU 15 calculates a deviation of an actual throttle opening $\theta_T$ received from the throttle opening sensor 67 from the aimed throttle opening $\theta_{TO}$, sets the duty ratio of the pair of torque controlling solenoid valves 51 and 56 to a value corresponding to the deviation and controls the torque controlling solenoid valves 51 and 56 so that electric current may flow through the solenoids for the plungers of the torque controlling solenoid valves 51 and 56 to lower the actual throttle opening $\theta_T$ to the aimed throttle opening $\theta_{TO}$ by operation of the actuator 41.

It is to be noted that, in case the maximum torque of the engine 11 is outputted as an aimed driving torque $T_{OS}$ to the ECU 15, the ECU 15 lowers the duty ratio of the torque controlling solenoid valves 51 and 56 to the 0% side to cause the engine 11 to generate a driving torque corresponding to an amount of operation of the accelerator pedal 31 by the driver.

On the other hand, in case it is judged at step Q5 that the retard rate is not the II level, it is judged subsequently at step Q8 whether or not the aimed retard amount $P_O$ is 0. Then, if it is judged that the aimed retard amount $P_O$ is 0, then the control sequence advances to step Q7 at which a duty ratio of the torque controlling solenoid valves 51 and 56 is set in accordance with a value of the aimed driving torque $T_{OS}$ without retarding the ignition timing. Consequently, the driving torque of the engine 11 is reduced irrespective of an amount of operation of the accelerator pedal 31 by the driver.

In the meantime, in case it is judged at step Q8 that the aimed retard amount $P_O$ is not 0, if the aimed retard amount $P_O$ is reduced to 0 immediately, then the amount of variation of the driving torque of the engine 11 is increased excessively so that a shock may be caused, and accordingly, in order to eliminate such situation, the aimed retard amount $P_O$ is decremented, at step Q9, for example, by 1 degrees for each sampling period $\Delta t$ of the main timer by ramp control until $P_O = 0$ is reached, whereafter the control sequence advances to step Q7.

It is to be noted that, in case it is judged at step Q1 that the slip control flag $F_S$ is in a reset state, normal driving control wherein the driving torque of the engine 11 is not reduced should be executed, and accordingly, the aimed retard amount $P_O$ is set to $P_O = 0$ at step Q10 so that the ignition timing P may not be retarded. Then at step Q11, the duty ratio of the torque controlling solenoid valves 51 and 56 is set to 0% so that the engine 11 generates a driving torque corresponding to an amount of operation of the accelerator pedal 31 by the driver.

Subsequently, an engine output controlling system for a vehicle according to a second preferred embodiment of the present invention will be described. The present system has substantially similar general construction to that of the system of the first embodiment (refer to FIGS. 1 and 2) described hereinabove, but additionally includes a steering shaft reference position sensor 86 connected to the TCL 76 for detecting a normal phase for each 360 degrees of the steering handle 85 integrated with the steering shaft 83 (such phase includes a phase in which the vehicle 82 presents a substantially straightforwardly driving condition). Further, the present system includes a throttle valve actuating mechanism similar to that of the system of the first embodiment (refer to FIG. 3) and is controlled in accordance with a substantially similar general flow of operations to that of the system of the first embodiment (refer to FIG. 4). However, the system is different in contents of neutral position learning and correction of the steering shaft and calculation of an aimed driving torque from those of the system of the first embodiment described hereinabove.

Figure 27B:
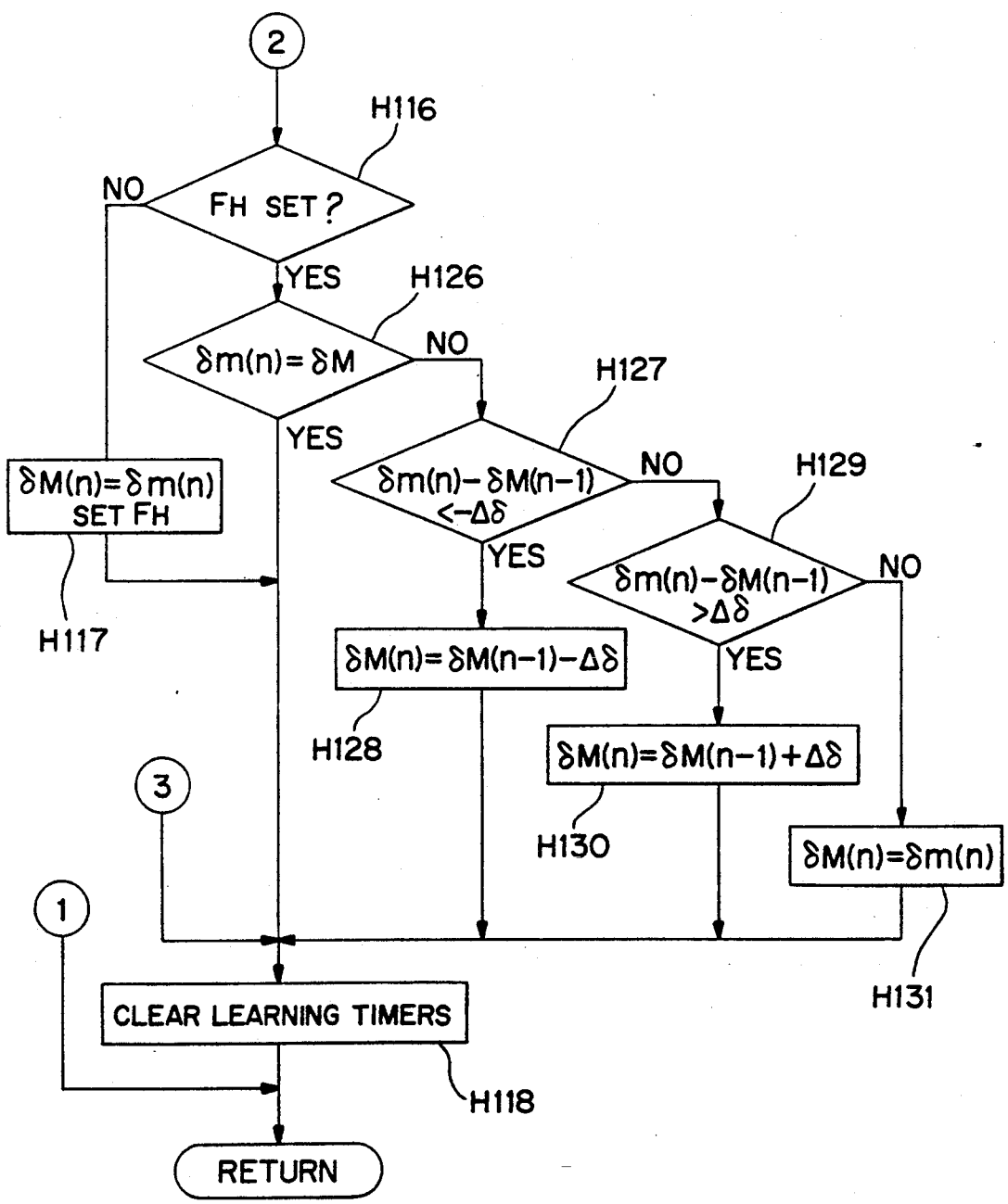

A procedure of learning and correcting the neutral position $\delta_M$ of the steering shaft is illustrated in FIG. 27. Referring to FIG. 27, the TCL 76 first judges at step H101 whether or not the turning control flag $F_C$ is in a set state, that is, the vehicle 82 is proceeding its turning control. Then, if it is judged at step H101 that the vehicle 82 is proceeding its turning control, then learning and correction of the neutral position $\delta_M$ of the steering shaft 83 is not executed because there is the possibility that, otherwise if learning and correction of the neutral position $\delta_M$ of the steering shaft 83 is executed, then the output of the engine 11 may vary suddenly, which may deteriorate the driving feeling of the vehicle 82.

On the contrary, if it is judged at step H101 that the vehicle 82 is not proceeding its turning control, then since no trouble will be caused even if learning and correction of the neutral position $\delta_M$ of the steering shaft 83 is executed, the TCL 76 calculates, at step H102, a car speed V for the learning of the neutral position $\delta_M$ and for turning control which will be hereinafter described in accordance with the expression (1)

given hereinabove from detection signals from the rear wheel rotation sensors 80 and 81. Subsequently at step H103, the TCL 76 calculates a difference between rear wheel speeds $V_{RL}$ and $V_{RR}$, that is, a rear wheel speed difference $|V_{RL}-V_{RR}|$. Then at step H104, the TCL 76 judges whether or not learning and correction of the neutral position $\delta_M$ has been executed in a condition wherein the reference position $\delta_N$ of the steering shaft 83 is detected by the steering shaft reference position sensor 86, that is, whether or not a steering angle neutral position learning completion signal $F_{HN}$ is in a set state in a condition wherein the reference position $\delta_M$ of the steering shaft 83 is detected.

At a point of time immediately after an operation of the ignition key switch 75 to be switched on, the steering angle neutral position learning completion flag $F_{HN}$ is not in a set state, that is, learning of the neutral position $\delta_M$ is to be executed subsequently for the first time. Accordingly, the control sequence advances from step H104 to step H105 at which it is judged whether or not a steering shaft turning position $\delta_{m(n)}$ calculated in the present control cycle is equal to another steering angle turning position $\delta_{m(n-1)}$ calculated in a preceding control cycle. In this instance, the turning angle detecting resolution of the steering shaft 83 by the steering sensor 84 is preferably set, for example, to 5 degrees or so in order to eliminate a possible influence of an inadvertent movement of a hand of the driver of the like.

In case it is judged at step H105 that the steering shaft turning position $\delta_{m(n)}$ calculated in the present control cycle is equal to the steering shaft turning position $\delta_{m(n-1)}$ calculated in the preceding cycle, it is judged subsequently at step H106 whether or not the car speed V is equal to or higher than a preset threshold value $V_A$. Such operation is necessary because a rear wheel speed difference $|V_{RL}-V_{RR}|$ and so forth involved in steering cannot be detected otherwise unless the speed of the vehicle 82 rises to a certain degree, and the threshold value $V_A$ is set suitably, for example, to 10 km per hour by experiments or the like in accordance with driving characteristics of the vehicle 82 and so forth.

Then, in case it is judged at step H106 that the car speed V is equal to or higher than the threshold value $V_A$, the TCL 76 judges at step H107 whether or not the rear wheel speed difference $|V_{RL}-V_{RR}|$ is equal to or smaller than a preset threshold value $V_X$ such as, for example, 0.3 km per hour, that is, whether or not the vehicle 82 is in a straightforwardly driving condition. Here, the reason why the threshold value $V_X$ is not set to 0 km per hour is that it is intended to prevent such a possible erroneous judgement when the pneumatic pressures of the tires of the left and right rear wheels 78 and 79 are not equal to each other that, although the vehicle 82 is in a straightforwardly driving condition, the vehicle 82 is not in a straightforwardly driving condition because the pair of left and right rear wheels 78 and 79 present different circumferential speeds $V_{RL}$ and $V_{RR}$.

Figure 28:
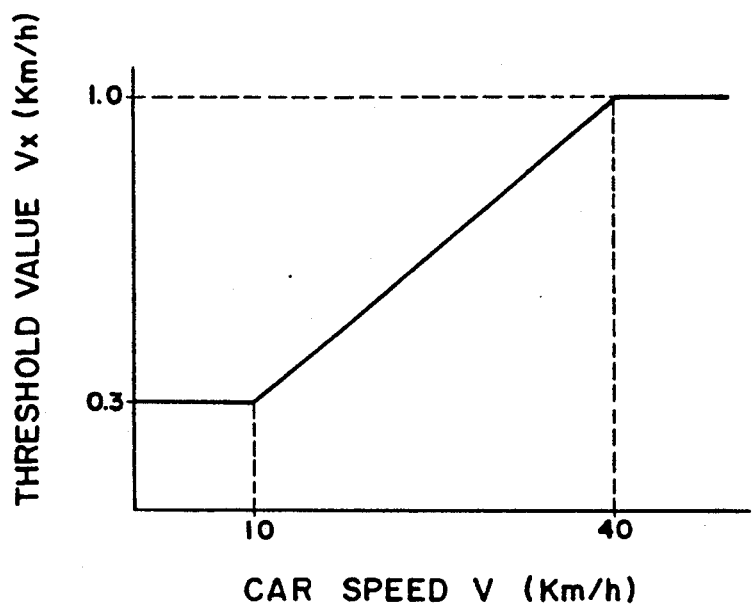
FIG. 28 is a map illustrating a relationship between a car speed and a variable threshold value.

It is to be noted that, when the air pressures of the left and right rear wheels 78 and 79 are not equal to each other, the rear wheel speed difference $|V_{RL}-V_{RR}|$ has a tendency that it increases in proportion to the car speed V, and accordingly, alternatively such threshold value $V_X$ may be represented in the form of such a map as shown, for example, in FIG. 28 so that a threshold value $V_X$ may be read out from the map in accordance with a car speed V.

In case it is judged at step H107 that the rear wheel speed difference $|V_{RL}-V_{RR}|$ is equal to or smaller than the threshold value $V_X$, it is judged subsequently at step H108 whether or not the steering shaft reference position sensor 86 detects a reference position $\delta_N$ of the steering shaft 83. Then, if it is judged at step H108 that the steering shaft reference position sensor 86 detects the reference position $\delta_N$ of the steering shaft 83, that is, the vehicle 82 is in a straightforwardly driving condition, counting of a first learning timer (not shown) built in the TCL 76 is started at step H109.

Subsequently, the TCL 87 judges at step H110 whether or not an interval of 0.5 seconds has elapsed after starting of counting of the first learning timer, that is, whether or not the straightforwardly advancing condition of the vehicle 82 has continued for 0.5 seconds. Then, in case an interval of 0.5 seconds has not elapsed after starting of counting of the first learning timer, it is judged at step H111 whether or not the car speed V is equal to or higher than the threshold value $V_A$ described hereinabove. If it is judged at step H111 that the car speed V is equal to or higher than the threshold value $V_A$, then it is judged at step H112 whether or not the rear wheel speed difference $|V_{RL}-V_{RR}|$ is equal to or lower than another threshold value $V_B$ such as 0.1 km per hour. In case it is judged at step H112 that the rear wheel difference $|V_{RL}-V_{RR}|$ is equal to or lower than the threshold value $V_B$, that is, the vehicle 82 is in a straightforwardly driving condition, counting of a second learning timer (not shown) built in the TCL 76 is started subsequently at step H113.

Then, it is judged at step H114 whether or not an interval of 5 seconds has elapsed after starting of counting of the second learning timer, that is, whether or not the straightforwardly driving condition of the vehicle 82 has continued for 5 seconds, and then if an interval of 5 seconds has not elapsed yet after starting of counting of the second learning timer, then the control sequence returns to step H102 to repeat such operations of the steps H102 to H114 as described above.

If, during such repetitive operation, it is judged at step H108 that the steering shaft reference position sensor 86 detects the reference position $\delta_N$ of the steering shaft 83 and then counting of the first learning timer is started at step H109 whereafter it is judged at step H110 that 0.5 seconds have elapsed after starting of counting of the first learning timer, that is, the straightforwardly driving condition of the vehicle 82 has continued for 0.5 seconds, then the steering angle neutral position learning completion flag $F_{HN}$ in a condition wherein the reference position $\delta_N$ of the steering shaft 83 is detected is set at step H115. Then at step H116, it is judged whether or not another steering angle neutral position learning completion flag $F_H$ in a condition wherein the reference position $\delta_N$ of the steering shaft 83 is not detected is in a set state. Also in case it is judged at step H114 that 5 seconds have elapsed after starting of counting of the second learning timer, the control sequence advances to step H116.

Since the steering angle neutral position learning completion flag $F_H$ in a condition wherein the reference position $\delta_N$ of the steering shaft 83 is not detected is not yet in a set state as a result of the operations executed till then, it is judged at step H116 that the steering angle neutral position learning completion flag $F_H$ in a condition wherein the reference position $\delta_N$ of the steering shaft 83 is not detected is not yet in a set state, that is, learning of the neutral position in a condition wherein the reference position $\delta_N$ of the steering shaft 83 is detected is the first time learning. Thus, the control sequence advances to step H117 at which the current steering shaft turning position $\delta_{m(n)}$ is regarded as a new neutral position $\delta_{M(n)}$ of the steering shaft 83 and read into a memory in the TCL 76 and further the steering shaft neutral position learning completion flag $F_H$ in a condition wherein the reference position $\delta_N$ of the steering shaft 83 is not detected is set.

In this manner, a turning angle $\delta_H$ of the steering shaft 83 is calculated with reference to the neutral position of the steering shaft 83 after a new neutral position $\delta_{M(n)}$ of the steering shaft 83 is set. After then, the count values of the learning timers are cleared at step H118 to permit learning of the steering angle neutral position to be executed subsequently again.

It is to be noted that, in case it is judged at step H105 that the steering shaft turning position $\delta_{m(n)}$ calculated in the present control cycle is not equal to the steering shaft turning position $\delta_{m(n-1)}$ calculated in the preceding control cycle, or in case it is judged at step H111 that the car speed V is not equal to nor higher than the threshold vale $V_A$, or in case it is judged at step H112 that the reliability of the rear wheel speed difference $|V_{RL}-V_{RR}|$ is low, that is, the rear wheel speed difference $|V_{RL}-V_{RR}|$ is greater than the threshold value $V_B$, since this means that the vehicle 82 is not in a straightforwardly driving condition, the control sequence advances to step H118.

Meanwhile, in case it is judged at step H107 that the rear wheel speed difference $|V_{RL}-V_{RR}|$ is greater than the threshold value $V_X$ or in case it is judged at step H108 that the steering shaft reference position sensor 86 does not detect the reference position $\delta_N$ of the steering shaft 83, the control sequence advances to step H119 at which the count value of the first learning timer is cleared, whereafter the control sequence advances to step H111. However, also when it is judged at step H106 that the car speed V is lower than the threshold value $V_A$, since it cannot be determined that the vehicle 82 is in a straightforwardly driving condition, the control sequence advances to step H111.

On the other hand, in case it is judged at step H104 that the steering angle neutral position learning completion flag $F_{HN}$ in a condition wherein the reference position $\delta_N$ of the steering shaft 83 is detected is in a set state, that is, the current learning of the neutral position $\delta_M$ is the second time learning or any following learning, it is judged subsequently at step H120 whether or not the steering shaft reference position sensor 86 detects the reference position $\delta_N$ of the steering shaft 83. Then, if it is judged at step H120 that the steering shaft reference position sensor 86 detects the reference position $\delta_N$ of the steering shaft 83, it is judged subsequently at step H121 whether or not the car speed V is equal to or higher than the preset threshold value $V_A$.

In case it is judged at step H121 that the car speed V is equal to or higher than the threshold value $V_A$, the TCL 76 subsequently judges at step H122 whether or not the rear wheel speed difference $|V_{RL}-V_{RR}|$ is equal to or lower than the threshold value $V_X$, that is, whether or not the vehicle 82 is in a straightforwardly driving condition. Then, if it is judged at step H122 that the rear wheel speed difference $|V_{RL}-V_{RR}|$ is equal to or lower than the threshold value $V_X$, then it is judged at step H123 whether or not the steering shaft turning position $\delta_{m(n)}$ calculated in the present control cycle is equal to the steering shaft turning position $\delta_{m(n-1)}$ calculated in the preceding control cycle. If it is judged at step H123 that the steering shaft turning position $\delta_{m(n)}$ calculated in the present control cycle is equal to the steering shaft turning position $\delta_{m(n-1)}$ calculated in the preceding control cycle, then counting of the first learning timer is started at step H124.

Subsequently, the TCL 76 judges at step H125 whether or not 0.5 seconds have elapsed after starting of counting of the first learning timer, that is, whether or not a straightforwardly driving condition of the vehicle 82 has continued for 0.5 seconds, and in case 0.5 seconds have not elapsed yet after starting of counting of the first learning timer, the control sequence returns to step H102 to repeat the operations of the steps H102 to H104 and H120 to H125 described above. On the contrary, in case it is judged at step H125 that 0.5 seconds have elapsed after starting of counting of the first learning timer, the control sequence advances to step H116.

It is to be noted that, in case it is judged at step H120 that the steering shaft reference position sensor 86 does not detect the reference position $\delta_N$ of the steering shaft 83, or in case it is judged at step H121 that the car speed V is not equal to nor higher than the threshold value $V_A$, or in case it is judged at step H122 that the reliability of the rear wheel speed difference $|V_{RL}-V_{RR}|$ is low, that is, the rear wheel speed difference $|V_{RL}-V_{RR}|$ is higher than the threshold valve $V_X$, or in case it is judged at step H123 that the steering shaft turning position $\delta_{m(n)}$ calculated in the present control cycle is not equal to the steering shaft turning position $\delta_{m(n-1)}$ calculated in the preceding control cycle, the control sequence advances to step H118.

In case it is judged at step H116 that the steering angle neutral position learning completion flag $F_H$ is in a set state, that is, the learning of the neutral position $\delta_M$ is the learning for the second time or any other following time, the TCL 76 judges at step H126 whether or not the current steering shaft turning position $\delta_{m(n)}$ is equal to the preceding neutral position $\delta_{M(n-1)}$ of the steering shaft 83, that is:

$$\delta_{m(n)} = \delta_{M(n-1)}.$$

Then, in case it is judged that the current steering shaft turning position $\delta_{m(n)}$ is equal to the preceding neutral position $\delta_{M(n-1)}$ of the steering shaft 83, the control sequence advances directly to step H118 at which next neutral position learning is executed.

In case it is judged at step H126 that the current steering shaft turning position $\delta_{m(n)}$ is not equal to the preceding neutral position $\delta_{M(n-1)}$ of the steering shaft 83 due to a play of the steering system and so forth, in the present embodiment, the current steering shaft turning position $\delta_{m(n)}$ is not judged immediately as a new neutral position $\delta_{M(n)}$ of the steering shaft 83, but in case the absolute value of a difference between them is greater than a preset correction limit amount $\Delta\delta$, a value of the preceding steering shaft turning position $\delta_{m(n-1)}$ from or to which the correction limit amount $\Delta\delta$ is subtracted or added is determined as a new neutral position $\delta_{M(n)}$ of the steering shaft 83, and the value is read into the memory in the TCL 76.

In particular, the TCL 76 judges at step H127 whether or not a value obtained by subtraction of the preceding neutral position $\delta_{M(n-1)}$ of the steering shaft 83 from the current steering shaft turning position $\delta_{m(n)}$ is smaller than the preset negative correction limit value $-\Delta\delta$. Then, in case it is judged at step H127 that the value obtained by such subtraction is smaller than the negative correction limit amount $-\Delta\delta$, the new neutral position $\delta_{M(n)}$ is changed, at step H128, with the preceding neutral position $\delta_{M(n-1)}$ of the steering shaft 83 and the negative correction limit amount $-\Delta\delta$, to $$\delta_{M(n)} = \delta_{M(n-1)} - \Delta\delta$$

so that the learning correction amount for one time of correction may not increase unconditionally to the negative side.

Consequently, even if an extraordinary detection signal is developed from the steering angle sensor 84 by some causes, the neutral position $\delta_M$ of the steering shaft 83 does not change suddenly, and the engine output controlling system can rapidly cope with such extraordinary condition.

On the other hand, in case it is judged at step H127 that the value obtained by such subtraction as described above is equal to or higher than the negative correction limit amount $-\Delta\delta$, it is judged subsequently at step H129 whether or not the value obtained by subtraction of the preceding neutral position $\delta_{M(n-1)}$ of the steering shaft 83 from the current steering shaft turning position $\delta_{m(n)}$ is higher than the positive correction limit amount $\Delta\delta$, the new neutral position $\delta_{M(n)}$ of the steering shaft 83 is changed, at step H130, with the preceding neutral position $\delta_{M(n-1)}$ of the steering shaft 83 and the positive correction limit amount $\Delta\delta$, to $$\delta_{M(n)} = \delta_{M(n-1)} + \Delta\delta$$

so that the learning correction amount for one time of learning may not increase unconditionally to the positive side.

Consequently, even if an extraordinary detection signal is developed from the steering angle sensor 84 by some causes, the neutral position $\delta_M$ of the steering shaft 83 does not change suddenly, and the controlling system can rapidly cope with such extraordinary condition.

On the other hand, in case it is judged at step H129 that the value obtained by such subtraction as described above is equal to or lower than the positive correction limit amount $\Delta\delta$, the current steering shaft turning position $\delta_{m(n)}$ is read out as a new neutral position $\delta_{M(n)}$ of the steering shaft 83 at step H131.

In this manner, in the present embodiment, such measure is adopted that, when a neutral position $\delta_M$ of the steering shaft 83 is to be learned and corrected, a detection signal from the steering shaft reference position sensor 86 is utilized in addition to a rear wheel speed difference $|V_{RL} - V_{RR}|$, and accordingly, a neutral position $\delta_M$ of the steering shaft 83 is learned and corrected after a comparatively short interval of time after starting of the vehicle 82. Besides, even if the steering shaft reference position sensor 86 should fail by some causes, a neutral position $\delta_M$ of the steering shaft 83 can be learned and corrected only with a rear wheel speed difference $|V_{RL} - V_{RR}|$. Accordingly, the controlling system is superior in safety.

Figure 29:
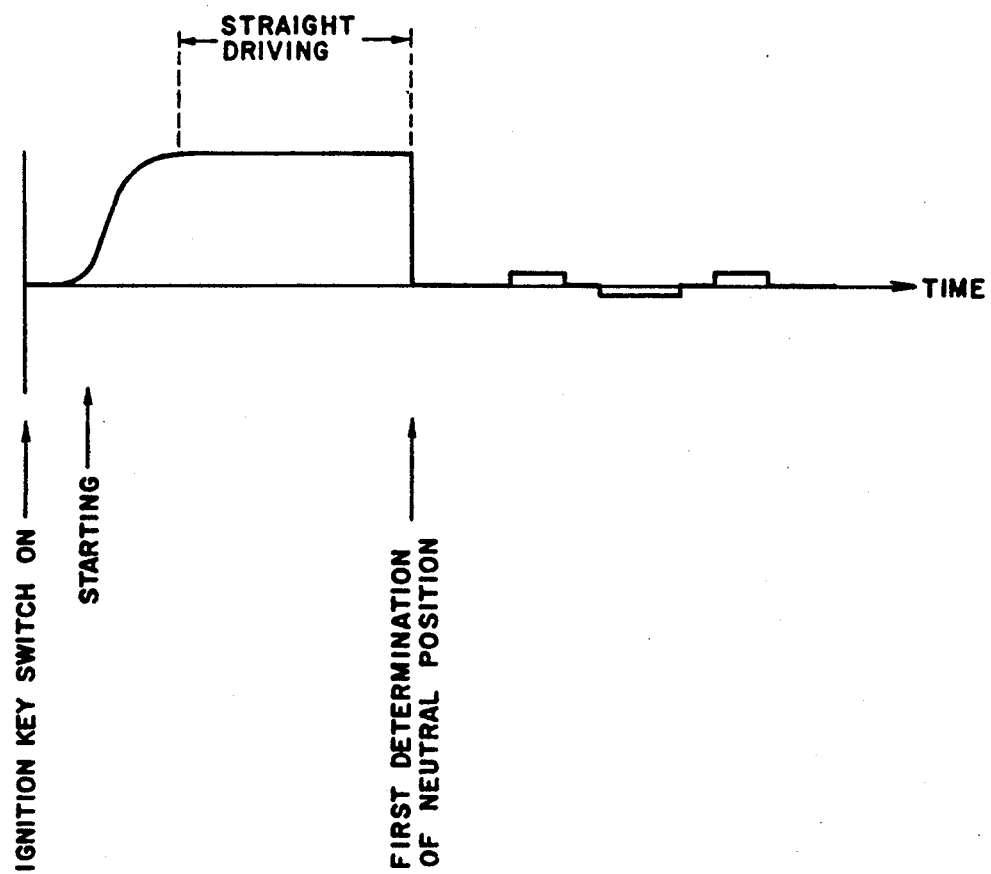
FIG. 29 is a graph illustrating a varying condition of a neutral position of the steering shaft when a neutral position of the steering shaft is learned and corrected.

Accordingly, if the vehicle 82 in a stopping condition starts to drive while the front wheels 64 and 65 are left in a turned condition, then when learning control of a neutral position $\delta_M$ of the steering shaft 83 is the first time learning, the correction amount from the initial value $\delta_{m(0)}$ of the steering shaft turning position set at step M1 in the flow chart of FIG. 4 described hereinabove is very great as seen in FIG. 29 in which an example of a varying condition of the neutral position $\delta_M$ of the steering shaft 83 upon such starting is shown, but the neutral position $\delta_M$ of the steering shaft 83 upon learing for the second time or any following time is restricted by the operations at steps H117 and H119.

After a neutral position $\delta_M$ of the steering shaft 83 is learned and corrected in this manner, an aimed driving torque $T_{OS}$ when slip control for controlling the driving torque of the engine 11 is to be executed is calculated in accordance with a detection signal from the front wheel rotation sensor 66 and detection signals from the rear wheel rotation sensors 80 and 81.

By the way, since a coefficient of friction between a tire and a road can be regarded as equivalent to a changing rate of a car speed V of the vehicle 82, that is, an advancing direction acceleration $G_X$, an advancing direction acceleration $G_X$ is calculated, in the present embodiment, from detection signals from the rear wheel rotation sensors 80 and 81, and a reference driving torque $T_B$ of the engine 11 corresponding to a maximum value of such advancing direction acceleration $G_X$ is corrected with a deviation between a front wheel speed $V_F$ detected from the front wheel rotation sensor 66 and an aimed front wheel speed $V_{FO}$ corresponding to the car speed V, that is, a slip amount s to calculate an aimed driving torque $T_{OS}$.

Figure 30:
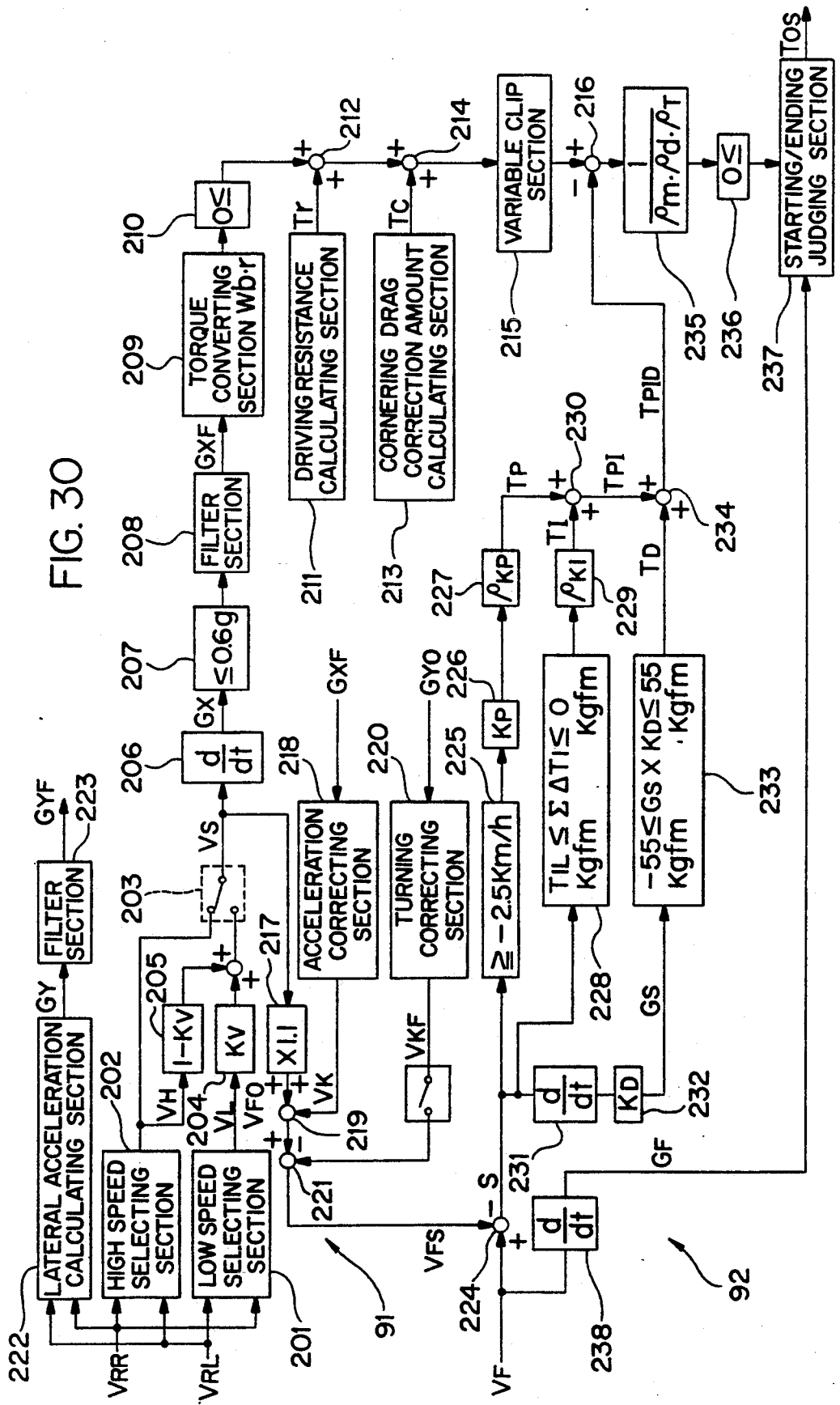
FIG. 30 is a block diagram illustrating a calculating procedure of an aimed driving torque for slip control.

In order to calculate such aimed driving torque $T_{OS}$ of the engine 11, the TCL 76 includes such aimed torque setting means 92 as shown in a calculation block diagram of FIG. 30. Referring to FIG. 30, the TCL 76 first calculates a car speed $V_S$ for slip control from detection signals from the rear wheel rotation sensors 80 and 81. Here, in the present embodiment, a smaller one of two rear wheel speeds $V_{RL}$ and $V_{RR}$ is selected as a first car speed $V_S$ for slip control at a low speed selecting section 201 while a higher one of the two rear wheel speeds $V_{RL}$ and $V_{RR}$ is selected as a second car speed $V_S$ for slip control at a high speed selecting section 202, and then one of outputs of the two selecting sections 201 and 202 is selectively taken into the TCL 76 by a change-over switch 203.

It is to be noted that, in the present embodiment, a first car speed $V_S$ to be selected by the change-over switch 203 is obtained by addition of a value obtained by multiplication at a multiplying section 204 of a lower one $V_L$ of the two rear wheel speeds $V_{RL}$ and $V_{RR}$ by a weighting coefficient $K_U$ corresponding to a car speed calculated in accordance with the expression (1) given hereinabove to another value obtained by multiplication at another multiplying section 205 of the other higher one $V_H$ of the two rear wheel speeds $V_{RL}$ and $V_{RR}$ by $1 - K_U$.

In particular, in a condition wherein the driving torque of the engine 11 is being reduced actually by slip control, in short, in a condition wherein the slip control flag $F_S$ is in a set state, a lower one of two rear wheel speeds $V_{RL}$ and $V_{RR}$ is selected as a car speed $V_S$ by the change-over switch 203, but in another condition wherein the driving torque of the engine 11 is not being reduced while a driver wishes slip control, in short, in a condition wherein the slip control flag $F_S$ is in a reset state, a higher one of the two rear wheel speeds $V_{RL}$ and $V_{RR}$ is selected as a car speed $V_S$.

This is intended to make it difficult to achieve changing over from a condition wherein the driving torque of the engine 11 is not being reduced to another condition wherein the driving torque of the engine 11 is being reduced and also to make it difficult to make a reverse change. In particular, it is intended to prevent such a situation that, when, for example, a lower one of the two rear wheel speeds $V_{RL}$ and $V_{RR}$ during turning of the vehicle 82 is selected as a car speed $V_S$, it is judged in error that, although no slip takes place with the front wheels 64 and 65, a slip takes place with the front wheels 64 and 65 and the driving torque of the engine 11 is being reduced. Also it is intended, taking the driving safety of the vehicle 82 into consideration, to cause, once the driving torque of the engine 11 is reduced, such condition to be continued.

On the hand, the reason why a lower value $V_L$ between the two rear wheel speeds $V_{RL}$ and $V_{RR}$ is multiplied, when a car speed $V_S$ is to be calculated at the low speed selecting section 201, by the weighting coefficient $K_U$ at the multiplying section 204 and then a value obtained by such multiplication is added to another value obtained by multiplication of a higher value $V_H$ between the two rear wheel speeds $V_{RL}$ and $V_{RR}$ by $1-K_U$ at the multiplying section 205 is that it is intended to eliminate such possibility that, when the vehicle drives a turning path having a small radius of curvature such as upon turning to the left or right, for example, at a crossing, the difference between an average value of circumferential speeds of the front wheels 64 and 65 and a lower value $V_L$ of the two rear wheel speeds $V_{RL}$ and $V_{RR}$ may be very great and consequently the correction amount of the driving torque may be excessively great due to feedback so that the acceleration of the vehicle 82 may be deteriorated.

Figure 31:
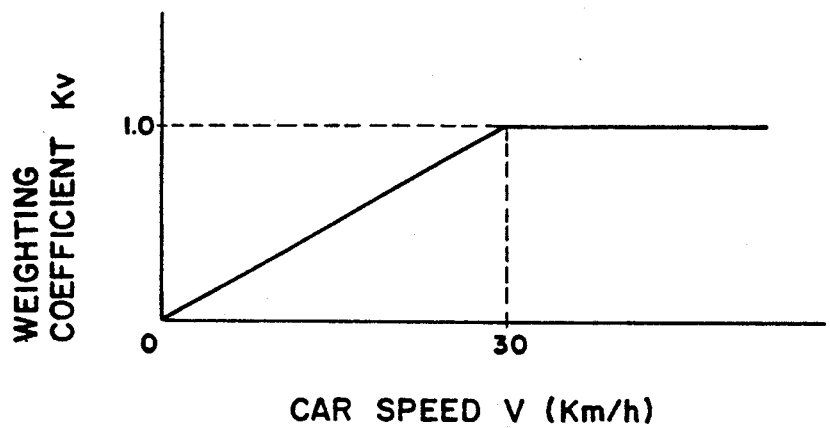

It is to be noted that, in the present embodiment, such weighting coefficient $K_U$ is read out from such a map as shown in FIG. 31 in accordance with a car speed V of the expression (1) which is an average value of circumferential speeds of the rear wheels 78 and 79.

While an advancing direction acceleration $G_X$ is calculated in accordance with a car speed $V_S$ for slip control calculated in such a manner as described above, a current advancing direction acceleration $G_{X(n)}$ of the vehicle 82 is first calculated at a differentiating section 206 from a car speed $V_{S(n)}$ calculated in the present control cycle and another car speed $V_{S(n-1)}$ calculated in a directly preceding control cycle in accordance with the following expression:

$$G_{X(n)} = \frac{V_{S(n)} - V_{S(n-1)}}{3.6 \cdot \Delta t \cdot g}$$

where $\Delta t$ is 15 milliseconds which is the sampling period of the present control, and g is the gravitational acceleration.

Then, in case the thus calculated advancing direction acceleration $G_{X(n)}$ is higher than 0.6 g, taking the safety against an error in calculation or the like into consideration, the advancing direction acceleration $G_{X(n)}$ is clipped to 0.6 g at a clipping section 207 so that the maximum value of the advancing direction acceleration $G_{X(n)}$ may not exceed 0.6 g. Further, filter processing for the removal of noises is executed at a filter section 208 to calculate a modified advancing direction acceleration $G_{XF}$.

Such filter processing is executed to correct the advancing direction acceleration $G_{X(n)}$ so that, since the advancing direction acceleration $G_{X(n)}$ of the vehicle 82 can be regarded as equivalent to a coefficient of friction between the tire and the road, even if the maximum value of the advancing direction acceleration $G_{X(n)}$ of the vehicle 82 varies to such a degree that the slip ratio S of the tire tends to come off from an aimed slip ratio $S_O$ corresponding to a maximum value of the coefficient of friction between the tire and the road or from around such aimed slip ratio $S_O$, the slip ratio S of the tire may be maintained at the aimed slip ratio $S_O$ corresponding to the maximum value of the coefficient of friction between the tire and the road or a value in the proximity of and lower than the aimed slip ratio $S_O$. More particularly, the filter processing is executed in the following manner.

In case the advancing direction acceleration $G_{X(n)}$ of the present control cycle is equal to or higher than a modified advancing direction acceleration $G_{XF(n-1)}$ after filter processing calculated in the preceding control cycle, in short, in case the vehicle 82 continues to be accelerated, a current modified advancing direction acceleration $G_{XF(n)}$ is calculated in accordance with the following expression:

$$G_{XF(n)} = \frac{28}{256} \cdot \Sigma\{G_{X(n)} - G_{XF(n-1)}\}$$

to effect removal of noises by retarding processing. Consequently, the modified advancing direction acceleration $G_{XF(n)}$ follows up the advancing direction acceleration $G_{X(n)}$ comparatively quickly.

On the other hand, in case the current advancing direction acceleration $G_{X(n)}$ is lower than the preceding modified advancing direction acceleration $G_{XF(n-1)}$, in short, when the vehicle 82 is not accelerated very high, the following processing is executed for each sampling period $\Delta t$ of the main timer.

When the slip control flag $F_S$ is not in a set state, in short, when the driving torque of the engine 11 is not being reduced by slip control, since the vehicle 82 is being decelerated, the current modified advancing direction acceleration $G_{XF(n)}$ is calculated in accordance with the following expression:

$$G_{XF(n)} = G_{XF(n-1)} - 0.002.$$

Consequently, a drop of the modified advancing direction acceleration $G_{XF(n)}$ is restricted to assure a responsibility of the vehicle 82 to a request for acceleration by the driver.

Meanwhile, also when the slip amount s is in the positive, that is, some slip takes place with the front wheels 64 and 65 in a condition wherein the driving torque of the engine 11 is being reduced by slip control, since there is no problem for the safety because the vehicle 82 is being decelerated, the current modified advancing direction acceleration $G_{XF(n)}$ is calculated in accordance with the following expression:

$$G_{XF(n)} = G_{XF(n-1)} - 0.002.$$

Consequently, reduction of the modified advancing direction acceleration $G_{XF}$ is restricted, and a responsibility of the vehicle 82 to a request for acceleration by the driver is assured.

Further, when the amount of slip with the front wheels 64 and 65 is in the negative, that is, when the vehicle 82 is being decelerated in a condition wherein the driving torque of the engine 11 is being reduced by slip control, the maximum value of the advancing direction acceleration $G_{XF}$ is maintained to assure a responsibility of the vehicle 82 to a request for acceleration by the driver.

Similarly, when a shifting up operation of the hydraulic automatic transmission 13 by the hydraulic controlling apparatus 16 is proceeding in a condition wherein the driving torque of the engine 11 is being reduced by slip control, the maximum value of the modified advancing direction acceleration $G_{XF}$ is maintained because it is necessary to assure an acceleration feeling of the driver.

Then, the modified advancing direction acceleration $G_{XF}$ from which noises have been removed at the filter section 208 is then converted into a torque at a torque converting section 209. Then, since a value calculated at the torque converting section 209 naturally has a positive value, it is clipped to a value greater than 0 at a clipping section 210 in order to prevent a possible error in calculation, and then a driving resistance $T_R$ calculated at a driving resistance calculating section 211 is added, at an adding section 212, to a value obtained by such clipping. Further, a cornering drag correction torque $T_C$ calculated at a cornering drag correction amount calculating section 213 in accordance with a detection signal from the steering angle sensor 84 is added to a value obtained by such addition at the adding section 212. Consequently, a reference driving torque $T_B$ represented by the following expression (9) is calculated:

$$T_B = G_{FO} \cdot W_b \cdot r + T_R + T_C \tag{9}$$

where $W_b$ is a weight of the vehicle 82, and r is an effective radius of the front wheels 64 and 65.

Figure 32:
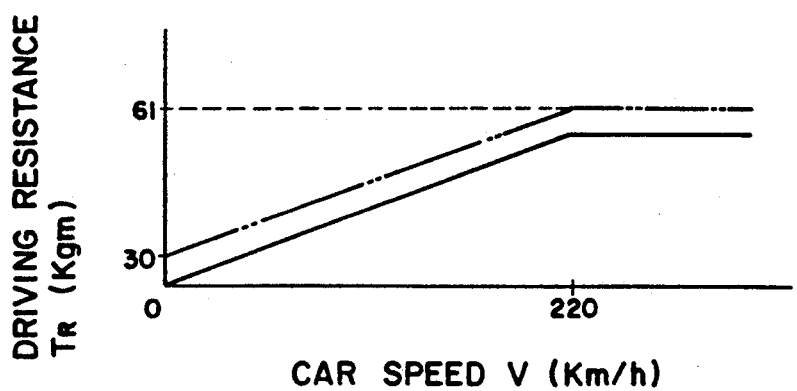
FIG. 32 is a map illustrating a relationship between a car speed and a weighting coefficient.

While the driving resistance $T_R$ can be calculated as a function of a car speed V, it is determined, in the present embodiment, from such a map as shown in FIG. 32 in which a map similar to the map of FIG. 10 and employed in the first embodiment described hereinabove is shown. In this instance, since the driving resistance $T_R$ is different between a flat road and an uphill road similarly as in the foregoing description, a curve for a flat road indicated by a full line and another curve for an uphill road indicated by an alternate long and two short dashes line in FIG. 32 are written in the map, and one of the curves is selected in accordance with a detection signal from an inclination sensor (not shown) incorporated in the vehicle 82. However, it is also possible to set a driving resistance $T_R$ further finely including a downhill road and so forth.

Figure 33:
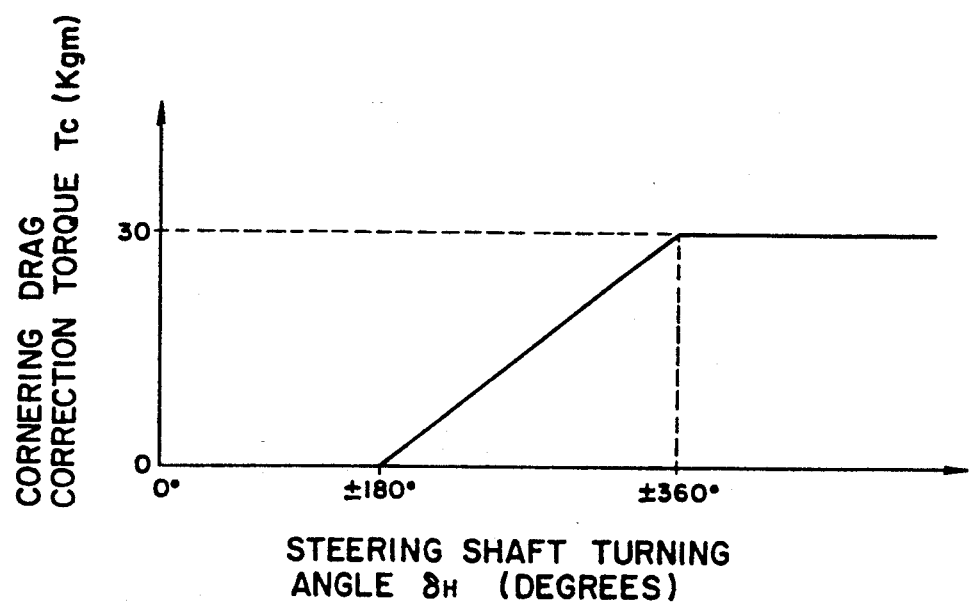
FIG. 33 is a map illustrating a steering shaft turning angle and a cornering drag correction torque.

Further, in the present embodiment, the cornering drag correction torque $T_C$ is determined from such a map as shown in FIG. 33, and consequently, a reference driving torque $T_B$ of the engine 11 proximate to that in an actual driving condition can be set. Since the reference driving torque $T_B$ of the engine immediately after a turning operation is rather high, the acceleration feeling of the vehicle 82 after it has passed the turning path is improved.

Figure 34:
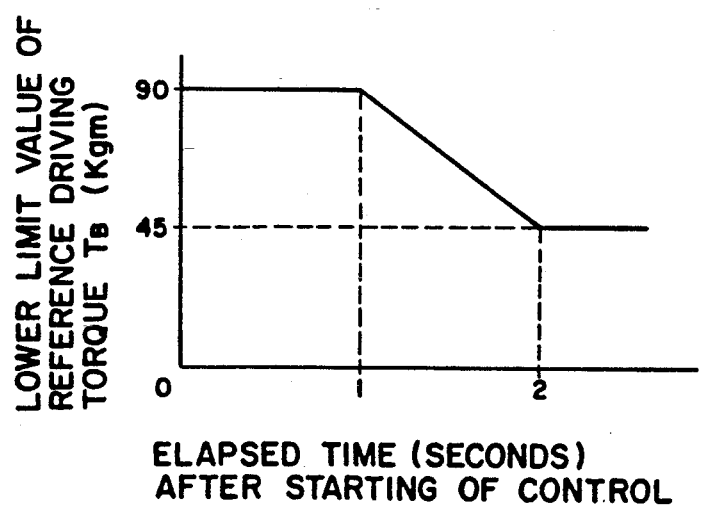
FIG. 34 is a map illustrating restriction of a lower limit value of an aimed driving torque directly after starting of slip control.

It is to be noted that, in the embodiment, since a lower limit value is set at a variable clipping section 215 for a reference driving torque $T_B$ calculated in accordance with the expression (9) given hereinabove, such a possible trouble is prevented that a value obtained by subtracting a final correction torque $T_{PID}$ which will be hereinafter described from such reference driving torque $T_B$ at a subtracting section 216 may have a negative value. The lower limit value of the reference driving torque $T_B$ is lowered in a stepwise manner in accordance with a time of lapse from a starting point of time of slip control as seen from such a map as shown in FIG. 34.

In the meantime, the TCL 76 calculates an actual front wheel speed $V_S$ from a detection signal from the front wheel rotation sensor 66 and executes feedback control of the reference driving torque $T_B$, using a slip amount s which is a deviation between the front wheel speed $V_F$ and an aimed front wheel speed $V_{FS}$ for correction torque calculation set in accordance with an aimed front wheel speed $V_{FO}$ which is set in turn in accordance with a car speed $V_S$ for slip control, to calculate an aimed driving torque $T_{OS}$ of the engine 11.

Figure 35:
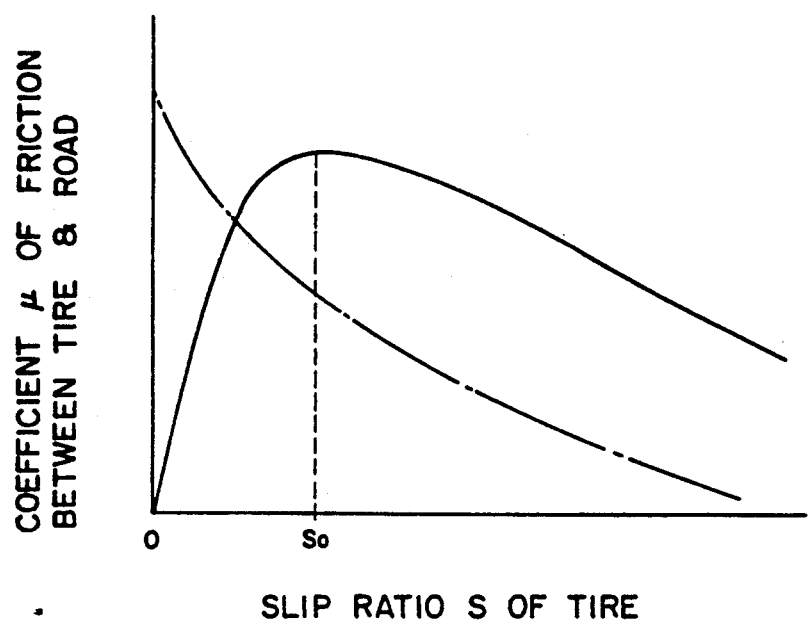
FIG. 35 is a graph showing a relationship between a slip ratio of a tire and a coefficient of friction between the tire and a road.

By the way, in order to cause a driving torque generated by the engine 11 to operate effectively upon acceleration of the vehicle 82, it is desirable to adjust the slip ratio S of the tires of the front wheels 64 and 65 during driving so that it may have a value, as indicated by a solid line in FIG. 35, equal to or in the proximity of and lower than an aimed slip ratio $S_O$ corresponding to a maximum value of a coefficient of friction between the tires and the road, thereby to prevent a possible loss of energy and further prevent possible deterioration of the driving performance and the acceleration performance of the vehicle 82.

Here, it is known that the aimed slip ratio $S_O$ is fluctuated within the range of 0.1 to 0.25 or so in response to a condition of a road, and in the case of the present embodiment, it is desirable for the front wheels 64 and 65 serving as driving wheels to produce, during driving of the vehicle 82, an amount s of slip of 10% or so with respect to a road. Taking those factors into consideration, an aimed front wheel speed $V_{FO}$ is set at a multiplying section 217 in accordance with the following expression:

$$V_{FO} = 1.1 \cdot V.$$

Figure 36:
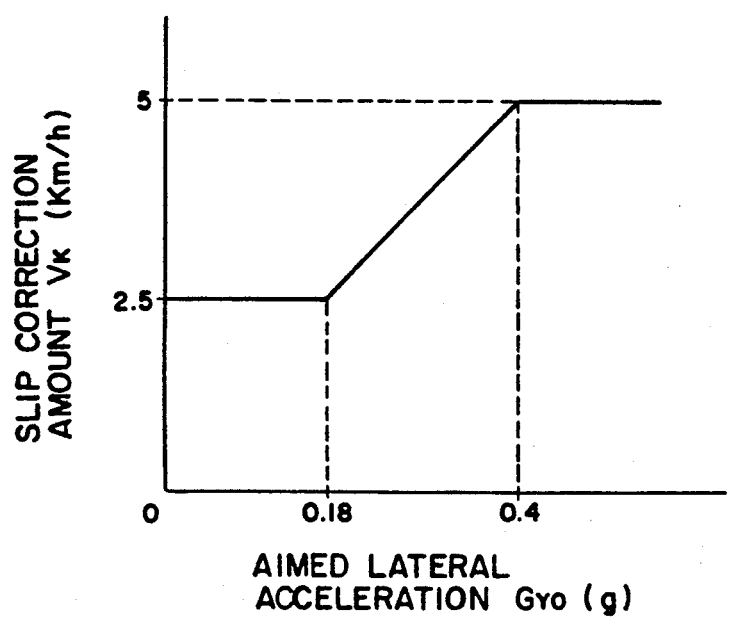
FIG. 36 is a map illustrating a relationship between an aimed lateral acceleration and a slip correction amount during acceleration.

Then, the TCL 76 reads out, at an acceleration correcting section 218, a slip correction amount $V_K$ corresponding to the aforementioned modified advancing direction acceleration $G_{XF}$ from such a map as shown in FIG. 36, and adds the slip correction amount $V_K$ to the aimed front wheel speed $V_{FO}$ for reference torque calculation at an adding section 219. While such slip correction amount $V_K$ has such a tendency that it increases in a stepwise manner as the value of the modified advancing direction acceleration $G_{XF}$ increases, such map is produced in accordance with a driving test and so forth in the present embodiment.

Consequently, the aimed front wheel speed $V_{FS}$ for correction torque calculation is increased, and the slip ratio S upon acceleration is set so that it may have a value equal to or in the proximity of and lower than an aimed slip $S_O$ indicated by a solid line in FIG. 35.

On the other hand, as seen from an alternate long and short dash line in FIG. 35 which indicates a relationship between a slip ratio S and a coefficient of friction between a tire and a road during turning, it can be recognized that a slip ratio of a tire at which the coefficient of friction between the tire and the road during turning presents a maximum value is considerably lower than an aimed slip ratio $S_O$ of the tire at which the coefficient of friction between the tire and the road during straightforward driving presents a maximum value. Accordingly, it is desirable for the aimed front wheel speed $V_{FO}$ to be set, during turning of the vehicle, to a value lower than that during straightforward driving of the vehicle 82 so that the vehicle 82 may turn smoothly.

Figure 37:
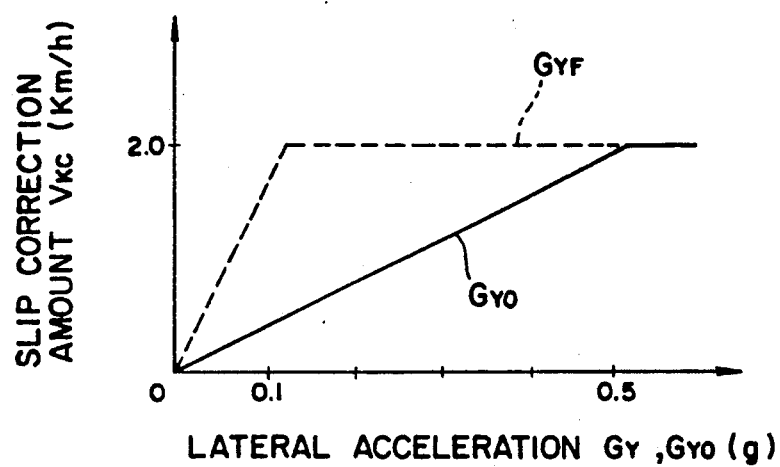
FIG. 37 is a map illustrating a relationship between a lateral acceleration and a slip correction amount during turning.

Thus, a slip correction amount $V_{KC}$ corresponding to the aforementioned aimed lateral acceleration $G_{YO}$ is read out, at a turning correcting section 220, from such a map as indicated by a solid line in FIG. 37 and is subtracted from the aimed front wheel speed $V_{FO}$ for reference torque calculation at a subtracting section 221. However, since there is no reliability on turning angle $\delta_H$ of the steering shaft 83 until after first learning of a neutral position $\delta_M$ of the steering shaft 83 is executed after a switching on operation of the ignition key switch 75, a slip correction amount $V_{KC}$ is read out from such a map as indicated by a broken line in FIG. 37 in accordance with a lateral acceleration $G_Y$ which acts actually upon the vehicle 82 depending upon circumferential speeds $V_{RL}$ and $V_{RR}$ of the rear wheels 78 and 79.

By the way, an aimed lateral acceleration $G_{YO}$ is determined in accordance with the expression (3) given hereinabove from a steering angle $\delta$ which is calculated in accordance with the expression (2) given hereinabove from a detection signal from the steering angle sensor 84, and the neutral position $\delta_M$ of the steering angle 83 is learned and corrected using the steering angle $\delta$.

Accordingly, it can be considered that, if some trouble takes place in the steering angle sensor 84 or the steering shaft reference position sensor 86, the aimed lateral acceleration $G_{YO}$ will have a quite wrong value. Thus, if some trouble should take place in the steering angle sensor 84 or the like, then an actual lateral acceleration $G_Y$ which is produced on the vehicle 82 is calculated using a rear wheel speed difference $|V_{RL}-V_{RR}|$, and the lateral acceleration $G_Y$ calculated in this manner is used in place of the aimed lateral acceleration $G_{YO}$.

More particularly, such actual lateral acceleration $G_Y$ is calculated in accordance with the following expression (10) from a rear wheel speed difference $|V_{RL}-V_{RR}|$ and a car speed V at a lateral acceleration calculating section 222 incorporated in the TCL 76, and a modified lateral acceleration $G_{YF}$ is employed which is obtained by executing noise removing processing from the thus calculated actual lateral acceleration $G_Y$ at a filter section 223.

$$G_Y = \frac{|V_{RL} - V_{RR}| \cdot V}{3.6^2 \cdot b \cdot g} \quad (10)$$

where b is a tread of the rear wheels 78 and 79. At the filter processing 223, low-pass processing is executed from the lateral acceleration $G_{Y(n)}$ calculated in the present control cycle and the modified lateral acceleration $G_{YF(n)}$ calculated in the preceding control cycle in accordance with the following digital calculation:

$$G_{YF(n)} = \Sigma \frac{20}{256} \{G_{Y(n)} - G_{YF(n-1)}\}$$

Figure 38:
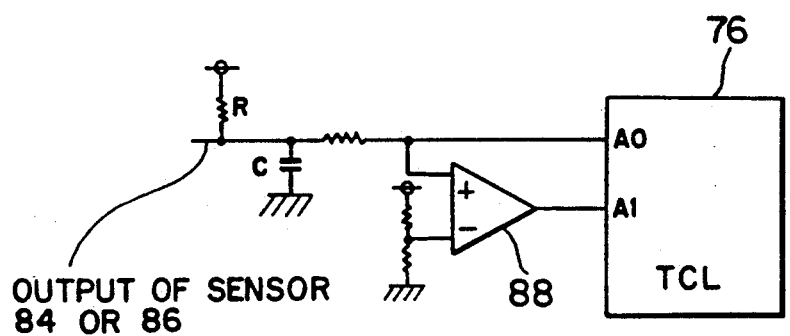
FIG. 38 is a circuit diagram of a circuit for detecting a failure of a steering angle sensor.

Whether or not some trouble has taken place with the steering angle sensor 84 or the steering shaft reference position sensor 86 can be detected at the TCL 76 by means of, for example, such a disconnection detecting circuit as shown in FIG. 38 or the like. Referring to FIG. 38, an output of each of the steering shaft sensor 84 and the steering shaft reference position sensor 86 is pulled up by a resistor R and grounded by way of a capacitor C and is further inputted directly to a terminal A0 of the TCL 76 so that it may be used for various controls while it is also inputted to another terminal A0 of the TCL 76 by way of a comparator 88. A specified value of 4.5 volts is applied as a reference voltage to a negative terminal of the comparator 88. If the steering angle sensor 84 should be disconnected, then the input voltage to the terminal A0 of the TCL 76 exceeds the specified value and turns the comparator 88 on, and accordingly, the input voltage to the terminal A1 continuously presents a high level H. Thus, the program of the TCL 76 is set such that, if the input voltage to the terminal A1 presents a high level H for a fixed period of time, for example, for 2 seconds, then it determines disconnection, thereby detecting occurrence of some trouble of the steering angle sensor 84 or the steering shaft reference position sensor 86.

While a trouble of the steering angle sensor 84 and so forth is detected by means of hardware in the embodiment described above, it is naturally possible to detect such trouble by means of software.

Figure 39:
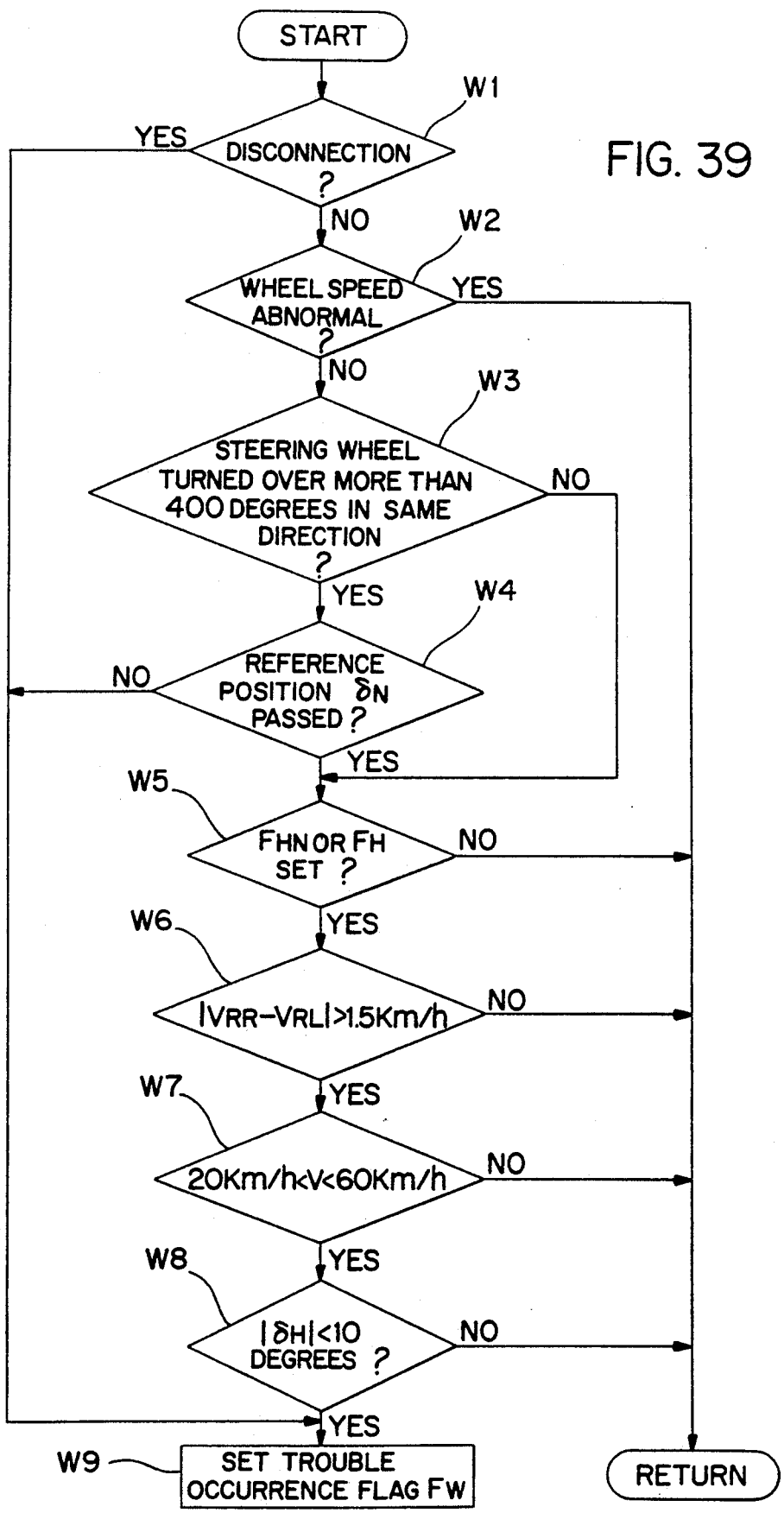
FIG. 39 is a flow chart illustrating a flow of operations of trouble detecting processing for the steering angle sensor.

An example of such procedure of detecting a trouble is illustrated in FIG. 39. Referring to FIG. 39, the TCL 76 first makes, at step W1, a determination of a trouble depending upon detection of disconnection illustrated in FIG. 38, and in case it determines no trouble, it subsequently judges at step W2 whether or not there is some trouble with the front wheel rotation sensor 66 and the rear wheel rotation sensors 80 and 81. In case it is judged at step W2 that there is no trouble with any of the rotation sensors 66, 80 and 81, it is judged at step W3 whether or not the steering shaft 83 has been steered more than one rotation, for example, more than 400 degrees in a same direction. In case it is judged at step W3 that the steering shaft 83 has been steered more than 400 degrees in a same direction, it is judged subsequently at step W4 whether or not a signal representative of the reference position $\delta_N$ of the steering shaft 83 has been received from the steering shaft reference position sensor 86.

Then, if it is judged at step W4 that a signal representative of the reference position $\delta_N$ of the steering shaft 83 has not been received, then since at least one signal representative of the reference position $\delta_N$ of the steering shaft 83 must have been received if the steering shaft reference position sensor 86 is normal, it is determined that the steering shaft sensor 84 is abnormal, and a trouble occurrence flag $F_W$ is subsequently set at step W9.

In case it is judged at step W3 that the steering shaft 83 has not been steered more than 400 degrees in one direction, or in case it is judged at step W4 that a signal representative of the reference position $\delta_N$ of the steering shaft 83 has been received from the steering shaft reference position sensor 86, it is subsequently judged at step W6 whether or not at least one of the two steering angle neutral position learning completion flags $F_{HN}$ and $F_H$ is in a set state.

Then, if it is judged at step W5 that learning of the neutral position $\delta_M$ of the steering shaft 83 has been completed, then if it is judged at step W6 that the rear wheel speed difference $|V_{RL}-V_{RR}|$ is greater than, for example, 1.5 km per hour and then if it is judged at step W7 that the car speed is within the range of, for example, 20 km per hour to 60 km per hour and besides it is judged at step W8 that the absolute value of the turning angle $\delta_H$ of the steering shaft 83 then is lower than, for example, 10 degrees, that is, the vehicle 82 is turning at a certain degree, then it is judged at step W9 that the steering angle sensor 84 is abnormal because, if the steering angle sensor 84 otherwise operates normally, then the absolute value of the turning angle $\delta_H$ must be equal to or greater than 10 degrees.

Figure 40:
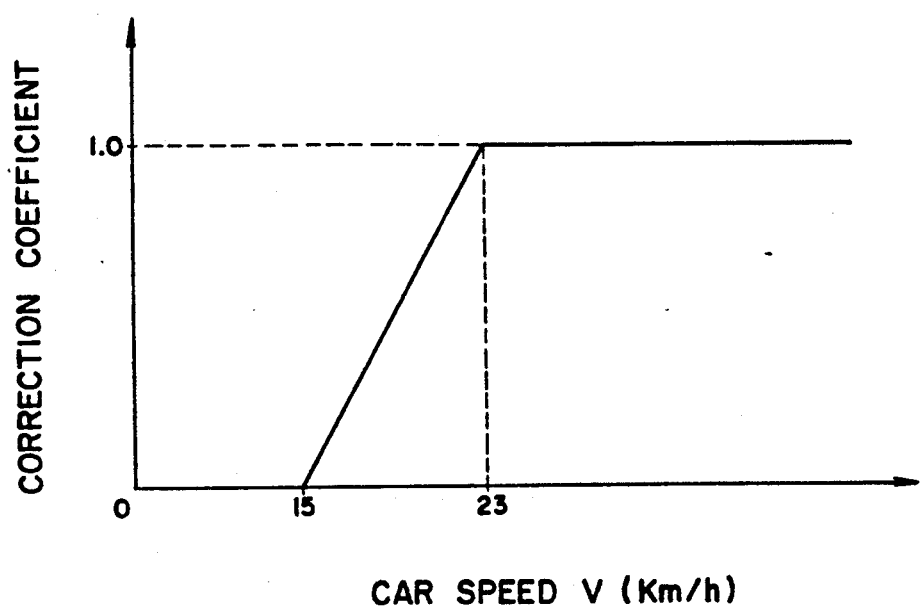
FIG. 40 is a map illustrating a relationship between a car speed and a correction coefficient.

It is to be noted that the slip correction amount $V_{KC}$ corresponding to an aimed lateral acceleration $G_{YO}$ is set to a somewhat smaller value than a slip correction amount $V_{KC}$ corresponding to a modified lateral acceleration $G_{YF}$ in a range in which the aimed lateral acceleration $G_{YO}$ is low because an additional steering operation of the steering handle 85 by a driver is forecast. Further, in a range in which the car speed V is low, it is preferable to assure the acceleration of the vehicle 82, but on the contrary when the car speed V is higher than a certain level, ease of turning must be taken into consideration. Thus, a slip correction amount $V_{KC}$ read out from the map of FIG. 37 is multiplied by a correction coefficient read out corresponding to the car speed V from a map shown in FIG. 40 to calculate a modified slip correction amount $V_{KF}$.

Consequently, the aimed front wheel speed $V_{FO}$ for correction torque calculation is decreased, and the slip ratio S upon turning becomes lower than an aimed slip ratio $S_O$ upon straightforward driving. Accordingly, while the acceleration performance of the vehicle 82 is decreased a little, a good turning performance is assured.

Figure 41:
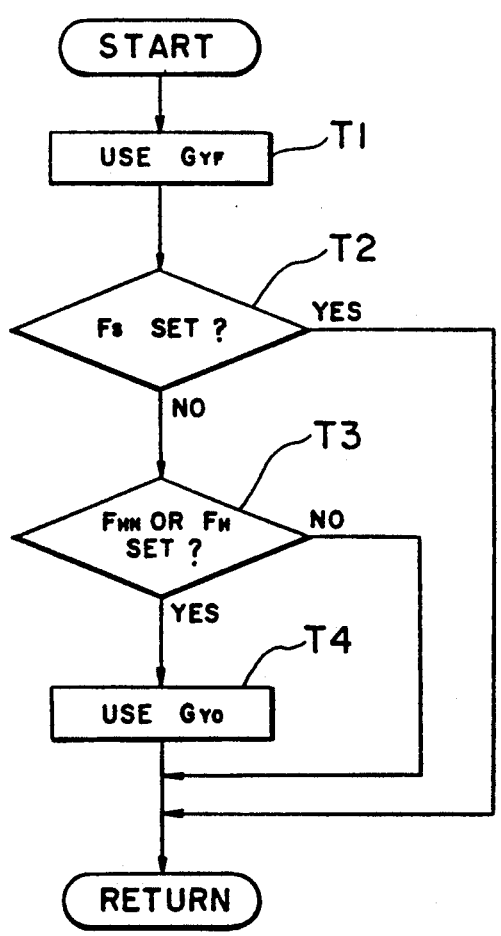
FIG. 41 is a flow chart illustrating a selecting procedure of a lateral acceleration.

A procedure of such selection of an aimed lateral acceleration $G_{YO}$ and an actual lateral acceleration $G_Y$ is illustrated in FIG. 41. Referring to FIG. 41, the TCL 76 first adopts, at step T1, a modified lateral acceleration $G_{YF}$ from the filter section 223 as a lateral acceleration from which a slip correction amount $V_{KC}$ is to be calculated, and then judges at step T2 whether or not the slip control flag $F_S$ is in a set state.

In case it is judged at step T2 that the slip control flag $F_S$ is in a set state, then the modified lateral acceleration $G_{YF}$ is adopted as it is. This is because, if the lateral acceleration from which a slip correction amount $V_{KC}$ is to be determined is changed over from a modified lateral acceleration $G_{YF}$ to an aimed lateral acceleration $G_{YO}$ during slip control, then the slip correction amount $V_{KC}$ may vary so much as to disorder the behavior of the vehicle 82.

If it is judged at step T2 that the slip control flag $F_S$ is not in a set state, then it is judged at step T3 whether or not either one of the two steering angle neutral position learning completion flags $F_{HN}$ and $F_H$ is in a set state. Here, if it is judged that neither of the two steering angle neutral position learning completion flags $F_{HN}$ and $F_H$ is in a set state, then the modified lateral acceleration $G_{YF}$ is adopted as it is. On the other hand, in case it is judged at step T3 that either one of the two steering angle neutral position learning completion flags $F_{HN}$ and $F_H$ is in a set state, the aimed lateral acceleration $G_{YO}$ is adopted at step T4 as a lateral acceleration from which a slip correction amount $V_{KC}$ is to be calculated.

As a result, an aimed front wheel speed $V_{FS}$ for correction torque calculation is given by the following expression:

$$V_{FS} = V_{FO} + V_K - V_{KF}$$

Referring back to FIG. 30, a slip amount s which is a deviation between the actual front wheel speed $V_F$ obtained by filter processing for the object of removal of noises from a detection signal of the front wheel rotation sensor 66 and the aimed front wheel speed $V_{FS}$ for correction torque calculation is calculated subsequently at a subtracting section 224. A slip amount detecting section of the slip detecting means 91 is thus constituted from those elements from the sensors for detecting wheel speeds $V_{RL}$, $V_{RR}$ and $V_F$ to the subtracting section 224. Then, if the slip amount s is smaller than a negative set value, for example, −2.5 km per hour, then the slip amount s is clipped to −2.5 km per hour at a clipping section 225. Then, proportional correction which will be hereinafter described is executed for the slip amount s after such clipping processing to prevent over-control in such proportional correction thereby to prevent possible occurrence of hunting of the output of the engine 11.

Meanwhile, integral correction using an integration constant $\Delta T_I$ which will be hereinafter described is executed for the slip amount s before such clipping processing, and differentiation is further executed for the slip amount s to calculate a final correction torque $T_{PID}$.

Figure 42:
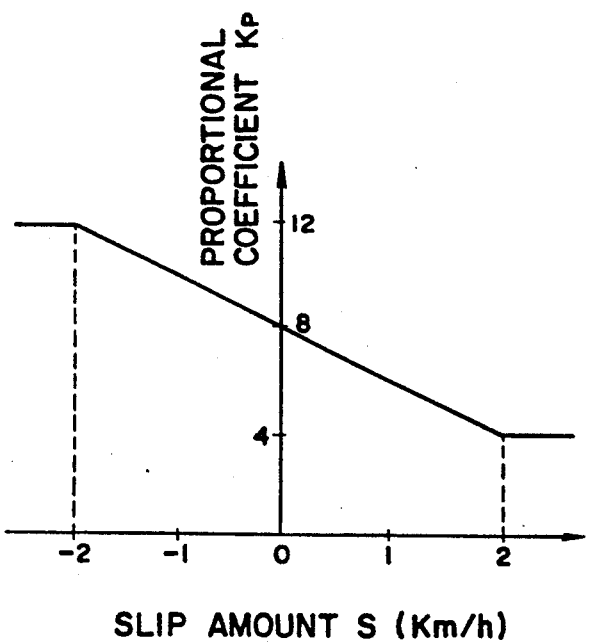
FIG. 42 is a map illustrating a relationship between a slip amount and a proportional coefficient.

The proportional correction mentioned above proceeds such that the slip amount s is multiplied by a proportional coefficient $K_P$ at a multiplying section 226 to calculate a fundamental correction amount, and then the fundamental correction amount is multiplied at a multiplying section 227 by a correction coefficient $\rho_{KP}$ set in advance in accordance with a transmission gear ratio $\rho_m$ of the hydraulic automatic transmission 13 to obtain a proportional correction torque $T_P$. It is to be noted that such proportional coefficient $K_P$ is read out from such a map as shown in FIG. 42 in accordance with the slip amount s after the clipping operation.

Further, in order to realize correction corresponding to a moderate change of the slip amount s as such integrating correction as mentioned hereinabove, a fundamental correction amount is calculated at an integrating section 228 and is then multiplied at a multiplying section 229 by a correction coefficient $\rho_{KI}$ set in advance in accordance with a transmission gear ratio $\rho_m$ of the hydraulic automatic transmission 13 to obtain an integration correction torque $T_I$. In this instance, in the present embodiment, a fixed minute integration correction torque $\Delta T_I$ is integrated, and when the slip amount s is in the positive for each sampling period of 15 milliseconds, such minute integration correction torque $\Delta T_I$ is added, but on the contrary when the slip amount s is in the negative, the minute integration correction torque $\Delta T_I$ is subtracted.

Figure 43:
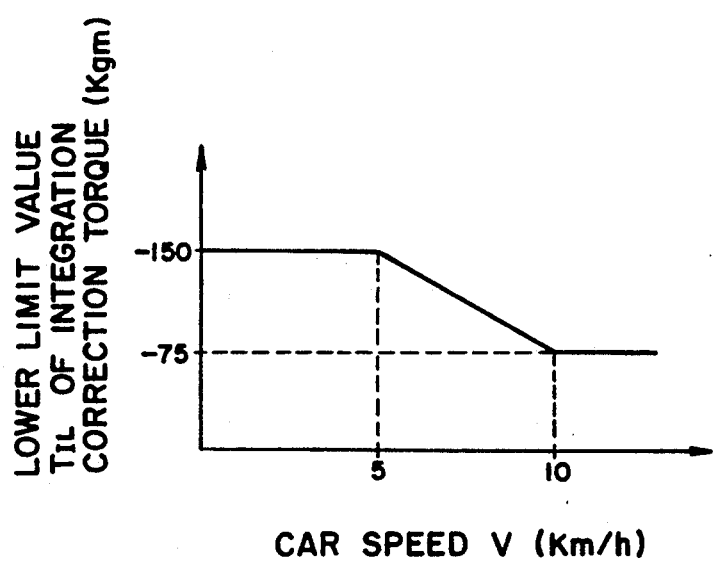
FIG. 43 is a map illustrating a relationship between a car speed and a lower limit value of an integration correction torque.

However, such a variable lower limit value $T_{IL}$ as shown in a map of FIG. 43 is set for the integration correction torque $T_I$ in accordance with the car speed V. Due to such clipping processing, when the vehicle 82 starts, particularly when the vehicle 82 starts on an uphill road, a high integration correction torque $T_I$ is produced to assure a sufficient driving torque of the engine 11, but after the car speed V rises sufficiently after starting of the vehicle 82, the integration correction torque $T_I$ is decreased because, if correction is performed by an excessively great amount, then the stability in control is deteriorated. Further, in order to improve the convergency of control, an upper limit value, for example, 0 kgm, is set for the integration correction torque $T_I$. By such clipping processing, the integration correction torque $T_I$ presents such a variation as shown in FIG. 44.

The proportional correction torque $T_P$ and the integration correction torque $T_I$ calculated in this manner are added to each other at an adding section 230 to calculate a proportional integration correction torque $T_{PI}$.

Figures 44, 45:
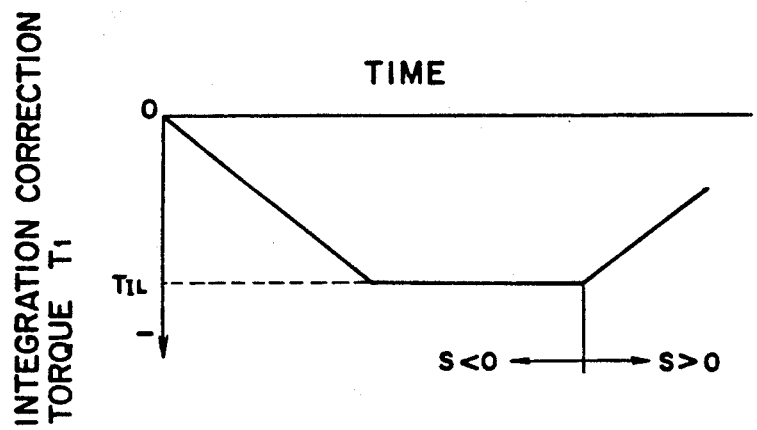
FIG. 44 is a graph illustrating increasing and decreasing regions of an integration correction torque.
FIG. 45 is a map illustrating a relationship between different gear shift positions of the hydraulic automatic transmission and correction coefficients corresponding to correction torques.

It is to be noted that the correction coefficients $\rho_{KP}$ and $\rho_{KI}$ are read out from such a map as shown in FIG. 45 which is set in advance in connection with a transmission gear ratio $\rho_m$ of the hydraulic automatic transmission 13.

Further, in the present embodiment, a changing rate (slip changing amount) $G_s$ of the slip amount s is calculated at a differentiating section 231 and is then multiplied by a differential coefficient $K_D$ at a multiplying section 232 to calculate a fundamental correction amount for a sudden variation of the slip amount s. It is to be noted that the slip detecting means 91 is constituted from the differentiating section 231 and the slip amount detecting section mentioned hereinabove. Then, an upper limit and a lower limit are set for a value of the fundamental correction amount and clipping processing is executed at a clipping section 233 so that the differentiation correction torque $T_D$ may not have an extremely high value, thereby to obtain an appropriate differentiation correction torque $T_D$. During driving of the vehicle 82, the wheel speeds $V_F$, $V_{RL}$ and $V_{RR}$ sometimes present a spontaneously idling or locked condition depending upon a condition of a road or a driving condition of the vehicle 82 or the like, and in such an instance, there is the possibility that the changing rate $G_s$ of the slip amount s may be increased to an extremely great positive or negative value until the control diverges and the responsibility is deteriorated. Thus, the clipping section 233 is provided to clip, for example, the lower limit value of the slip amount s to $-55$ kgm and the upper limit value to 55 kgm to prevent the differentiation correction torque $T_D$ from having an extremely great value.

After then, the proportional integration correction torque $T_{PI}$ and the differentiation correction torque $T_D$ are added to each other at an adding section 234, and a final aimed correction torque $T_{PID}$ obtained by such addition is subtracted from the aforementioned reference driving torque $T_B$ at the subtracting section 216. Then, a value obtained by such addition is multiplied at a multiplying section 235 by an inverse number to a total reduction gear ratio between the engine 11 and the axles 89 and 90 of the front wheels 64 and 65 to calculate an aimed driving torque $T_{OS}$ for slip control as given by the following expression (11):

$$T_{OS} = \frac{T_B - T_{PID}}{\rho_m \cdot \rho_d \cdot \rho_T} \quad (11)$$

where $\rho_d$ is a differential gear reduction ratio, and $\rho_T$ is a torque converter ratio, and in case the hydraulic automatic transmission 13 is proceeding an up shifting operation, a gear ratio $\rho_m$ on the higher gear position side is outputted after completion of such gear shifting operation. In short, in the case of an up shifting operation of the hydraulic automatic transmission 13, if a gear ratio $\rho_m$ on the higher gear position side is employed at a point of time when a gear shifting signal is outputted, then the aimed driving torque $T_{OS}$ is increased during the gear shifting operation so that an upwash of the engine 11 may be caused as apparent also from the expression (11) given above. Therefore, for example, for 1.5 seconds until a gear shifting operation is completed after a signal of starting of a gear shifting operation has been outputted, the gear ratio $\rho_m$ on the lower gear position side at which the aimed driving torque $T_{OS}$ can be made low is maintained, and then the gear ratio $\rho_m$ on the higher gear position side is adopted after 1.5 seconds after outputting of the signal of starting of a gear shifting operation. From a similar reason, in the case of a down shifting operation of the hydraulic automatic transmission 13, the gear ratio $\rho_m$ on the lower gear position side is adopted immediately at a point of time when a gear shifting signal is outputted.

Since the aimed driving torque $T_{OS}$ calculated in accordance with the expression (11) given hereinabove naturally has a positive value, the aimed driving torque $T_{OS}$ is clipped to a value greater than 0 at a clipping section 236 in order to prevent a possible error in calculation. Then, information regarding the aimed driving torque $T_{OS}$ is outputted to the ECU 15 in accordance with judging processing at a starting/ending judging section 237 for judging starting or ending of slip control.

The starting/ending judging section 237 judges starting of slip control when all of requirements (a) to (e) given hereinbelow are satisfied. Then, the starting/ending judging section 237 first sets the slip control flag $F_S$ and then renders the change-over switch 203 operative so as to select an output of the low speed setting section 201 as a car speed $V_S$ for slip control and then outputs information regarding the aimed driving torque $T_{OS}$ to the ECU 15. Then, such processing is repeated until ending of slip control is judged and the slip control flag $F_S$ is put into a reset state.

(a) The driver operates a manually operable switch not shown intending slip control.

(b) A driving torque $T_d$ requested by the driver is higher than a minimum driving torque, for example, 4 kgm, which is necessary to cause the vehicle 82 to drive.

Figure 46:
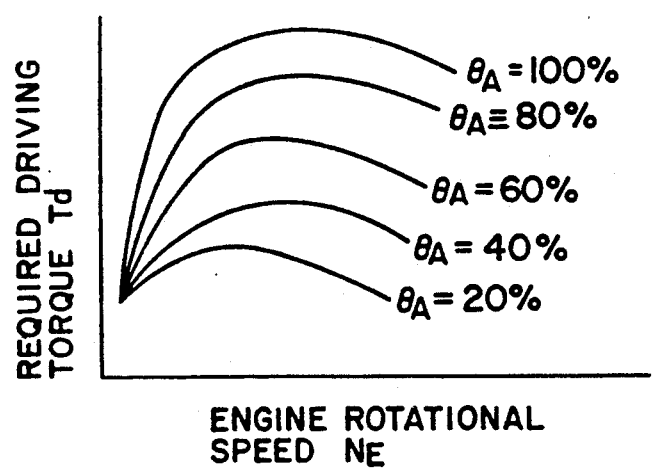
FIG. 46 is a map illustrating a relationship between an engine rotational speed and a requested driving torque with respect to different accelerator valve openings.

It is to be noted that, in the present embodiment, such requested driving torque $T_d$ is read out from such a map as shown in FIG. 46 which is set in advance in accordance with an engine rotational speed $N_E$ calculated from a detection signal from the crank angle sensor 62 and an accelerator opening $\theta_A$ calculated from a detection signal from the accelerator opening sensor 76.

(c) The slip amount s is greater than 2 km per hour.

(d) The changing rate $G_s$ of the slip amount s is higher than 0.2 g.

(e) The actual front wheel acceleration $G_F$ obtained by time differentiation of an actual front wheel speed $V_F$ at the differentiating section 238 is higher than 0.2 g.

In case either one of requirements (f) and (g) given below is satisfied after the starting/ending judging section 237 judges starting of slip control, ending of the slip control is judged and the slip control flag $F_S$ is reset. Further, the starting/ending judging section 137 stops transmission of the aimed driving torque $T_{OS}$ to the ECU 15 and causes the change-over switch 203 to operate so as to select an output of the high speed selecting section 202 as a car speed $V_S$ for slip control.

(f) The aimed driving torque $T_{OS}$ is higher than the requested driving torque $T_d$ and the condition wherein the slip amount s is lower than a fixed value, for example, $-2$ km per hour, continues for a period of time longer than a fixed period of time, for example, 0.5 seconds.

(g) The condition wherein the idling switch 68 is in an on-state after it has been changed over from an off-state, that is, the condition wherein the accelerator pedal 31 is released from the driver, continues for a period of time longer than a fixed period of time, for example, 0.5 seconds.

The vehicle 82 includes a manually operable switch not shown for permitting a driver to select slip control, and when a driver operates the manually operable switch to select slip control, operation of slip control described below will be executed.

Figure 47:
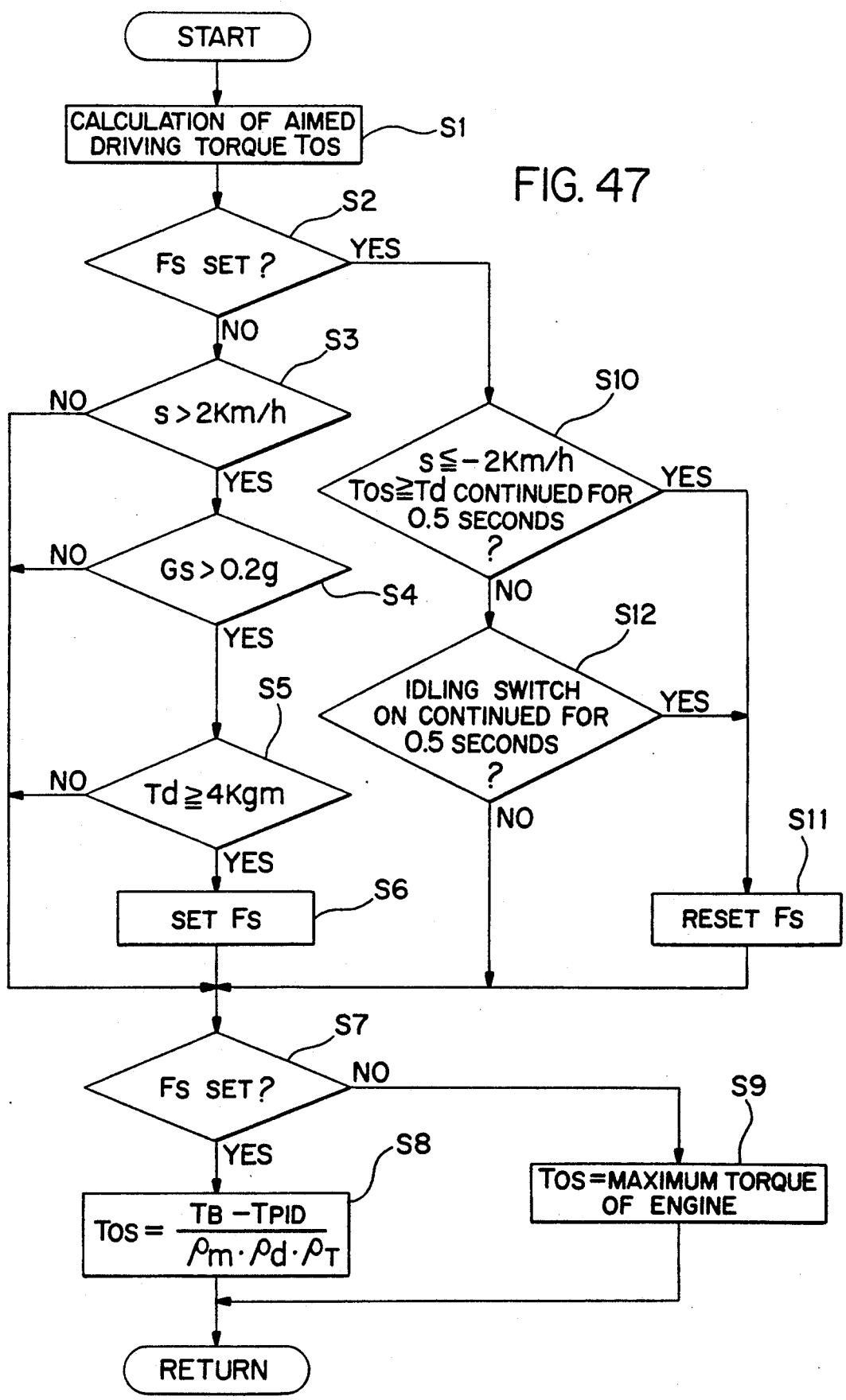
FIG. 47 is a flow chart illustrating a flow of operations of slip control.

Referring to FIG. 47 which shows a flow of processing of such slip control, the TCL 76 calculates, first at step S1, an aimed driving torque $T_{OS}$ by such detection of various data and calculating processing as described hereinabove. Such calculating processing, however, is executed independently of operation of the manually operable switch.

Subsequently at step S2, it is judged whether or not the slip control flag $F_S$ is in a set state. Since the slip control flag $F_S$ is not in a set state at the first stage, the TCL 76 judges subsequently at step S3 whether or not the slip amount s of the front wheels 64 and 65 is greater than a preset threshold value, for example, 2 km per hour.

If it is judged at step S3 that the slip amount s is greater than 2 km per hour, then the TCL 76 judges at step S4 whether or not the changing rate $G_s$ of the slip amount s is higher than 0.2 g.

If it is judged at step S4 that the slip amount changing rate $G_s$ is higher than 0.2 g, then the TCL 76 judges at step S5 whether or not a requested driving torque $T_d$ by the driver is equal to or higher than a minimum driving torque necessary to cause the vehicle 82 to drive, for example, 4 kgm, that is, whether or not the driver wishes to drive the vehicle 82.

If it is judged at step S5 that the requested driving torque $T_d$ is equal to or higher than 4 kgm, that is, the driver wishes to drive the vehicle 82, the slip control flag $F_S$ is set at step S6, and then at step S7, it is judged again whether or not the slip control flag $F_S$ is in a set state.

In case it is judged at step S7 that the slip control flag $F_S$ is in a set state, the aimed driving torque $T_{OS}$ for slip control calculated in advance in accordance with the expression (11) given hereinabove is adopted as an aimed driving torque $T_{OS}$ of the engine 11 at step S8.

On the contrary, in case it is judged at step S7 that the slip control flag $F_S$ is in a reset state, the TCL 76 outputs, at step S9, the maximum torque of the engine 11 as an aimed driving torque $T_{OS}$. Consequently, the ECU 15 causes the duty ratio of the torque controlling solenoid valves 51 and 56 to drop to the 0% side, and as a result, the engine 11 generates a driving torque corresponding to an amount of operation of the accelerator pedal 31 by the driver.

It is to be noted that, in case it is judged at step S3 that the slip amount s of the front wheels 60 and 61 is equal to or smaller than 2 km per hour, or in case it is judged at step S4 that the slip amount changing rate GS is equal to or lower than 0.2 g, or else in case it is judged at step S5 that the requested driving torque $T_d$ is lower than 4 kgm, the control sequence advances directly to step S7. Consequently, the TCL 76 outputs, subsequently at step S9, the maximum torque of the engine 11 as an aimed driving torque $T_{OS}$, and as a result, the ECU 15 causes the duty ratio of the torque controlling solenoid valves 51 and 56 to drop to the 0% side. Consequently, the engine 11 generates a driving torque corresponding to an amount of operation of the accelerator pedal 31 by the driver.

On the other hand, in case it is judged at step S2 that the slip control flag $F_S$ is in a set state, it is subsequently judged at step S10 whether or not the condition wherein the slip amount s of the front wheels 64 and 65 is equal to or lower than $-2$ km per hour as a threshold value described hereinabove and the requested driving torque $T_d$ is equal to or lower than the aimed driving torque $T_{OS}$ calculated at step S1 has continued for a period of time longer than 0.5 seconds.

If it is judged at step S10 that the condition wherein the slip amount s is equal to or lower than $-2$ km per hour and the requested driving torque $T_d$ is equal to or lower than the aimed driving torque $T_{OS}$ has continued for a period of time longer than 0.5 seconds, that is, the driver does not wish acceleration of the vehicle 82 any more, then the slip control flag $F_S$ is reset at step S11, whereafter the control sequence advances to step S7.

In case it is judged at step S10 that the condition wherein the slip amount s is greater than $-2$ km per hour or the required driving torque $T_d$ is equal to or lower than the aimed driving torque $T_{OS}$ has not continued for a period of time longer than 0.5 seconds, that is, the driver still wishes acceleration of the vehicle 82, the TCL 76 judges at step S12 whether or not the condition wherein the idling switch 68 is in an on state, that is, the throttle valve 20 is in a fully closed condition, has continued for a period of time longer than 0.5 seconds.

In case it is judged at step S12 that the idling switch 68 is still on, since this means that the driver does not operate the accelerator pedal 31, the control sequence advances to step S11 at which the slip control flag $F_S$ is reset. On the contrary, in case it is judged at step S12 that the idling switch 68 is off, since this means that the accelerator pedal 31 is in an operated condition by the driver, the control sequence advances to step S7.

It is to be noted that, where the vehicle 82 does not include such manually operable switch for permitting a driver to select slip control, the TCL 76 may calculate, after calculation of an aimed driving torque $T_{OS}$ for slip control in such a manner as described above, an aimed driving torque of the engine 11 which is to be used during turning control.

By the way, while a lateral acceleration $G_Y$ of the vehicle 82 can be calculated actually in accordance with the expression (10) given hereinabove making use of a rear wheel speed difference $|V_{RL}-V_{RR}|$, since it is possible to forecast the value of the lateral acceleration $G_Y$ acting on the vehicle 82 making use of the steering shaft turning angle $\delta_H$, there is an advantage that rapid control can be executed.

Thus, upon turning control of the vehicle 82, the TCL 76 calculates an aimed lateral acceleration $G_{YO}$ of the vehicle 82 in accordance with the expression (3) given hereinabove from the steering shaft turning angle $\delta_H$ and the car speed V and then sets, in accordance with the thus calculated aimed lateral acceleration $G_{YO}$, an acceleration in the advancing direction of the vehicle 82 at which the vehicle 82 may not be put into an extreme under-steering condition, that is, an aimed advancing direction acceleration $G_{XO}$. Then, an aimed driving torque $T_{OC}$ of the engine 11 corresponding to the aimed advancing direction acceleration $G_{XO}$ is calculated.

Figure 48:
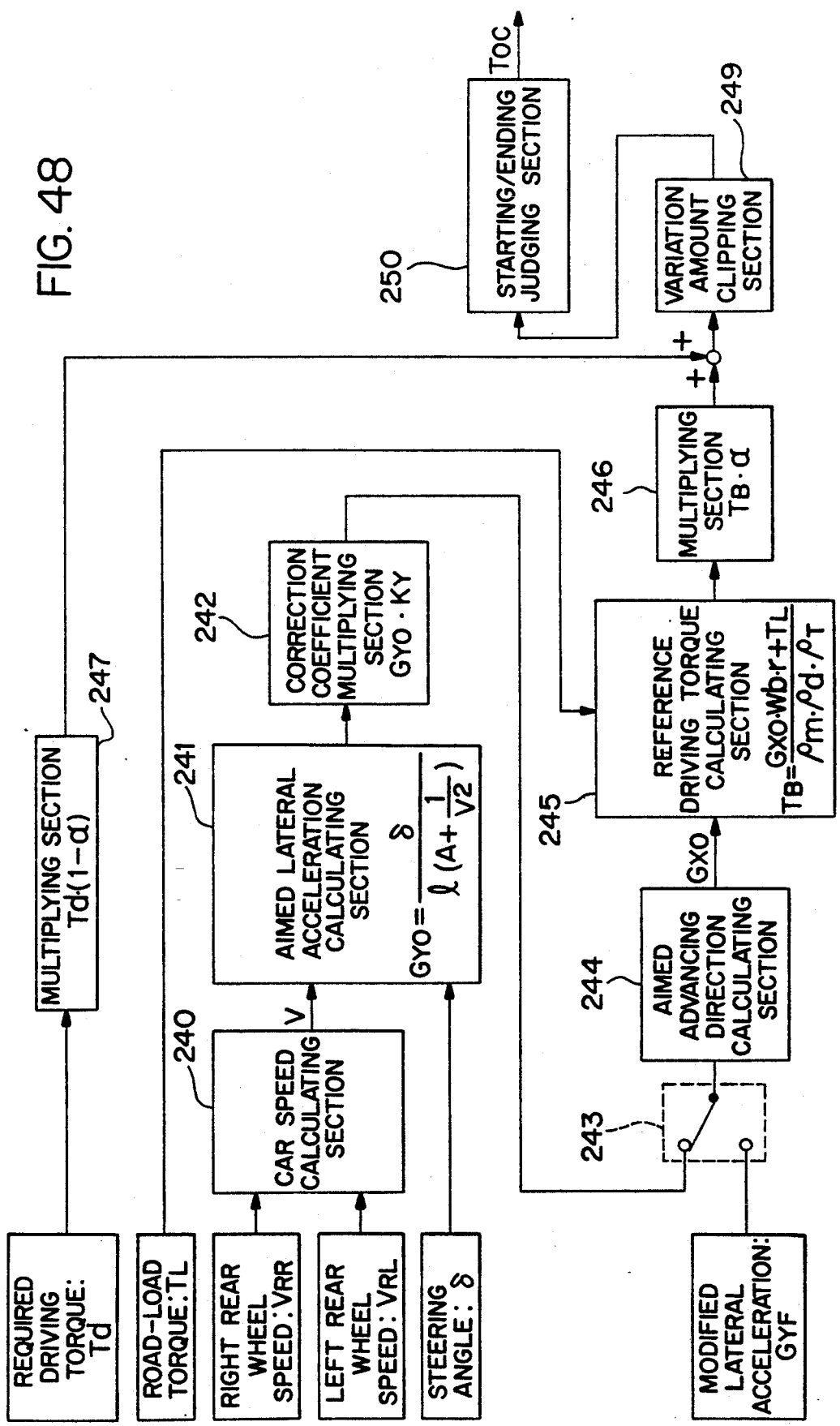
FIG. 48 is a block diagram illustrating a procedure of calculating an aimed driving torque for turning control.
Figure 49:
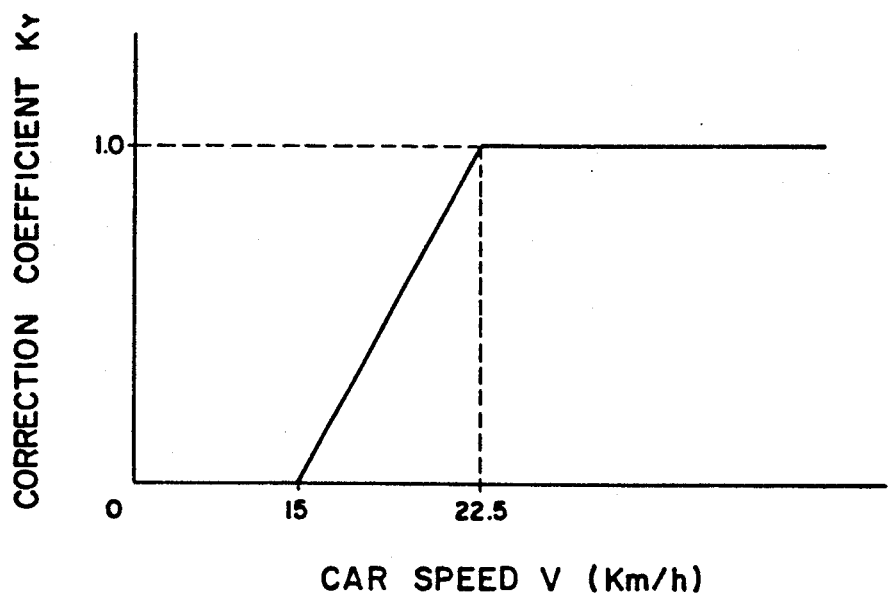
FIG. 49 is a map illustrating a relationship between a car speed and a correction coefficient.

Such turning control is illustrated in a calculation block diagram shown in FIG. 48. Referring to FIG. 48, the TCL 76 first calculates, at a car speed calculating section 240, a car speed V in accordance with the expression (1) given hereinabove from outputs of the pair of rear wheel rotation sensors 80 and 81 and also calculates a steering angle δ of the front wheels 64 and 65 in accordance with the expression (2) given hereinabove from a detection signal from the steering angle sensor 84. Then, an aimed lateral acceleration $G_{YO}$ of the vehicle 82 then is calculated in accordance with the expression (3) given hereinabove at an aimed lateral acceleration calculating section 241. In this instance, when the car speed V is low, for example, in a range lower than 23 km per hour, if turning control is inhibited rather than executed, a sufficient acceleration is obtained, for example, upon turning to the left or right at a crossing point at which the amount of traffic is great. Accordingly, in the present embodiment, the aimed lateral acceleration $G_{YO}$ is multiplied at a correction coefficient multiplying section 242 by such a correction coefficient $K_Y$ as seen from FIG. 49 in accordance with the car speed V.

By the way, since it is a question on reliability that an aimed acceleration $G_{YO}$ is calculated in accordance with the expression (3) given hereinabove from a steering angle δ before learning of the steering shaft neutral position $δ_M$ is completed, it is preferable not to start turning control until after learning of the steering shaft neutral position $δ_M$ is executed. However, in such a case that the vehicle 82 drives along a curved road from a point of time immediately after starting of driving thereof, the vehicle 82 just enters a condition wherein it requires turning control. However, since the requirements for starting of learning of the steering shaft neutral position $δ_M$ are not satisfied soon, there is the possibility that such a trouble may take place that turning control is not started. Thus, according to the present embodiment, until after learning of the steering shaft neutral position $δ_M$ is executed, turning control can be executed using a modified lateral acceleration $G_{YF}$ from the filter section 223 which has been calculated in accordance with the expression (10) given hereinabove and is selected by means of a change-over switch 243. In short, in a condition wherein both of the two steering angle neutral position learning completion flags $F_{HN}$ and $F_H$ are in a reset state, the modified lateral acceleration $G_{YF}$ is adopted by way of the change-over switch 243, but if at least one of the two steering angle neutral position learning completion flags $F_{HN}$ and $F_H$ is in a set state, then the aimed lateral acceleration $G_{YO}$ from the correction coefficient multiplying section 242 is selected by the change-over switch 243.

Meanwhile, the stability factor A mentioned hereinabove is a value which depends upon construction of a suspension system of the vehicle, characteristics of the tires, a condition of a road and so forth as well known in the art. More particularly, the stability factor A is represented as an inclination of a tangential line to such a curve as shown, for example, in FIG. 50 which indicates a relationship between an actual lateral acceleration $G_Y$ which is produced with the vehicle 82 upon normal turning on a circular road and a steering angle ratio $δ_H/δ_{HO}$ of the steering shaft 83 then which is a ratio of a steering angle $δ_H$ of the steering shaft 83 upon acceleration to a turning angle $δ_{HO}$ of the steering shaft 83 in a very low speed driving condition in which the lateral acceleration $G_Y$ presents a value around zero with reference to the neutral position $δ_M$ of the steering shaft 83. In short, in a region wherein the lateral acceleration $G_Y$ is low and the car speed V is not very high, the stability factor A presents a substantially constant value (A=0.002), but where the lateral acceleration $G_Y$ exceeds 0.6 g, the stability factor A increases suddenly, and consequently, the vehicle 82 exhibits a very strong under-steering tendency.

Figure 50:
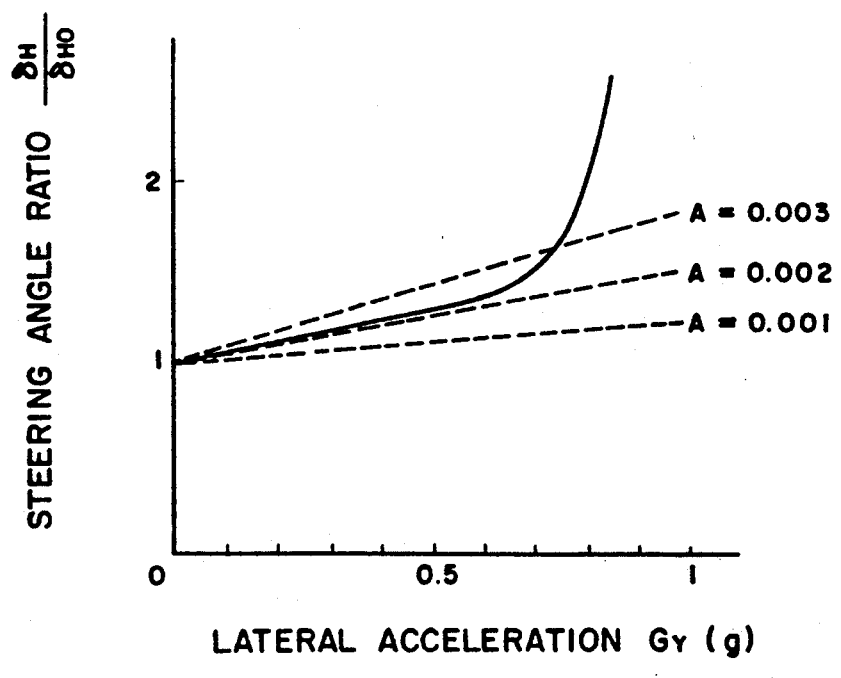
FIG. 50 is a graph showing a relationship between a lateral acceleration and a steering angle ratio and illustrating a stability factor.

From those facts, where the graph of FIG. 50 is involved which corresponds to a pavement in a dry condition (hereinafter referred to as high μ road), the stability factor A should be set to 0.002 and the driving torque of the engine 11 should be controlled so that the aimed lateral acceleration $G_{YO}$ of the vehicle 82 to be calculated in accordance with the expression (3) given hereinabove may be lower than 0.6 g.

It is to be noted that, for such a slippery road as a frozen road (which will be hereinafter referred to as low μ road), the stability factor A should be set, for example, to 0.005 or so. In this instance, since the aimed lateral acceleration $G_{YO}$ presents a higher value than the actual lateral acceleration $G_Y$ on a low μ road, it should be judged whether or not the aimed lateral acceleration $G_{YO}$ is higher than a preset threshold value, for example, $G_{YF}-2$, and in case the aimed lateral acceleration $G_{YO}$ is higher than such threshold value, it should be judged that the vehicle 82 is driving on a low μ road and turning control for a low μ road should be executed in accordance with the necessity. More particularly, it is judged whether or not the aimed lateral acceleration $G_{YO}$ is higher than a preset threshold value obtained by adding 0.05 g to a modified lateral acceleration $G_{YF}$ calculated in accordance with the expression (10) given hereinabove, that is, whether or not, because the aimed lateral acceleration $G_{YO}$ is higher than an actual lateral acceleration on a low μ load, the aimed lateral acceleration $G_{YO}$ is higher than the threshold value, and then in case the aimed lateral acceleration $G_{YO}$ is higher than the threshold value, it is judged that the vehicle 82 is driving on a low μ road.

Figure 51:
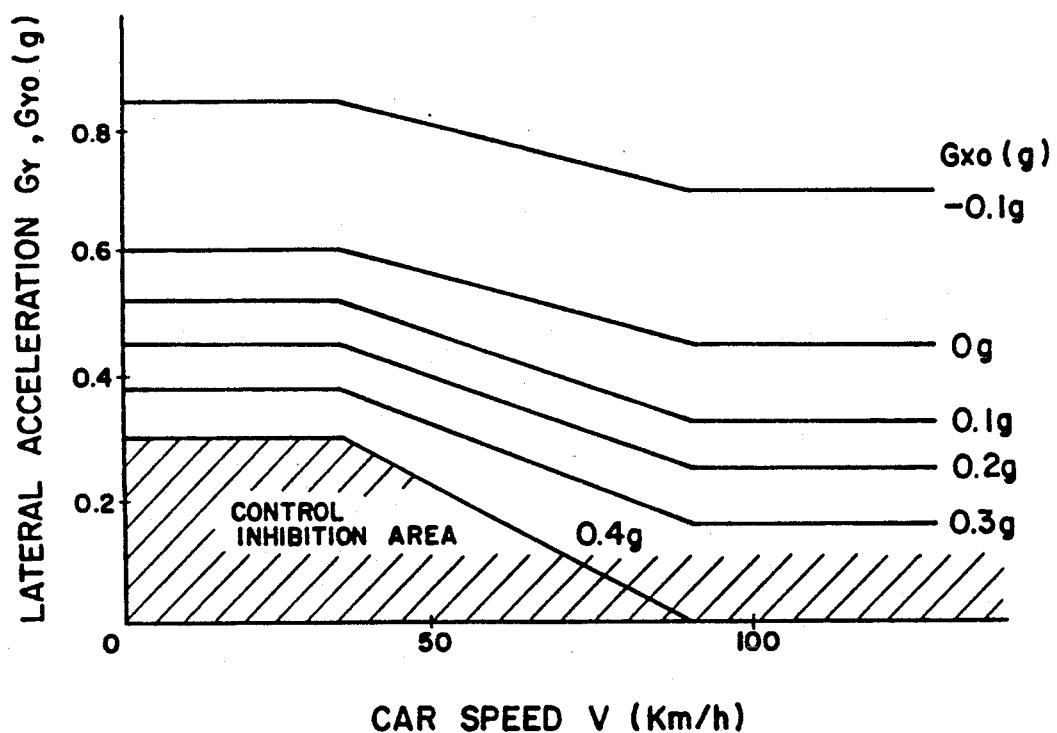
FIG. 51 is a map illustrating a relationship between a car speed and a lateral acceleration with respect to different aimed advancing direction accelerations.
Figure 52:
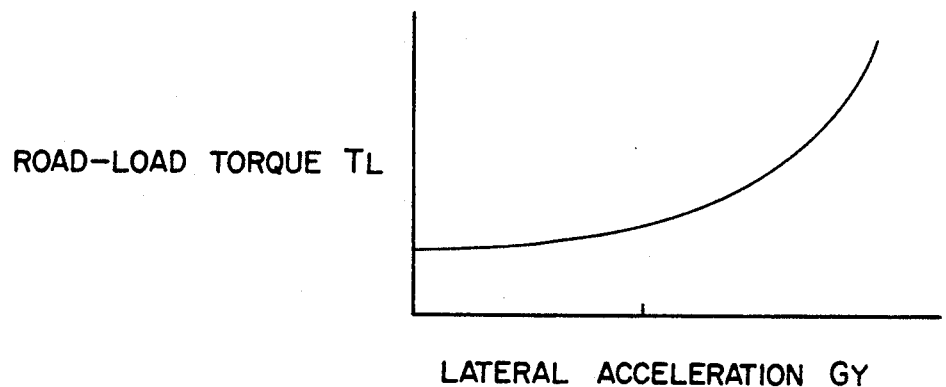
FIG. 52 is a map illustrating a relationship between a lateral acceleration and a road-load torque.

After an aimed lateral acceleration $G_{YO}$ is calculated in this manner, an aimed advancing direction acceleration $G_{XO}$ which is set in advance in accordance with the magnitude of the aimed lateral acceleration $G_{YO}$ and the car speed V is read out, at an aimed advancing direction acceleration calculating section 244, from such a map as shown in FIG. 51 which is stored in advance in the TCL 76. Then, a reference driving torque $T_B$ of the engine 11 corresponding to the aimed advancing direction acceleration $G_{XO}$ is calculated, at a reference driving torque calculating section 245, from the thus read out aimed advancing direction acceleration $G_{XO}$ in accordance with the following expression (12):

$$T_B = \frac{G_{XO} \cdot W_b \cdot r + T_L}{\rho_m \cdot \rho_d \cdot \rho_T} \qquad (12)$$

where TL is a road-load torque which is a resistance of a road which is obtained as a function of the lateral acceleration $G_Y$ of the vehicle 82. In the present embodiment, such road-load torque TL is determined from such a map as shown in FIG. 52.

Here, even if an aimed driving torque of the engine 11 is calculated from the steering shaft turning angle $δ_H$ and the car speed V, there is the possibility that a will of the driver may not reflect on driving and the driver may be dissatisfied with the drivability of the vehicle 82. Therefore, it is desirable to determine, from an amount of operation of the accelerator pedal 31, a requested driving torque $T_d$ of the engine 11 the driver wants and set an aimed driving torque of the engine 11 taking the thus determined requested driving torque $T_d$ into consideration.

Thus, according to the present embodiment, in order to determine an adoption rate of the reference driving torque $T_B$, the reference driving torque $T_B$ is multiplied at a multiplying section 246 by a weighting coefficient $\alpha$ to obtain a correction reference driving torque. While the weighting coefficient $\alpha$ is set experimentally by turning driving of the vehicle 82, a value around 0.6 or so is adopted for a high $\mu$ road.

On the other hand, a requested driving torque $T_d$ requested by the driver is determined from such a map as shown in FIG. 51 based on an engine rotational speed $N_E$ detected by the crank angle sensor 55 and an accelerator opening $\theta_A$ detected by the accelerator opening sensor 77. Then, a correction requested driving torque corresponding to the weighting coefficient $\alpha$ is calculated at a multiplying section 247 by multiplying the requested driving torque $T_d$ by $1-\alpha$. For example, in case the weighting coefficient $\alpha$ is set to $\alpha=0.6$, the adoption rate between the reference driving torque $T_B$ and the requested driving torque $T_D$ is 6:4.

Accordingly, an aimed driving torque $T_{OC}$ of the engine 11 is calculated at an adding section 248 in accordance with the following expression (13):

$$T_{OC} = \alpha \cdot T_B + (1-\alpha) \cdot T_d \qquad (13).$$

By the way, if the amount of variation of an aimed driving torque $T_{OC}$ of the engine 11 set for each 15 milliseconds is very great, then a shock will be produced in response to acceleration or deceleration of the vehicle 82, resulting in deterioration of the driving feeling. Accordingly, when the amount of increase or decrease of the aimed driving torque $T_{OC}$ of the engine 11 increases to such at degree that it deteriorates the driving comfort of the vehicle 82, it is desirable to restrict the amount of variation of the aimed driving torque $T_{OC}$.

Thus, in the present embodiment, when the absolute value $|\Delta T|$ of a difference between an aimed driving torque $T_{OC(n)}$ calculated in the present control cycle and another aimed driving torque $T_{OC(n-1)}$ calculated in a preceding control cycle is smaller than an allowable variation amount $T_K$ at a variation amount clipping section 249, the aimed driving torque $T_{OC(n)}$ calculated in the present control cycle is adopted as it is. However, in case the difference $\Delta T$ between the aimed driving torque calculated in the present control cycle and the aimed driving torque $T_{OC(n-1)}$ calculated in the preceding control cycle is not greater than the negative allowable variation amount $T_K$, the current aimed driving torque $T_{OC(n)}$ is set in accordance with the following expression:

$$T_{OC(n)} = T_{OC(n-1)} - T_K.$$

In short, the extent of decrease from the aimed driving torque $T_{OC(n-1)}$ calculated in the present control cycle is restricted with the allowable variation amount $T_K$ to reduce a speed reduction shock caused by reduction of the driving torque of the engine 11. On the other hand, in case the difference $\Delta T$ between the aimed driving torque $T_{OC(n)}$ calculated in the present control cycle and the aimed driving torque $T_{OC(n-1)}$ calculated in the preceding control cycle is greater than the allowable variation amount $T_K$, the current aimed driving torque $T_{OC(n)}$ is set in accordance with the following expression:

$$T_{OC(n)} = T_{OC(n-1)} + T_K.$$

In short, in case the difference $\Delta T$ between the aimed driving torque $T_{OC(n)}$ calculated in the present control cycle and the aimed driving torque $T_{OC(n-1)}$ calculated in the preceding control cycle exceeds the allowable variation amount $T_K$, the width of increase from the aimed driving torque $T_{OC(n-1)}$ calculated in the preceding control cycle is restricted with the allowable variation amount $T_K$ to reduce an acceleration shock caused by increase of the driving torque of the engine 11.

Then, when all of the requirements (a) to (d) given below are satisfied, the starting/ending judging section 250 judges starting of turning control and sets the turning control flag $F_C$. Then, the starting/ending judging section 250 outputs information regarding the aimed driving torque $T_{OC}$ to the ECU 15 and repeats such processing until ending of turning control is judged and the turning control flag $F_C$ is reset.

(a) The aimed driving torque $T_{OC}$ is lower than a value obtained by subtracting a threshold value, for example, 2 kgm, from the requested driving torque $T_d$.

(b) The driver operates a manually operable switch not shown intending turning control.

(c) The idling switch 68 remains in an off state.

(d) The controlling system for turning is normal.

On the other hand, in case either one of two requirements (e) and (f) given below is satisfied after the starting/ending judging section 250 judges starting of turning control, ending of turning control is judged and the turning control flag $F_C$ is reset, and then, transmission of the aimed driving torque $T_{OC}$ to the ECU is stopped.

(e) The aimed driving torque $T_{OS}$ is higher than the requested driving torque $T_d$.

(f) There is some failure, disconnection or the like in the controlling system for turning.

By the way, the output voltage of the accelerator opening sensor 77 and the accelerator opening $\theta_A$ naturally have a fixed proportional relationship, and the accelerator opening sensor 77 is assembled to the throttle body 21 such that, when the accelerator opening $\theta_A$ is in a fully closed position, the output voltage of the accelerator opening sensor 77 may be, for example, 0.6 volts. However, when the accelerator opening sensor 77 is removed from the throttle body 21 for the inspection, maintenance or the like of the vehicle and is then assembled again, it is substantially impossible to return the accelerator opening sensor 77 to its original assembled condition. Also, there is the possibility that the accelerator opening sensor 77 may be dislocated with respect to the throttle body 21 due to secular change or the like.

Thus, according to the present embodiment, the fully closed position of the accelerator opening sensor 77 is learned and corrected in order to assure the reliability of an accelerator opening $\theta_A$ calculated from a detection signal from the accelerator opening sensor 77.

Figure 53:
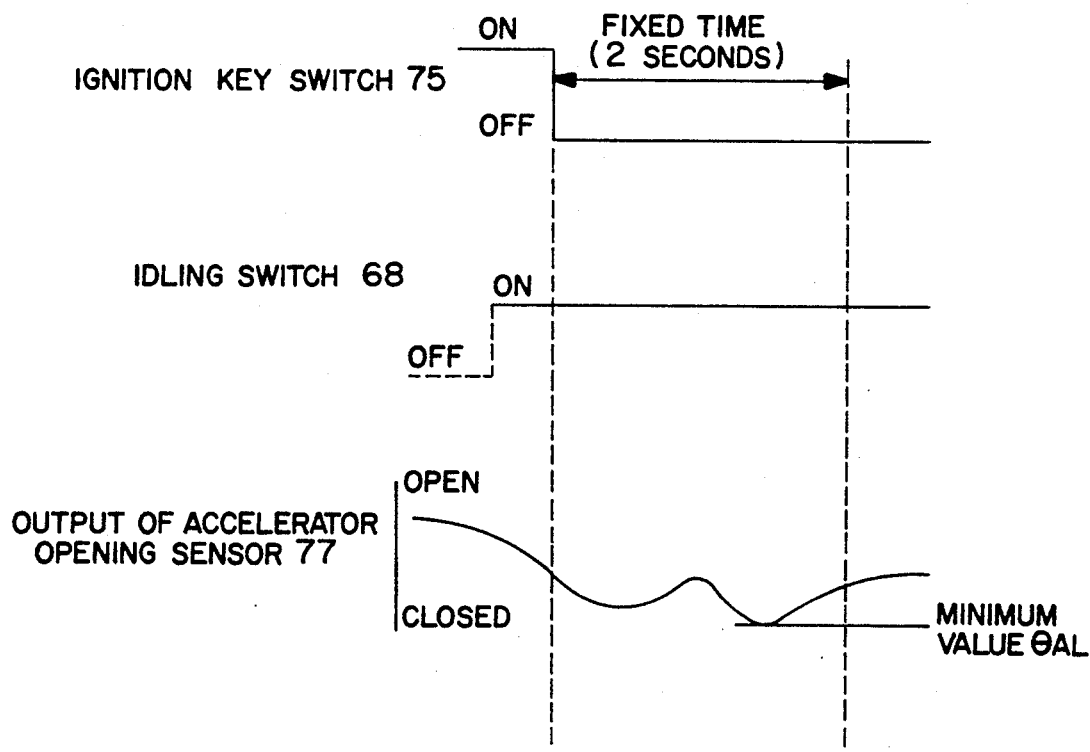
FIG. 53 is a graph showing an example of a procedure of a learning and correcting operation of a fully closed position of an accelerator opening sensor.

A procedure of learning of such fully closed position of the accelerator opening sensor 77 is illustrated in FIG. 53. Referring to FIG. 53, an output of the accelerator opening sensor 77 is monitored for a fixed period of time, for example, for 2 seconds after the ignition key switch 75 is changed over from an on state to an off state while the idling switch 68 remains in an on state, and a minimum value of the output of the accelerator opening sensor 77 during the period is taken in as a fully closed position of the accelerator opening $\theta_A$ and is stored into a backed up RAM (not shown) incorporated in the ECU 15. Then, the accelerator opening $\theta_A$ is corrected with reference to the minimum value of the output of the accelerator opening sensor 77 till next learning.

Figure 54:
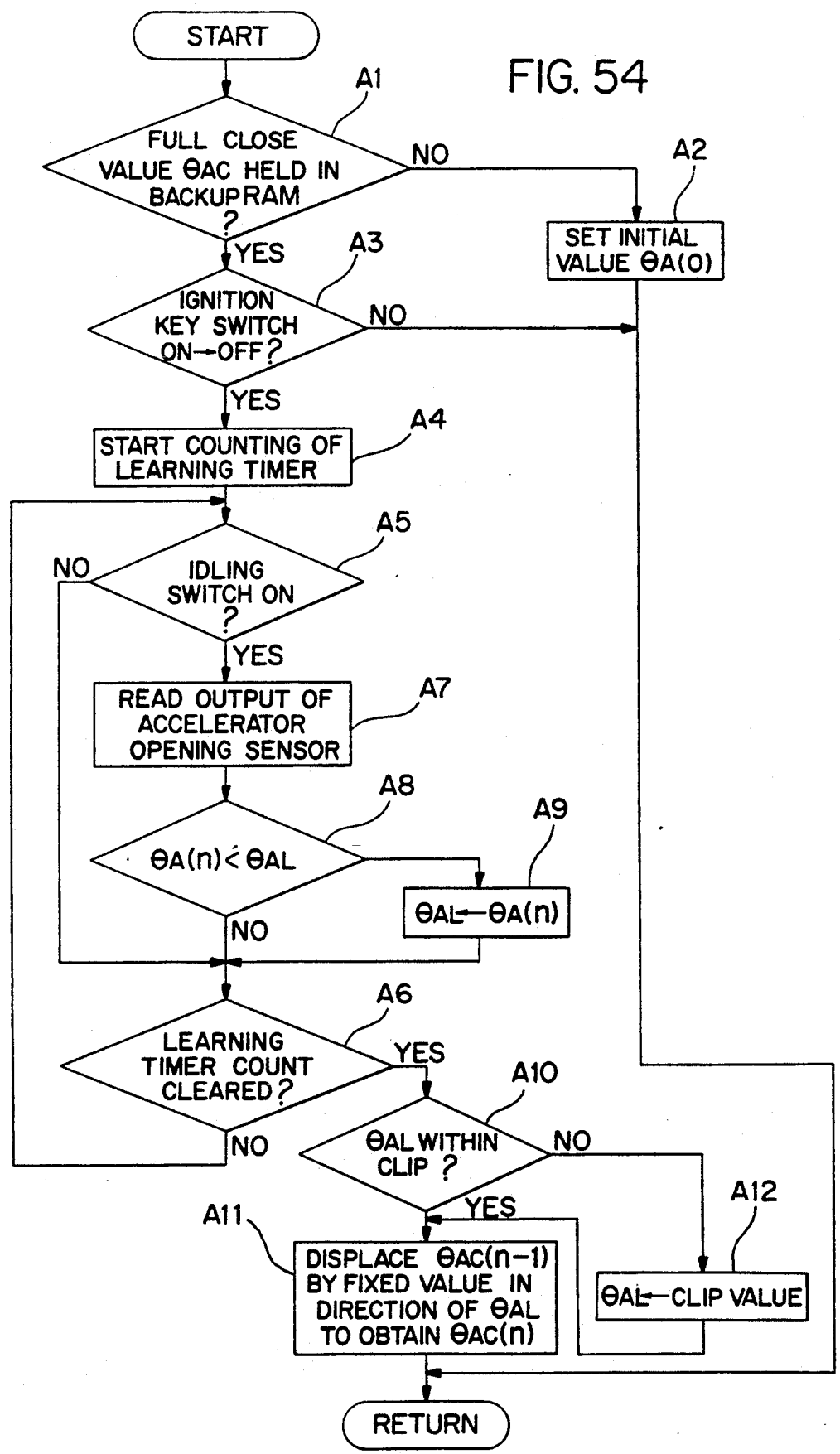
FIG. 54 is a flow chart illustrating another example of a flow of a learning and correcting operation of a fully closed position of the accelerator opening sensor.

However, if a battery (not shown) carried on the vehicle 82 is removed, then the stored contents of the RAM are lost, and accordingly, in such an instance, such a learning procedure as illustrated in FIG. 54 is adopted.

Referring to FIG. 54, the TCL 76 first judges at step A1 whether or not a full close value $\theta_{AC}$ of the accelerator opening $\theta_A$ is stored in the RAM, and in case it is judged at step A1 that no full close value $\theta_{AC}$ of the accelerator opening $\theta A$ is stored in the RAM, an initial value $\theta_{A(0)}$ is stored into the RAM at step A2.

On the other hand, in case it is judged at step A1 that a full close value $\theta_{AC}$ of the accelerator opening $\theta_A$ is stored in the RAM, it is judged at step A3 whether or not the ignition key switch 75 is in an on state. If it is judged at step A3 that the ignition key switch 75 has been changed over from an on state to an off state, counting of a learning timer not shown is started at step A4. Then, after starting of the learning timer, it is judged at step A5 whether or not the idling switch 68 is in an on state.

If it is judged at step A5 that the idling switch 68 is in an off state, then it is judged at step A6 whether or not the count value of the learning timer reaches a preset value, for example, 2 seconds, and then if it is judged at step A6 that the count value of the learning timer does not reach 2 seconds, then the control sequence returns to step A5. On the other hand, in case it is judged at step A5 that the idling switch 68 is in an on state, an output of the accelerator opening sensor 77 is read in for a predetermined period at step A7, and then it is judged at step A8 whether or not a current accelerator opening $\theta_{A(n)}$ is smaller than a minimum value $\theta_{AL}$ of the accelerator opening $\theta_A$ till then.

Here, in case it is judged that the current accelerator opening $\theta_{A(n)}$ is equal to or greater than the minimum value $\theta_{AL}$ of the accelerator opening $\theta_A$ till then, the minimum value $\theta_{AL}$ of the accelerator opening $\theta_A$ till then is maintained as it is. But on the contrary, if it is judged at step A8 that the current accelerator opening $\theta_{A(n)}$ is lower than the minimum value $\theta_{AL}$ of the accelerator opening $\theta_A$ till then, the current accelerator opening $\theta_{A(n)}$ is updated as a new minimum value $\theta_{AL}$ at step A9. Such operation is repeated until the count value of the learning timer reaches, at step A6, a preset value, for example, 2 seconds.

After the count value of the learning timer reaches the preset value, it is judged at step A10 whether or not the minimum value $\theta_{AL}$ of the accelerator opening $\theta_A$ remains between preset clip values, for example, between 0.3 volts and 0.9 volts. Then, if it is judged that the minimum value $\theta_{AL}$ of the accelerator opening $\theta_A$ remains in the range between the preset clip values, a value obtained by displacing the initial value $\theta_{A(0)}$ or the full close value $\theta_{AC}$ of the accelerator opening by a fixed value, for example, 0.1 volt toward the minimum value $\theta_{AL}$ is determined at step A11 as a full close value $\theta_{AC(n)}$ of the accelerator opening $\theta_A$ based on the current learning. In short, in case the initial value $\theta_{A(0)}$ or the full close position $\theta_{AC}$ of the accelerator opening $\theta_A$ is higher than the minimum value $\theta_{AL}$ of the accelerator opening $\theta_A$, the full close value $\theta_{AC(n)}$ of the accelerator opening $\theta_A$ is set either as:

$$\theta_{AC(n)} = \theta_{AC(0)} - 0.1$$

or as:

$$\theta_{AC(n)} = \theta_{AC(n-1)} - 0.1$$

but on the contrary, when the initial value $\theta_{A(0)}$ or the full close value $\theta_{AC}$ of the accelerator opening $\theta_A$ is higher than the minimum value $\theta_{AL}$ of the accelerator opening $\theta_A$, then the full close value $\theta_{AC(n)}$ of the accelerator opening $\theta_A$ is set either as:

$$\theta_{AC(n)} = \theta_{AC(0)} + 0.1$$

or as $$\theta_{AC(n)} = \theta_{AC(n-1)} + 0.1.$$

In case it is judged at step A10 that the minimum value $\theta_{AL}$ of the accelerator opening $\theta_A$ is outside the range between the preset clip values, that one of the clip values which is exceeded by the minimum value $\theta_{AL}$ of the accelerator opening $\theta_A$ is adopted in place as a minimum value $\theta_{AL}$ of the accelerator opening $\theta_A$ at step A12. After then, the control sequence advances to step A11 at which the full close value $\theta_{AC}$ of the accelerator opening $\theta_A$ is learned and corrected.

Where an upper limit value and a lower limit value are set for the minimum value $\theta_{AL}$ of the accelerator opening $\theta_A$ in this manner, even when the accelerator opening sensor 77 fails, there is no possibility that wrong learning is executed, and since a learning correction amount for one control cycle is set to a fixed value, wrong learning will not be executed even against a disturbance such as noises.

While, in the embodiment described above, a learning starting timing of the full close value $\theta_{AC}$ of the accelerator opening sensor 77 is determined with reference to a point of time at which the ignition key switch 75 is changed over from an on state to an off state, learning processing at the steps beginning with the step A4 may be started with reference to a point of time at which, using a seating sensor incorporated in a seat not shown, it is detected making use of a pressure variation, a positional displacement or the like of the seat by the seating sensor that a driver leaves the seat even while the ignition key switch 75 remains in an on state. Further, it is also possible to start learning of the full close value $\theta_{AC}$ of the accelerator opening sensor 77 at a point of time at which it is detected that a door locking apparatus not shown is operated from outside the vehicle 82 or it is detected by a key entry system that such door locking device is operated. Or otherwise, learning processing may be executed in case a shift lever (not shown) of the hydraulic automatic transmission 13 is at the neutral position or the parking position (the neutral position in the case of a vehicle on which a manual transmission is carried) and the manual brake is in an operated condition and besides an air conditioner is in an off state, that is, the vehicle is not in an idle up state.

The vehicle 82 includes such manually operable switch not shown for permitting a driver to select turning control as described hereinabove, and when a driver operates the manually operable switch to select turning control, operation of turning control described below will be executed.

Figure 55:
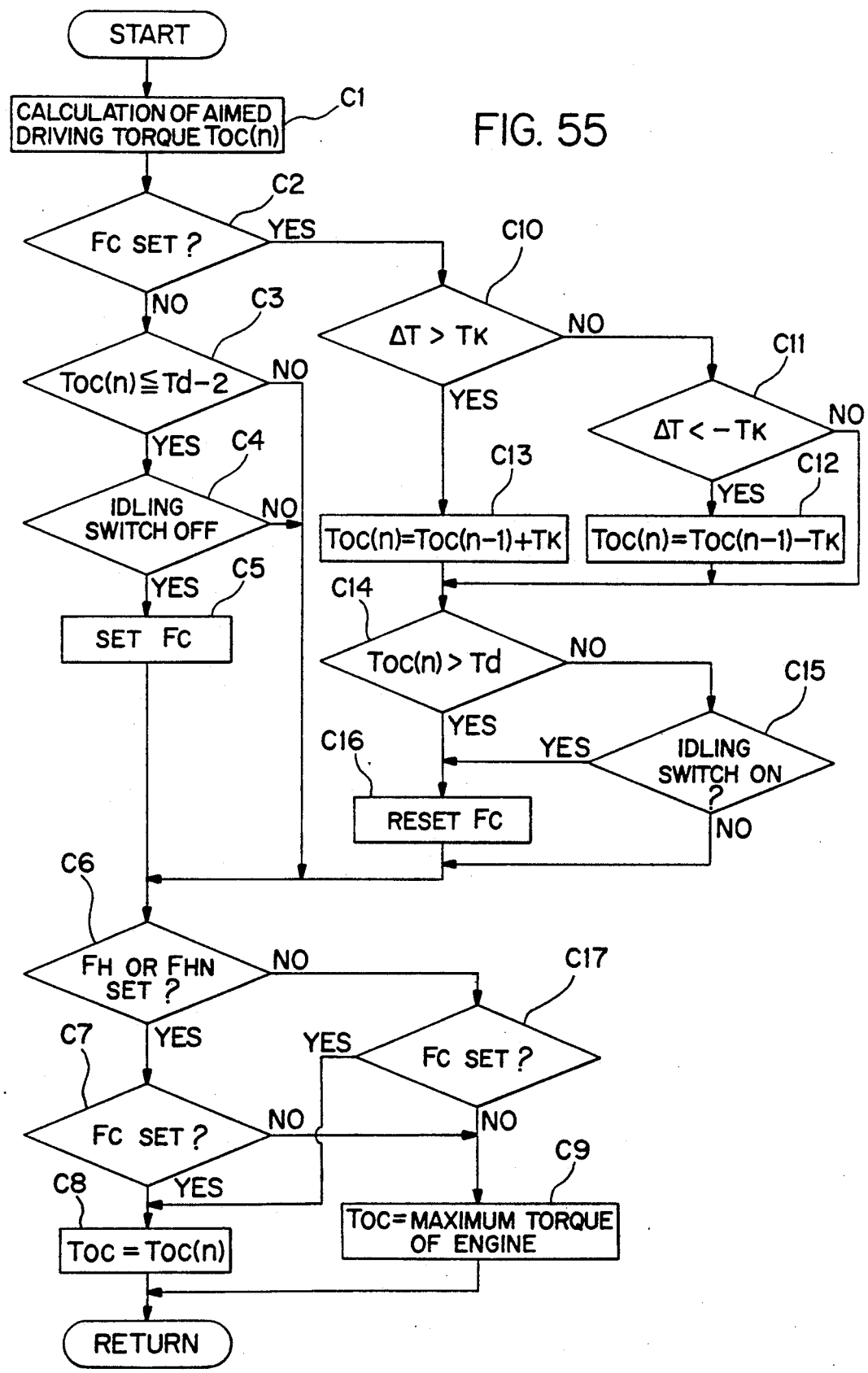
FIG. 55 is a flow chart illustrating a flow of operations of turning control.

A flow of control for determining an aimed driving torque $T_{OC}$ for turning control is shown in FIG. 55, and turning control is thus executed in a similar manner as in the first embodiment described hereinabove (refer to FIG. 22). Referring to FIG. 55, first at step C1, an aimed driving torque $T_{OC(n)}$ is calculated by such detection of various data and calculating processing as described hereinabove. Such calculating processing at step C1 is executed independently of operation of the manually operable switch.

Then at step C2, it is judged whether or not the vehicle 82 is under turning control, that is, whether or not a turning control flag $F_C$ is in a set state. Since the vehicle 82 is not in turning control first, it is determined that the turning control flag $F_c$ is in a reset state, and it is subsequently judged at step C3 whether or not the aimed driving torque $T_{OC(n)}$ is equal to or lower than a preset threshold value, for example, $T_d-2$. In short, although such aimed driving torque $T_{OC(n)}$ can be calculated even when the vehicle 82 is in a straightforwardly driving condition, normally the value thereof is higher than a requested driving torque $T_d$ requested by a driver. However, since such requested driving torque $T_d$ generally presents a low value upon turning of the vehicle 82, a time when the aimed driving torque $T_{OC(n)}$ becomes equal to or smaller than the threshold value $T_d-2$ is determined as a starting requirement for turning control.

It is to be noted that the reason why the threshold value is set to $T_d-2$ here is that it is intended to provide the same as a hysteresis for preventing hunting in control.

In case it is judged at step C3 that the aimed driving torque $T_{OC(n)}$ is equal to or lower than the threshold value $T_d-2$, the TCL 76 then judges at step C4 whether of not the idling switch 68 is in an off state.

In case it is judged at step C4 that the idling switch 68 is in an off state, that is, the accelerator pedal 31 is in an operated condition by the driver, the turning control flag $F_c$ is set at step C5. Then at step C6, it is judged whether or not at least one of the steering angle neutral position learning completion flags $F_{HN}$ and $F_H$ is in a set state, that is, the reliability of the steering angle $\delta$ detected by the steering angle sensor 84 is judged.

In case it is judged at step C6 that at least one of the steering angle neutral position learning completion flags $F_{HN}$ and $F_H$ is in a set state, it is judged again at step C7 whether or not the turning control flag $F_C$ is in a set state.

Since the turning control flag $F_C$ has been set at step C5 in the procedure described so far, it is judged at step C7 that the turning control flag $F_C$ is in a set state, and then at step C8, the aimed driving torque $T_{OC(n)}$ calculated precedently in accordance with the expression (13) given hereinabove is adopted as an aimed driving torque $T_{OC}$ for turning control.

On the contrary, in case it is judged at step C6 that the steering angle neutral position learning completion flag $F_H$ is not in a set state, since this means that the reliability of the steering angle $\delta$ calculated in accordance with the expression (2) is low, the TCL 76 does not adopt the aimed driving torque $T_{OC(n)}$ calculated in accordance with the expression (13) but outputs, as an aimed driving torque $T_{OC}$, the maximum driving torque of the engine 11 at step C9. Consequently, the ECU 15 lowers the duty ratio of the torque controlling solenoid valves 51 and 56 to the zero percent side, and as a result, the engine 11 generates a driving torque corresponding to an amount of operation of the accelerator pedal 31 by the driver.

On the other hand, in case it is judged at step C3 that the aimed driving torque $T_{OC(n)}$ is not equal to nor lower than the threshold value $T_d-2$, the control sequence does not advance to the turning control but advances to step C9 by way of the step C6 or H7. At step C9, the TCL 76 outputs the maximum torque of the engine 11 as an aimed driving torque $T_{OC}$. Consequently, the ECU 15 lowers the duty ratio of the torque controlling solenoid valves 51 and 56 to the zero percent side, and as a result, the engine 11 generates a driving torque corresponding to an amount of operation of the accelerator pedal 31 by the driver.

Similarly, also in case it is judged at step C4 that the idling switch 68 is in an on state, that is, the accelerator pedal 31 is not in an operated condition by the driver, the TCL 76 outputs, at step C9, the maximum torque of the engine 11 as an aimed driving torque $T_{OC}$, and consequently, the ECU 15 lowers the duty ratio of the torque controlling solenoid valves 51 and 56 to the zero percent side. As a result, the engine 11 generates a driving torque corresponding to an amount of operation of the accelerator pedal 31 by the driver, and the control sequence does not advance to the turning control.

In case it is judged at step C2 that the turning control flag $F_C$ is in a set state, it is subsequently judged at step C10 whether or not the difference $\Delta T$ between the aimed driving torque $T_{OC(n)}$ calculated in the present control cycle and the aimed driving torque $T_{OC(n-1)}$ calculated in a preceding control cycle is greater than a preset allowable variation amount $T_K$. The allowable variation amount $T_K$ is a torque variation amount of such a degree at which a passenger of the vehicle 82 may not feel an acceleration or deceleration shock. When it is intended to restrict the aimed advancing direction acceleration $G_{XO}$ of the vehicle 82 to, for example, 0.1 g per second, the allowable variation amount $T_K$ is determined using the expression (12) given hereinabove as $$T_K = 0.1 \cdot \frac{W_b \cdot r}{\rho_m \cdot \rho_d \cdot \rho_T} \cdot \Delta t$$

If it is judged at step C10 that the difference $\Delta T$ between the aimed driving torque $T_{OC(n)}$ calculated in the present control cycle and the aimed driving torque $T_{OC(n-1)}$ calculated in the preceding control cycle is not higher than the preset allowable variation amount $T_K$, it is subsequently judged at step C11 whether or not the difference $\Delta T$ between the aimed driving torque $T_{OC(n)}$ of the resent control cycle and the aimed driving torque $T_{OC(n-1)}$ calculated in the preceding control cycle is smaller than the negative allowable variation amount $T_K$.

If it is judged at step C11 that the difference $\Delta T$ between the aimed driving torque $T_{OC(n)}$ calculated in the present control cycle and the aimed driving torque $T_{OC(n-1)}$ calculated in the preceding control cycle is equal to or greater than the negative allowable variation amount $T_K$, since this means that the absolute value $|\Delta T|$ of the difference between the aimed driving torque $T_{OC(n)}$ calculated in the present control cycle and the aimed driving torque $T_{OC(n-1)}$ calculated in the preceding control cycle is smaller than the allowable variation amount $T_K$, the current aimed driving torque $T_{OC(n)}$ is adopted as it is as an aimed driving torque $T_{OC}$.

On the contrary, in case it is judged at step C11 that the difference $\Delta T$ between the aimed driving torque $T_{OC(n)}$ calculated in the present control cycle and the aimed driving torque $T_{OC(n-1)}$ calculated in the preceding control cycle is not greater than the negative allowable variation amount $T_K$, the aimed driving torque $T_{OC(n)}$ for the present control cycle is set, at step C12, in accordance with the following expression:

$$T_{OC(n)} = T_{OC(n-1)} - T_K.$$

In short, the extent of decrease from the aimed driving torque $T_{OC(n-1)}$ calculated in the preceding control cycle is restricted with the allowable variation amount $T_K$ to reduce a deceleration shock caused by reduction of the driving torque of the engine 11.

On the other hand, in case it is judged at step C10 that the difference $\Delta T$ between the aimed driving torque $T_{OC(n)}$ calculated in the present control cycle and the aimed driving torque $T_{OC(n-1)}$ calculated in the preceding control cycle is greater than the allowable variation amount $T_K$, the aimed driving torque $T_{OC(n)}$ for the present control cycle is set, at step C13, in accordance with the following expression:

$$T_{OC(n)} = T_{OC(n-1)} + T_K$$

In short, also in the case of increase of the driving torque, similarly as in the case of decrease of the driving torque described hereinabove, if the difference $\Delta T$ between the aimed driving torque $T_{OC(n)}$ calculated in the present control cycle and the aimed driving torque $T_{OC(n-1)}$ calculated in the preceding control cycle exceeds the allowable variation amount $T_K$, the extent of increase from the aimed driving torque $T_{OC(n-1)}$ calculated in the preceding control cycle is restricted with the allowable variation amount $T_K$ to reduce an acceleration shock caused by increase of the driving torque of the engine 11.

After an aimed driving torque $T_{OC(n)}$ is set in this manner, the TCL 76 judges at step C14 whether or not the aimed driving torque $T_{OC(n)}$ is higher than the requested driving torque $T_d$ requested by the driver.

Here, in case the turning control flag $F_C$ is in a set state, the aimed driving torque $T_{OC(n)}$ is not higher than the requested driving torque $T_d$ by the driver, and accordingly, it is subsequently judged at step C15 whether or not the idling switch 68 is in an on state.

If it is judged at step C15 that the idling switch 68 is not in an on state, since this means that turning control is required, the control sequence advances to step C6 described hereinabove.

On the contrary, in case it is judged at step C14 that the aimed driving torque $T_{OC(n)}$ is higher than the requested driving torque $T_d$ by the driver, since this means that turning control of the vehicle 82 has completed, the TCL 76 subsequently resets the turning control flag $F_C$ at step C16. Similarly, in case it is judged at step C15 that the idling switch 68 is in an on state, since this means that the accelerator pedal 31 is not in an operated condition, the control sequence advances to step C16 at which the turning control flag $F_C$ is reset.

After the turning control flag $F_C$ is reset at step C16, the TCL 76 outputs the maximum torque of the engine 11 as an aimed driving torque $T_{OC}$ at step C9. Consequently, the ECU 15 lowers the duty ratio of the torque controlling solenoid valves 51 and 56 to the zero percent side, and as a result, the engine 11 generates a driving torque corresponding to an amount of operation of the accelerator pedal 31 by the driver.

It is to be noted that a requested driving torque $T_d$ requested by a driver can naturally be ignored in order to simplify the procedure of turning control described above. In this instance, a reference driving torque $T_B$ which can be calculated in accordance with the expression (12) given hereinabove should be adopted as an aimed driving torque. Meanwhile, also where a requested driving torque $T_d$ by a driver is taken into consideration as in the case of the present embodiment, the weighting coefficient $\alpha$ need not be a fixed value, but either it may be gradually decreased as time passes after starting of control or it may be gradually decreased in response to the car speed V while the adoption ratio of the requested driving torque $T_d$ by a driver is gradually increased. Similarly, it is possible to vary the coefficient $\alpha$ such that it is kept at a fixed value for a predetermined period of time after starting a control, and after then, it is either decreased gradually as time passes or increased as the steering shaft turning amount $\delta_H$ increases so that the vehicle 68 may drive with safety particularly on a curved road which has a gradually decreasing radius of curvature.

While an aimed driving torque for a high $\mu$ road is calculated in the embodiment described above, it is otherwise possible to calculate aimed driving torques for turning control separately for a high $\mu$ road and a low $\mu$ road and select one of the two aimed driving torques as a final aimed driving torque. On the other hand, while, upon calculation of an aimed driving torque $T_{OC}$, such aimed driving torque $T_{OC}$ is restricted, in the calculating processing method described above, with an allowable variation amount $T_K$ in order to prevent a possible acceleration or deceleration shock caused by a sudden variation of the driving torque of the engine 11, such restriction may be executed for the aimed advancing direction acceleration $G_{XO}$.

After an aimed driving torque $T_{OC}$ for turning control is calculated, the TCL 76 selects one of the two aimed driving torques $T_{OS}$ and $T_{OC}$ as an optimum final aimed driving torque $T_O$ and outputs it to the ECU 15. In this instance, taking the driving safety of the vehicle 82 into consideration, a lower one of the two aimed driving torques is outputted in priority. However, since normally the aimed driving torque $T_{OS}$ for slip control is always lower than the aimed driving torque $T_{OC}$ for turning control, the final aimed driving torque $T_O$ should be selected in the order of the aimed driving torque for slip control and for turning control.

Figure 56:
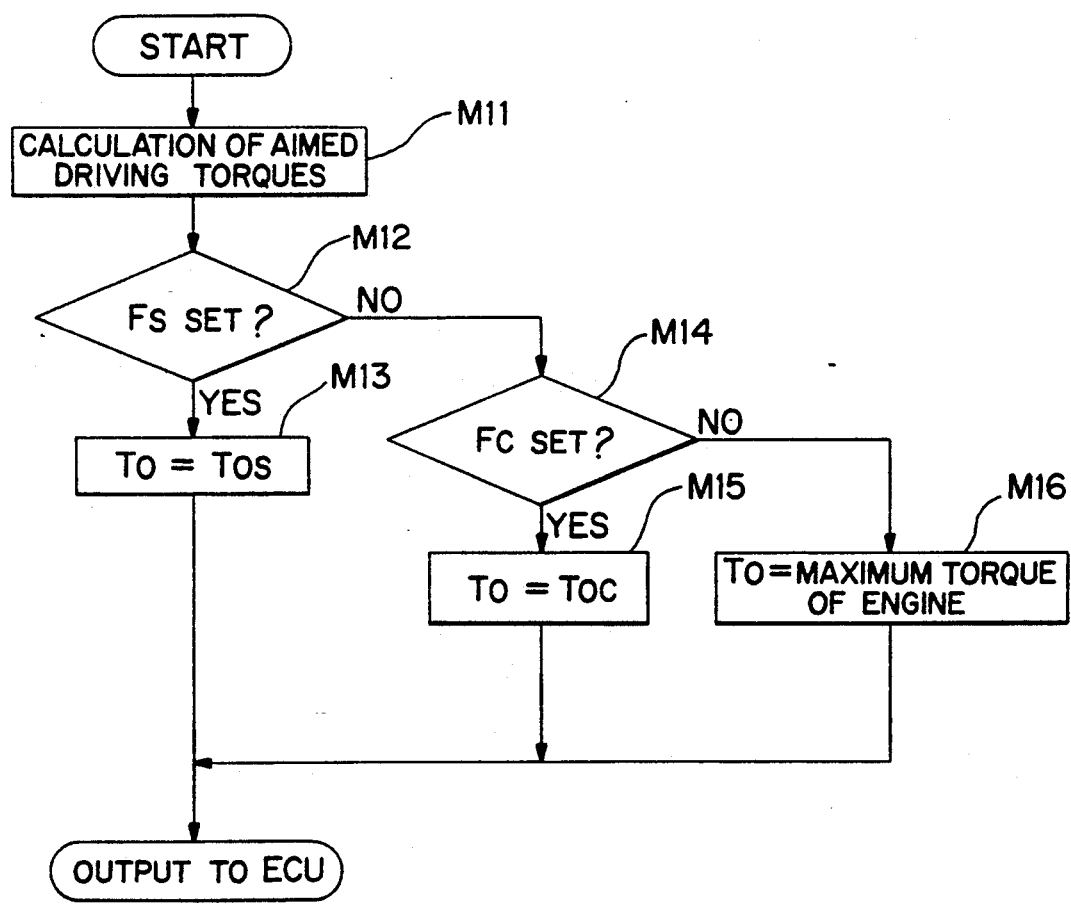
FIG. 56 is a flow chart illustrating a flow of selecting operation of a final aimed torque.

A flow of such processing is illustrated in FIG. 56. As seen from FIG. 56, the flow of processing is constructed substantially similarly to the flow of processing shown in FIG. 23 in the preceding embodiment described hereinabove, and referring to FIG. 56, an aimed driving torque $T_{OS}$ for slip control and another aimed driving torque $T_{OC}$ for turning control are first calculated at step M11, and then at step M12, it is judged whether or not a slip control flag $F_S$ is in a set state. If it is judged at step M12 that the slip control flag $F_S$ is in a set state, then the TCL 76 selects the aimed driving torque $T_{OS}$ for slip control as a final aimed driving torque $T_O$ and outputs it to the ECU 15 at step M13.

If it is judged at step M12 that the slip control flag $F_S$ is not in a set state, then it is judged subsequently at step M14 whether or not the turning control flag $F_C$ is in a set state. In case it is judged at step M14 that the turning control flag $F_C$ is in a set state, the aimed driving torque $T_{OC}$ for turning control is selected as a final aimed driving torque $T_O$ and outputted to the ECU 15 at step M15.

On the contrary, if it is judged at step M14 that the turning control flag $F_C$ is not in a set state, then the TCL 76 outputs the maximum torque of the engine 11 as a final aimed driving torque $T_O$ to the ECU 15 at step M16.

While a final aimed driving torque $T_O$ is selected in such a manner as described above, upon sudden starting of the vehicle 82 wherein reduction of the output of the engine 11 does not take place in time even by a fully closing operation of the throttle valve 20 by way of the actuator 41 or when the road condition suddenly changes from a normal dry road to a frozen road, the TCL 76 sets a retard rate to a fundamental retard amount $P_B$ of an ignition timing P set by the ECU 15 and outputs the thus set retard rate to the ECU 15.

Such fundamental retard amount $P_B$ is a maximum value of the retard amount with which driving of the engine 11 does not suffer from any trouble, and is set in accordance with an intake air amount of the engine 11 and an engine rotational speed $N_E$. However, the retard rate is basically selected such that, as the changing rate $G_s$ of the slip amount s increases, the retard amount increases. Further, the retard rate includes, in the present embodiment, up to four levels including a 0 level for reducing the fundamental retard amount $P_B$ to zero, a I level for compressing the fundamental retard amount $P_B$ to two thirds, a II level for causing the fundamental retard amount $P_B$ to be outputted as it is, and a III level for causing the fundamental retard amount to be outputted as it is and further causing the throttle valve 20 to be closed fully. In particular, a fully closing operation of the throttle valve 20 at the III level is a characteristic of the system of the present embodiment, and by combining the fully closing operation with the retarding operations described above, the driving torque of the engine 11 can be reduced very rapidly to converge the slip of the front wheels 64 and 65.

Figure 57B:
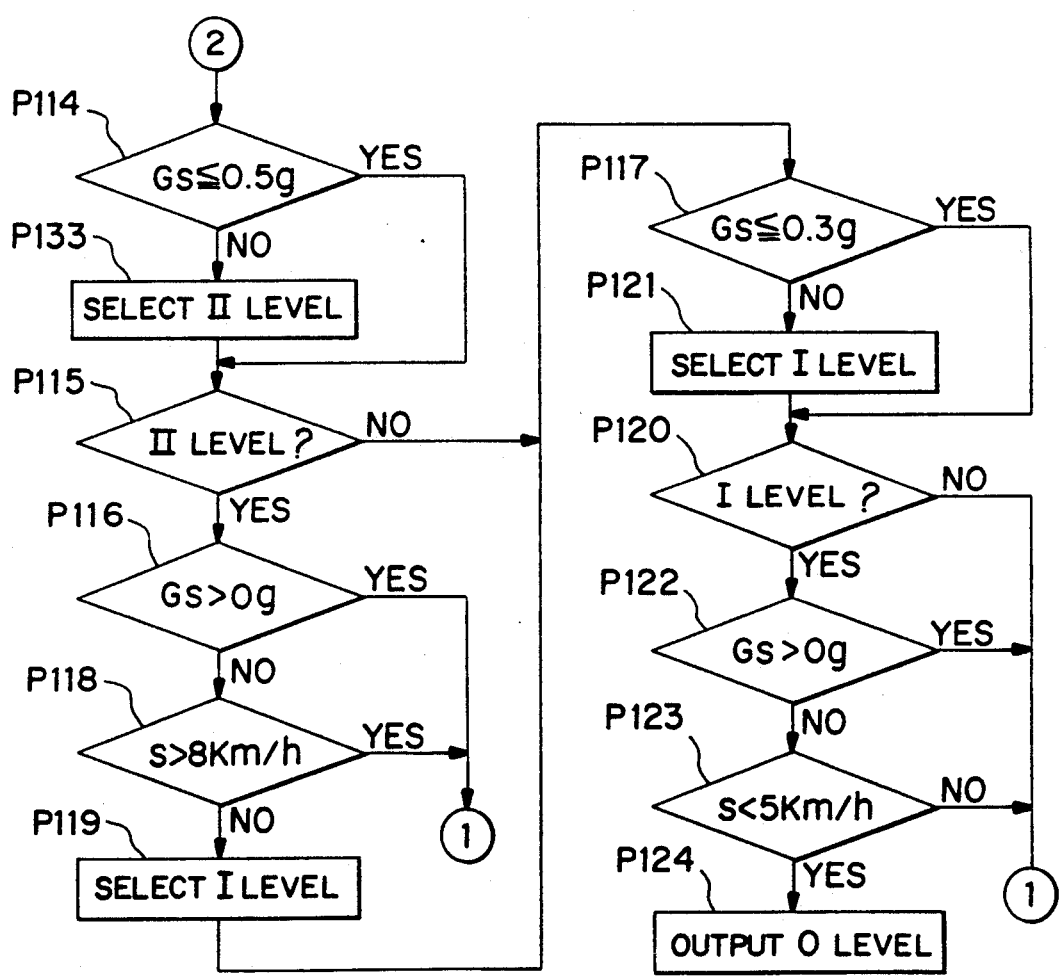

A procedure of reading out such retard rate is illustrated in FIG. 57. Referring to FIG. 57, the TCL 76 first resets an ignition timing control flag FP at step P101 and then judges at step P102 whether or not the slip control flag $F_S$ is in a set state. In case it is judged at step P102 that the slip control flag $F_S$ is in a set state, then the ignition timing control flag FP is set at step P103, and then it is judged at step P104 whether or not the slip amount s is lower than 0 km per hour. On the other hand, in case it is judged at step P102 that the slip control flag $F_S$ is not in a set state, then the control sequence directly advances to step P104.

If it is judged at step P104 that the slip amount s is lower than 0 km per hour, that is, there is no trouble if the driving torque of the engine 11 is raised, then the retard rate is set to the 0 level and the 0 level is outputted to the ECU 15 at step P105. On the contrary, in case it is judged at step P104 that the slip amount s is equal to or higher than 0 km per hour, it is subsequently judged at step P106 whether or not the changing rate $G_s$ of the slip amount s is equal to or lower than 2.5 g. Then, in case it is judged at step P106 that the slip amount changing rate $G_s$ is equal to or lower than 2.5 g, it is subsequently judged at step P107 whether or not the retard rate is the III level.

On the other hand, in case it is judged at step P106 that the slip amount changing rate $G_s$ exceeds 2.5 g, that is, the front wheels 64 and 65 are slipping suddenly, it is judged subsequently at step P108 whether or not the final aimed driving torque $T_O$ is lower than 4 kgm, and in case it is judged that the final aimed driving torque $T_O$ is lower than 4 kgm, that is, it is necessary to rapidly restrict the driving torque of the engine 11, the retard level is set to the III level at step P109, whereafter the control sequence advances to step P107. On the contrary, if it is judged at step P108 that the final aimed driving torque $T_O$ is equal to or higher than 4 kgm, then the control sequence directly advances to step P107.

If it is judged at step P107 that the retard rate is the III level, then it is judged at step P110 whether or not the slip amount changing rate $G_s$ exceeds 0 g. Here, if it is judged that the slip amount changing rate $G_s$ exceeds 0 g, that is, the slip amount s is in an increasing tendency, it is judged subsequently at step P111 whether or not the ignition timing control flag FP is in a set state, but on the contrary if it is judged at step P110 that the slip amount changing rate $G_s$ is equal to or lower than 0 g, that is, the slip amount s is in a decreasing tendency, then it is judged at step P112 whether or not the slip amount s exceeds 8 km per hour.

If it is judged at step P112 that the slip amount s exceeds 8 km per hour, the control sequence advances to step P111, but on the contrary in case it is judged that the slip amount s is equal to or lower than 8 km per hour, the retard rate is changed over from the III level to the II level at step P113, and then it is judged at step P114 whether or not the slip amount changing rate $G_s$ is equal to or lower than 0.5 g. Similarly, also in case it is judged at step P107 that the retard level is not the III level, the control sequence advances to step P114.

In case it is judged at step P114 that the slip amount changing rate $G_s$ is equal to or lower than 0.5 g, that is, the change of the slip amount s is not very sudden, it is judged at step P115 whether or not the retard rate is the II level. Meanwhile, when it is judged at step P114 that the slip amount changing rate $G_s$ is not equal to nor lower than 0.5 g, the retard level is set to the II level at step P133, whereafter the control sequence advances to step P115.

Then, in case it is judged at step P15 that the retard rate is the II level, it is judged at step P116 whether or not the slip amount changing rate $G_s$ exceeds 0 g, but on the contrary if it is judged at step P115 that the retard rate is not the II level, it is judged at step P117 whether or not the slip amount changing rate $G_s$ is equal to or smaller than 0.3 g. Then, in case it is judged at step P116 that the slip amount changing rate $G_s$ does not exceed 0 g, that is, the slip amount s is in a decreasing tendency, it is judged subsequently at step P118 whether or not the slip amount s exceeds 8 km per hour. Then, in case it is judged at step P118 that the slip amount s is higher than 8 km per hour, the retard rate is changed over from the II level to the I level at step P119, whereafter the control sequence advances to step P117. On the other hand, in case it is judged at step P116 that the slip amount changing rate $G_s$ is higher than 0 g, that is, the slip amount s is in an increasing tendency, or it is judged at step P118 that the slip amount s exceeds 8 km per hour, that is, the slip amount s is excessively great, the control sequence advances to step P111.

In case it is judged at step P117 that the slip amount changing rate $G_s$ is equal to or lower than 0.3 g, that is, the slip amount s is little in an increasing tendency, it is judged at step P120 whether or not the retard rate is the I level. On the contrary, if it is judged at step P117 that the slip amount changing rate $G_s$ exceeds 0.3 g, that is, the slip amount changing rate s is in a little increasing tendency, the retard rate is set to the I level at step P121.

Then, in case it is judged at step P120 that the retard rate is the I level, it is judged at step P122 whether or not the slip amount changing rate $G_s$ exceeds 0 g, and in case it is judged that the slip amount changing rate $G_s$ is equal to or lower than 0 g, that is, the slip amount s is in a decreasing tendency, it is judged at step P123 whether or not the slip amount is lower than 5 km per hour. If it is judged at step P123 that the slip amount s is lower than 5 km per hour, that is, the front wheels 64 and 65 slip little, then the retard rate is set to the 0 level and the 0 level outputted to the ECU 15 at step P124. On the other hand, in case it is judged at step P120 that the retard rate is not the I level, or in case it is judged at step P122 that the slip amount changing rate $G_s$ exceeds 0 g, that is, the slip amount s is in an increasing tendency, or else when it is judged at step P123 that the slip amount s is equal to or higher than 5 km per hour, that is, the slip amount s is comparatively great, the control sequence advances to step P111.

On the other hand, if it is judged at step P111 that the ignition timing control flag FP is in a set state, it is judged at step P125 whether or not the final aimed driving torque $T_O$ is lower than 10 kgm. On the contrary, if it is judged at step P111 that the ignition timing control flag FP is not in a set state, the retard rate is set to the 0 level at step P126, whereafter the control sequence advances to step P125.

Then, in case it is judged at step P125 that the final aimed driving torque $T_O$ is equal to or higher than 10 kgm, that is, the engine 11 is generating a rather high driving force, it is judged at step P127 whether or not the retard rate is the II level, and in case it is judged that the retard rate is the II level, the retard rate is dropped to the I level and such I level is outputted to the ECU 15 at step P128.

In case it is judged at step P125 that the final aimed driving torque To is lower than 10 kgm or in case it is judged at step P127 that the retard rate is not the II level, it is judged at step P129 whether or not the hydraulic automatic transmission 13 is proceeding a gear shifting operation. Then, in case it is judged that the hydraulic automatic transmission 13 is proceeding a gear shifting operation, subsequently it is judged at step P130 whether or not the retard rate is the III level. Then, in case it is judged at step P130 that the retard rate is the III level, the retard rate is dropped to the II level and such II level is outputted to the ECU 15 at step P131. On the other hand, in case it is judged at step P129 that the hydraulic automatic transmission 13 is not proceeding its gear shifting operation, or in case it is judged at step P130 that the retard rate is not the III level, the retard rate set precedently is outputted as it is to the ECU 15 at step P132.

For example, if the retard rate is set to the III level at step P109, then in case the slip amount changing rate $G_s$ exceeds 0 g and the slip amount s exceeds 8 km per hour, that is, the increasing rate of the slip amount s is high, and then it is judged that the final aimed driving torque $T_O$ is lower than 10 kgm and the slip of the front wheels 64 and 65 cannot be eliminated sufficiently only by a retarding operation of the ignition timing, the retard rate of the III level is selected to put the opening of the throttle valve 20 compulsorily into its fully closed condition, thereby preventing occurrence of a slip efficiently at an initial stage of such occurrence.

The ECU 15 thus reads, from a map not shown which relates to an ignition timing P set in advance in accordance with an engine rotational speed $N_E$ and an intake air amount of the engine 11 and a fundamental retard amount $P_B$, an ignition timing P and a fundamental retard amount $P_B$ in response to a detection signal from the crank angle sensor 62 and another detection signal from the air flow sensor 70 and then corrects them in accordance with the retard rate received from the TCL 65 to calculate an aimed retard amount $P_O$. In this instance, an upper limit value of the aimed retard amount $P_O$ is set corresponding to an upper limit temperature of exhaust gas at which exhaust gas purifying catalyzer not shown is not damaged, and a temperature of exhaust gas is detected from a detection signal from the exhaust gas temperature sensor 74.

It is to be noted that, when a temperature of cooling water of the engine 11 detected by the water temperature sensor 71 is lower than a preset value, if the ignition timing P is retarded, then knocking or a stall of the engine 11 may be resulted, and accordingly, a retarding operation of the ignition timing P described below is stopped.

Figure 58:
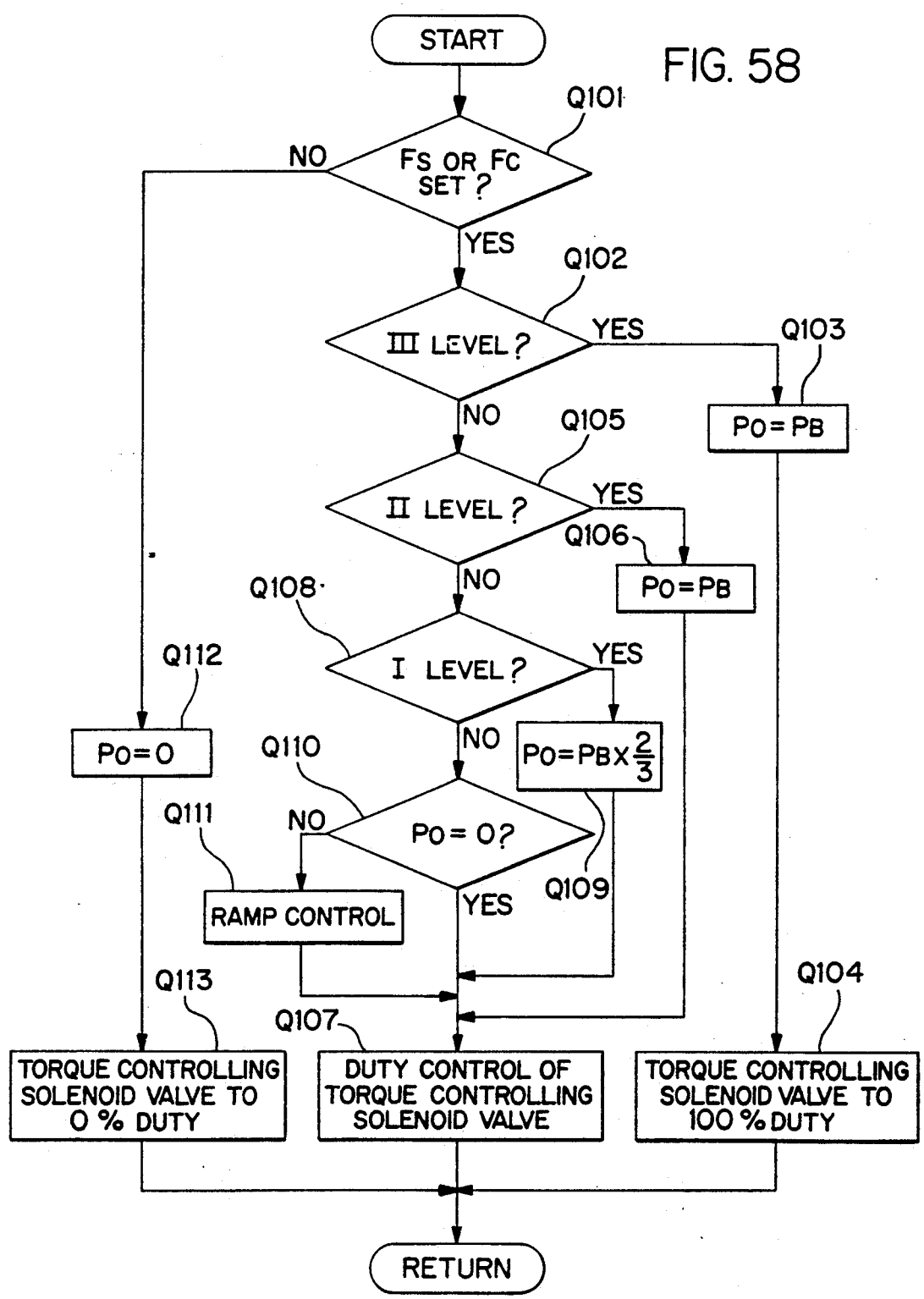
FIG. 58 is a flow chart illustrating a procedure of output control of the engine.

A procedure of calculation of an aimed retard amount $P_O$ in such retard control is illustrated in FIG. 58. Referring to FIG. 58, the ECU 15 first judges at step Q101 whether or not the slip control flag $F_S$ described hereinabove is in a set state. If it is judged that the slip control flag $F_S$ is in a set state, then it is judged at step Q102 whether or not the retard rate is set at the III level.

Then, if it is judged at step Q102 that the retard rate is the III level, then the fundamental retard amount $P_B$ read out from the map is utilized as it is as an aimed retard amount $P_O$, at step Q103, to retard the ignition timing P by the aimed retard amount $P_O$. Further, in order to put the throttle valve 20 into its fully closed condition irrespective of a value of final aimed driving torque $T_O$, the duty ratio of the torque controlling solenoid valves 51 and 56 is set to 100% at step P104 to compulsorily realize a fully closed condition of the throttle valve 20. Consequently, even when the slip amount changing rate $G_s$ is increasing suddenly, occurrence of a slip can be prevented efficiently at an initial stage of such occurrence.

On the other hand, in case it is judged at step Q102 that the retard rate is not the III level, it is judged subsequently at step Q105 whether or not the retard rate is set at the II level. Then, if it is judged at step Q105 that the retard rate is the II level, then at step Q106, the fundamental retard amount $P_B$ read out from the map is utilized as it is as an aimed retard amount $P_O$ to retard the ignition timing P by the aimed retard amount $P_O$ similarly as at step Q103. Further, the ECU 15 sets the duty ratio of the torque controlling solenoid valves 51 and 56 in accordance with a value of the aimed driving torque $T_{OS}$ at step Q107. Consequently, the driving torque of the engine 11 is lowered irrespective of an amount of operation of the accelerator pedal 31 by a driver.

Here, the ECU 15 has a map stored therein for determining a throttle opening $\theta_T$ using an engine rotational speed $N_E$ and a driving torque of the engine 11 as parameters, and thus, the ECU 15 reads out, using the map, an aimed throttle opening $\theta_{TO}$ corresponding to the current engine rotational speed $N_E$ and the aimed driving torque $T_{OS}$.

Subsequently, the ECU 15 calculates a deviation of an actual throttle opening $\theta_T$ received from the throttle opening sensor 67 from the aimed throttle opening $\theta_{TO}$, sets the duty ratio of the pair of torque controlling solenoid values 51 and 56 to a value corresponding to the deviation and controls the torque controlling solenoid valves 51 and 56 so that electric current may flow through the solenoids for the plungers 52 and 57 of the torque controlling solenoid valves 51 and 56 to lower the actual throttle opening $\theta_T$ to the aimed throttle opening $\theta_{TO}$ by operation of the actuator 41.

It is to be noted that, in case the maximum torque of the engine 11 is outputted as an aimed driving torque $T_{OS}$ to the ECU 15, the ECU 15 lowers the duty ratio of the torque controlling solenoid valves 51 and 56 to the 0% side to cause the engine 11 to generate a driving torque corresponding to an amount of operation of the accelerator pedal 31 by the driver.

On the other hand, in case it is judged at step Q105 that the retard rate is not the II level, it is judged subsequently at step Q108 whether or not the retard rate is set at the I level. In case it is judged at step Q108 that the retard rate is set at the I level, the aimed retard amount $P_O$ is set in the accordance with the following expression to retard the ignition timing P by the aimed retard amount $P_O$, whereafter the control sequence advances to step Q107.

$$P_O = P_B \cdot \frac{2}{3}$$

On the other hand, in case it is judged at step Q108 that the retard rate is not the I level, it is judged at step Q110 whether or not the aimed retard amount $P_O$ is 0, and if it is judged that the aimed retard amount $P_O$ is 0, then the control sequence advances directly to step Q107 at which a duty ratio of the torque controlling solenoid valves 51 and 56 is set in accordance with a value of the aimed driving torque $T_{OS}$ without retarding the ignition timing P. Consequently, the driving torque of the engine 11 is reduced irrespective of an amount of operation of the accelerator pedal 31 by the driver.

In the meantime, in case it is judged at step Q110 that the aimed retard amount $P_O$ is not 0, the aimed retard amount $P_O$ is decremented, at step Q111, for example, by 1 degrees for each sampling period $\Delta t$ of the main timer by ramp control until $P_O=0$ is reached to reduce a possible shock caused by a variation of the driving torque of the engine 11, whereafter the control sequence advances to step Q107.

It is to be noted that, in case it is judged at step Q101 that the slip control flag $F_S$ is in a reset state, normal driving control wherein the driving torque of the engine 11 is not reduced should be executed, and accordingly, the aimed retard amount $P_O$ is set to $P_O=0$ at step Q112 so that the ignition timing P may not be retarded. Then at step Q113, the duty ratio of the torque controlling solenoid valves 51 and 56 is set to 0% so that the engine 11 generates a driving torque corresponding to an amount of operation of the accelerator pedal 31 by the driver.

What is claimed is:

1. In an engine output controlling system for a vehicle including,
   slip detecting means for detecting slipping condition of a driving wheel of said vehicle and determining a slip changing rate of said driving wheel based upon the slipping condition,
   aimed driving torque setting means for setting an aimed driving torque of an engine of said vehicle in accordance with the slipping condition detected by said slip detecting means,
   controlling means for controlling said engine to generate the aimed driving torque set by said aimed driving torque setting means and for controlling said engine to retard ignition timing thereof based upon the slip changing rate determined by said slip detecting means,
   said aimed driving torque setting means comprising:
       acceleration detecting means for detecting a vehicle body acceleration in an advancing direction of said vehicle;
       reference driving torque setting means for setting, based on the vehicle body acceleration detected by said acceleration detecting means, a reference driving torque as a reference value for a driving torque to be applied to said driving wheel of said vehicle in order to obtain a vehicle body acceleration;
       correction torque setting means for setting, based on the slipping condition detected by said slip detecting means, a correction torque for correcting the reference driving torque; and
       correction means for correcting the reference driving torque, set by said reference driving torque setting means, by the correction torque set by said correction torque setting means, and setting the aimed driving torque of said engine based upon the corrected reference driving torque,
   said controlling means controlling a throttle valve of said engine in such a way that said throttle valve is fully closed when the slip changing rate of said driving wheel determined by said slip detecting means is greater than a first predetermined value and the aimed driving torque set by said aimed driving torque setting means is lower than a second predetermined value.

2. In an engine output controlling system for a vehicle as claimed in claim 1, said controlling means including throttle valve opening adjusting means for adjusting the opening of said throttle valve of said engine to control said engine.

3. In an engine output controlling system for a vehicle as claimed in claim 1, said vehicle including an automatic transmission, and said controlling means being constructed so as to inhibit, when said automatic transmission is proceeding through a gear shifting operation, the control of bringing the throttle valve to a fully closed position.

* * * * *